(12) United States Patent
Watanabe et al.

(10) Patent No.: US 9,150,253 B2
(45) Date of Patent: Oct. 6, 2015

(54) VEHICLE BODY FRAME STRUCTURE FOR AUTOMOBILE

(71) Applicant: HONDA MOTOR CO., LTD., Minato-ku Tokyo (JP)

(72) Inventors: Yasunori Watanabe, Sakura (JP); Tetsuhiro Arima, Utsunomiya (JP); Hideyuki Okada, Utsunomiya (JP); Akihito Funakoshi, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/394,398

(22) PCT Filed: Apr. 8, 2013

(86) PCT No.: PCT/JP2013/060611
§ 371 (c)(1),
(2) Date: Oct. 14, 2014

(87) PCT Pub. No.: WO2013/172126
PCT Pub. Date: Nov. 21, 2013

(65) Prior Publication Data
US 2015/0061272 A1    Mar. 5, 2015

(30) Foreign Application Priority Data

| May 18, 2012 | (JP) | 2012-114580 |
| May 31, 2012 | (JP) | 2012-125160 |
| May 31, 2012 | (JP) | 2012-125161 |
| Sep. 12, 2012 | (JP) | 2012-200850 |

(51) Int. Cl.
*B62D 21/11* (2006.01)
*B62D 21/15* (2006.01)
(Continued)

(52) U.S. Cl.
CPC ............. *B62D 21/155* (2013.01); *B62D 21/11* (2013.01); *B62D 24/00* (2013.01); *B62D 27/065* (2013.01)

(58) Field of Classification Search
CPC .... B62D 21/11; B62D 21/155; B62D 27/065; B62D 24/00
See application file for complete search history.

(56) References Cited

U.S. PATENT DOCUMENTS 6,588,832 B2 *  7/2003  Sakuma ........................ 296/204
6,679,523 B2 *  1/2004  Yamamoto et al. ........... 280/785
(Continued)

FOREIGN PATENT DOCUMENTS

JP    11-059496 A    3/1999
JP    2004-284427 A    10/2004
(Continued)

OTHER PUBLICATIONS

International Search Report by International Searching Authority for PCT/JP2013/060611, of which this application is the National Phase of and claims priority from, with the mailing date of May 7, 2013.

*Primary Examiner* — Laura Freedman
(74) *Attorney, Agent, or Firm* — Carrier Blackman & Associates, P.C.; William D. Blackman; Joseph P. Carrier

(57) ABSTRACT

A vehicle body frame structure includes a side frame, a sub-frame, a cabin side support member, an under-floor frame, and a link stay. The sub-frame includes a separate side fastening portion, an adjacent side fastening portion, and a central bending point. In the link stay, a first end portion side is fastened to a lower surface of the cabin side support member together with the adjacent side fastening portion so as to be extractable, and a second end portion side is fastened to the under-floor frame. A nut for fastening the second end portion side of the link stay is held by a lateral wall on a side separating from the floor tunnel portion of the link stay, and the support bolt is fitted into the nut from a lower side of a floor tunnel portion in a vehicle width direction serving as an axis.

19 Claims, 33 Drawing Sheets

(51) Int. Cl.
   *B62D 24/00* (2006.01)
   *B62D 27/06* (2006.01)

(56) References Cited

U.S. PATENT DOCUMENTS

| | | | | |
|---|---|---|---|---|
| 7,213,873 | B2 * | 5/2007 | Murata et al. | 296/204 |
| 7,654,543 | B2 * | 2/2010 | Tanaka et al. | 280/124.109 |
| 7,883,113 | B2 * | 2/2011 | Yatsuda | 280/784 |
| 7,926,609 | B2 * | 4/2011 | Kusaka | 180/232 |
| 8,267,429 | B2 * | 9/2012 | Takeshita et al. | 280/784 |
| 8,333,425 | B2 * | 12/2012 | Yoshida | 296/187.09 |
| 8,480,102 | B2 * | 7/2013 | Yamada et al. | 280/124.109 |
| 8,490,988 | B2 * | 7/2013 | Takeshita et al. | 280/124.109 |
| 8,532,881 | B2 * | 9/2013 | Ostling et al. | 701/45 |
| 8,668,248 | B2 * | 3/2014 | Ishizono et al. | 296/187.08 |
| 8,668,252 | B2 * | 3/2014 | Yasuhara et al. | 296/193.07 |
| 8,714,635 | B2 * | 5/2014 | Tomozawa et al. | 296/193.09 |
| 8,794,646 | B1 * | 8/2014 | Onishi et al. | 280/124.109 |
| 8,973,975 | B2 * | 3/2015 | Saitou et al. | 296/187.09 |
| 9,010,849 | B2 * | 4/2015 | Komiya et al. | 296/204 |
| 2010/0004826 | A1 | 1/2010 | Ostling et al. | |
| 2013/0200653 | A1 * | 8/2013 | Yasui et al. | 296/187.08 |
| 2014/0326526 | A1 * | 11/2014 | Yasui et al. | 180/274 |

FOREIGN PATENT DOCUMENTS

| | | |
|---|---|---|
| JP | 2005-219609 A | 8/2005 |
| JP | 2010-247598 A | 11/2010 |
| JP | 2011-162159 A | 8/2011 |
| WO | 2011/077554 A1 | 6/2011 |

\* cited by examiner

VEHICLE BODY FRAME STRUCTURE FOR AUTOMOBILE

TECHNICAL FIELD

This invention relates a vehicle body frame structure on a front side or on a rear side of a cabin in a four-wheeled vehicle. In addition, this invention relates to a vehicle body frame structure for an automobile.

Priority is claimed on Japanese Patent Application No. 2012-114580 filed May 18, 2012, Japanese Patent Application No. 2012-125160 filed May 31, 2012, Japanese Patent Application No. 2012-125161 filed May 31, 2012, and Japanese Patent Application No. 2012-200850 filed Sep. 12, 2012, the content of which is incorporated herein by reference.

BACKGROUND ART

A technology is known in which in a case of vehicle front collision, a certain vehicle among automobiles ensures a crash stroke of a vehicle body front part by bending down a lower member located behind a front cross member, and by causing a suspension component such as a stabilizer supported by the lower member to be displaced downward (refer to Patent Document 1).

In addition, as a technology for ensuring the crash stroke in the case of vehicle front collision, a technology is known in which a sub-frame for supporting the suspension component is disposed on a lower side of the vehicle body front part, and which is configured to forcibly disconnect a vehicle body fixing portion in a rear portion side of the sub-frame in the case of a vehicle front collision (refer to Patent Document 2).

In a vehicle body frame structure disclosed in Patent Document 2, a rear end portion of the sub-frame is fastened and fixed to a cabin side frame by a bolt and a nut, and a rotary lever arm for loosening the nut by using a thrust force of an explosive in the case of vehicle front collision is disposed. When this vehicle body frame structure is employed, if the rotary lever arm loosens the nut by using the thrust force of the explosive in the case of vehicle front collision, the rear end portion of the sub-frame falls down together with the bolt, thereby causing the mounted suspension component to be displaced downward.

In addition, a technology is known in which the sub-frame for supporting a suspension member is provided in a lower portion of the vehicle body front part, in which the nut is loosened from the bolt for fixing the rear end portion of the sub-frame by exploding the explosive, regarding the front collision as a trigger, and the rotary lever arm for extracting the bolt disposed in the rear end of the sub-frame is rotated. In this manner, the crash stroke of the vehicle body front part is ensured by extracting the bolt and causing the suspension member to be displaced downward (refer to Patent Document 2).

PRIOR ART DOCUMENTS

Patent Documents

Patent Document 1: Japanese Unexamined Patent Application, First Publication No. 2010-247598
Patent Document 2: United States Patent Application, Publication No. 2010/0004826

SUMMARY OF THE INVENTION

Problems to be Solved by the Invention

In the technology disclosed in Patent Document 1, when a collision load in a vehicle longitudinal direction is input, the lower member is bent down and deformed. Therefore, the suspension component supported by the lower member is less likely to interfere with a cabin side member at the time of collision. However, when deformation of a vehicle body is advanced due to the collision, it is not possible to reliably guide the lower member or the suspension component downward below a cabin.

That is, in the technology disclosed in Patent Document 1, the lower member is folded in a substantially intermediate portion in the longitudinal direction of the lower member. Consequently, even when the deformation of the vehicle body front part is advanced, a vehicle body connecting portion on a proximal end side of the lower member is maintained at a substantially constant position, and thus, the lower member or the suspension component is less likely to collapse downward below the cabin.

In addition, in the technology disclosed in Patent Document 2, when the collision load in the vehicle longitudinal direction is input, the nut of a bolt fastening portion is loosened by the thrust force of the explosive. In this manner, the bolt for fastening the sub-frame is extracted. Therefore, it is possible to completely disengage an end portion of the sub-frame from the vehicle body at the time of collision. However, a structure of the fastening portion of the end portion of the sub-frame becomes complicated. The complicated structure is likely to result in increased vehicle weight or increase in manufacturing cost.

Therefore, an aspect of this invention is to provide a vehicle body frame structure which can reliably guide a sub-frame downward below a cabin when a collision load in a longitudinal direction of a vehicle is input, by using a simple configuration, and which can obtain an increased crash stroke of the vehicle without resulting in increased vehicle weight or increased manufacturing cost.

In addition, the technology disclosed in Patent Document 1 assumes that the lower member is deformed at the time of collision. For this reason, the binding force between the front cross member and a floor panel is weakened. Therefore, in order to ensure suspension support rigidity, it is essential to reinforce a cross member and a front side frame, thereby causing a problem in that an increase in weight cannot be avoided.

In addition, the technology disclosed in Patent Document 2 adopts a structure in which the suspension member is supported by the sub-frame. For this reason, the problem of the increased weight can be solved. However, the binding relationship between the sub-frame and the rotary lever arm is eliminated after the sub-frame is disengaged from the vehicle body. Consequently, there is a problem in that the sub-frame cannot be reliably guided downward below the vehicle body.

Therefore, according to another aspect of this invention, another object of this invention is to provide a vehicle body frame structure for an automobile in which when a vehicle body front part or a vehicle body rear part collides, a sub-frame is reliably guided downward below a vehicle body so as to ensure a crash stroke of the vehicle body front part or the vehicle body rear part which can absorb energy, and which can prevent the sub-frame from interfering with the vehicle body.

Means for Solving the Problems

A vehicle body frame structure according to this invention adopts the following configurations in order to solve the above-described problems.

(1) A vehicle body frame structure according to an aspect of the present invention includes a side frame that is arranged on one of a front side and a rear side of a cabin along a vehicle body longitudinal direction; a sub-frame that is arranged below the side frame and supports a suspension component; a cabin side support member that is arranged outside and below one of a front section and a rear section of the cabin, and that supports an end portion of the sub-frame which is at a side adjacent to the cabin; an under-floor frame that is arranged below a stepped portion of a floor adjacent to a floor tunnel portion of the cabin, along the vehicle body longitudinal direction; and a link stay that is arranged across and connects together the end portion of the side adjacent to the cabin in the sub-frame and the under-floor frame, the sub-frame includes a separate side fastening portion which is an end portion on a side separating from the cabin and is fastened to a member on an extension end side of the side frame; an adjacent side fastening portion which is the end portion on the side adjacent to the cabin and is fastened and fixed to the cabin side support member from a lower side; and a central bending point which is configured to be bent down at a substantially central portion in between of the separate side fastening portion and the adjacent side fastening portion in the longitudinal direction, in the link stay, a first end portion side of the link stay is fastened to a lower surface of the cabin side support member together with the adjacent side fastening portion so as to be extractable, and a second end portion side of the link stay is fastened to the under-floor frame by a support bolt extending in a vehicle width direction and a nut screwed to the support bolt, the nut for fastening the second end portion side of the link stay is held by a lateral wall on a side separating from the floor tunnel portion of the link stay, and the support bolt is fitted into the nut from the lower side of the floor tunnel portion.

In this case of the invention, if the collision load in the vehicle body longitudinal direction is input to the extension end side of the side frame, the side frame is compressed and deformed, and the collision load is also input to the separate side fastening portion of the side frame. If the collision load is input to the separate side fastening portion, the sub-frame is bent down at the central bending point, and the adjacent side fastening portion is extracted downward below the cabin side support member together with one end portion side of the link stay. If the deformation advances due to the collision from this state, the end portion of the cabin side of the sub-frame is rotated downward together with the link stay about the support bolt.

In addition, when the other end portion side of the link stay is fastened to the under-floor frame, the support bolt is fitted into the nut at a lower position of the floor tunnel portion when the vehicle body is assembled.

(2) In the above-described aspect (1), the nut may be assembled integrally with a nut cover having an engagement claw locked to the lateral wall of the link stay.

In this case, when the other end portion side of the link stay is fastened to the under-floor frame, the engagement claw of the nut cover integrated with the nut is locked to the lateral wall of the link stay in advance, and in this state, the support bolt is fitted into the nut inside the nut cover.

(3) In the above described aspect (1) or (2), a bolt insertion portion into which the support bolt is inserted may be disposed on the lateral wall of the link stay, and the nut may include a restricting projection which is locked by the bolt insertion portion on the lateral wall of the link stay and restricts rotation of the nut.

In this case, if the support bolt is fitted into the nut, a torque reaction force acts on the nut from the link stay via the restricting projection.

(4) In the above-described aspects (1) to (3), a bolt insertion portion into which the support bolt is inserted may be disposed on the lateral wall of the link stay, and the bolt insertion portion may have a displacement permitting portion which permits relative displacement between the link stay and the support bolt, which is caused by displacement of the sub-frame in the vehicle longitudinal direction, when a collision load in the vehicle body longitudinal direction is input.

In this case, in an initial input stage of the collision load in the vehicle body longitudinal direction, if the adjacent side fastening portion of the sub-frame is about to be displaced in a direction adjacent the under-floor frame due to crush deformation of the side frame, the displacement of the link stay with respect to the support bolt locked by the under-floor frame side is permitted by the displacement permitting portion. Therefore, at this time, an excessive load is not generated from the support bolt to the link stay, thereby suppressing unnecessary deformation in the link stay.

(5) In the above-described aspects (1) to (4), a bolt insertion portion into which the support bolt is inserted may be disposed on the lateral wall of the link stay, and the bolt insertion portion may be configured to have a notched groove for permitting falling-down of the link stay from the support bolt which is caused by downward displacement of the sub-frame, when a collision load in the vehicle body longitudinal direction is input.

In this case, in a later input stage of the collision load in the vehicle body longitudinal direction, after the sub-frame is rotated about an axis of the support bolt via the link stay, the link stay is displaced downward so that the support bolt is relatively displaced toward an opening side of the notched groove. As a result, the link stay is disengaged from the support bolt, and a cabin side region of the sub-frame falls down together with the link stay.

(6) In the above-described aspect (1), the link stay may have a downward convex portion which is convex downward at a substantially central portion in the vehicle body longitudinal direction, a weak portion which facilitates separation of a fastener from the cabin side support member by using a downward load may be disposed at the cabin side support member to which the adjacent side fastening portion of the sub-frame is attached, and an apex of the downward convex portion may form a truss structure with the central bending point of the sub-frame and the adjacent side fastening portion, and even when the sub-frame is in an initial state and the sub-frame is in a state of coming into contact with the ground during collision, the apex of the downward convex portion may be located below a straight line connecting the central bending point and a fastening center of the link stay.

(7) In the above-described aspect (6), a polymerized reinforcement plate may be disposed at the cabin side support member to which the adjacent side fastening portion of the sub-frame is fastened, and the weak portion may be an annular portion of the cabin side support member between an insertion hole of the fastener of the cabin side support member and an insertion hole formed in the reinforcement plate so as to permit insertion of the fastener.

(8) In the above-described aspect (7), the reinforcement plate may be thicker than the cabin side support member to which the reinforcement plate is attached.

(9) In the above-described aspect (7) or (8), the reinforcement plate may be welded to the cabin side support member behind the weak portion in a collision load input direction, and the fastener may be a nut which is welded and fixed to a bolt and the cabin side support member.

(10) In the above-described aspect (6) to (9), the link stay may form the downward convex portion by causing a bottom wall to protrude downward.

(11) In the above-described aspect (10), the link stay may include a recess for the adjacent side fastening portion in which the bottom wall is recessed upward, and the link stay may include the downward convex portion behind the recess in the collision load input direction.

(12) In the above-described aspect (10) or (11), the link stay may include a lateral wall extending from the bottom wall, and a recess may be disposed at a lateral wall located above the downward convex portion.

(13) In the above-described aspect (1), an extension piece extending in an under-floor frame direction may be disposed at the adjacent side fastening portion of the sub-frame, and a support wall which opposes a distal end portion of the extension piece by leaving a predetermined gap therebetween and with which the distal end portion of the extension piece comes into contact when the collision load in the vehicle body longitudinal direction is input may be disposed at the under-floor frame.

In this case of the invention, if the collision load in the vehicle body longitudinal direction is input to the extension end side of the side frame, the side frame is compressed and deformed, and the collision load is also input to the separate side fastening portion of the sub-frame. If the collision load is input to the separate side fastening portion, the sub-frame is bent down at the central bending point, and at this time, a force in a direction of extracting downward from the cabin side support member acts on the first fastening member. If the deformation in each portion is advanced in this way, the distal end portion of the extension piece of the adjacent side fastening portion of the sub-frame comes into contact with the support wall of the under-floor frame. If the distal end portion of the extension piece comes into contact with the support wall, the contact portion serves as a mechanical fulcrum on the cabin side of the sub-frame, and a force of trying to extract the first fastening member downward with a large displacement acts on the first fastening member. In this manner, the first fastening member is extracted downward from the vehicle side support member, and the adjacent side fastening portion of the sub-frame is disengaged from the vehicle side support member. At this time, the adjacent side fastening portion of the sub-frame is connected to the under-floor frame via the link stay and the second fastening member. If the deformation of the vehicle body is further advanced, the sub-frame is greatly rotated downward below the cabin about the axis of the second fastening member.

(14) In the above-described aspect (13), the vehicle body side support member may include a support member substrate into which a first fastening member penetrates and in which a head portion of the first fastening member is locked at an upper surface side, and a reinforcement plate that has an escape hole which surrounds an outside of the head portion of the first fastening member, and that is bonded to the upper surface of the support member substrate, and a region surrounded by the escape hole of the reinforcement plate on the support member substrate may be a weak portion.

In this case, the head portion of the first fastening member is locked by the weak portion of only the support member substrate on the inner side of the escape hole of the reinforcement plate. In a peripheral region of the weak portion, the rigidity is increased by the support member substrate and the reinforcement plate being bonded to each other. Therefore, when the collision load in the vehicle body longitudinal direction is input, if a downward force acts on the first fastening member from the adjacent side fastening portion of the sub-frame, the vehicle body side support member is broken in the weak portion, and the first fastening member is extracted downward from the vehicle body side support member.

(15) In the above-described aspect (14), within the support member substrate, a lower surface in a region adjacent to the weak portion on the cabin side may be allowed to have increased rigidity by bonding the reinforcement plate to the upper surface side, and may configure a first fulcrum with which an edge of the adjacent side fastening portion of the sub-frame comes into contact in an initial input stage of the collision load in the vehicle body longitudinal direction. The support wall of the under-floor frame may configure a second fulcrum with which the distal end portion of the extension piece comes into contact in a middle input stage of the collision load in the vehicle body longitudinal direction.

In this case, when the collision load in the vehicle body longitudinal direction is input, if the sub-frame starts to be bent down at the central bending point, in the cabin side region of the sub-frame, in the initial stage, the edge of the adjacent side fastening portion comes into contact with the highly rigid first fulcrum on the lower surface of the support member substrate. Then, in the middle stage, the distal end portion of the extension piece comes into contact with the second fulcrum on the support wall of the under-floor frame. Accordingly, the mechanical fulcrum located in the cabin side region of the sub-frame moves from the first fulcrum to the second fulcrum. In this manner, the downward displacement of the first fastening member is increased in association with the rotation of the sub-frame.

(16) In the above-described aspects (13) to (15), a penetrating portion in which a second fastening member is supported in a penetrating state may be disposed on the second end portion side of the link stay, and the penetrating portion may have a displacement permitting portion which permits relative displacement between the link stay and the second shaft member, which is caused by displacement of the sub-frame in the vehicle longitudinal direction, when a collision load in the vehicle body longitudinal direction is input.

In this case, in the initial input stage of the collision load in the vehicle body longitudinal direction, if the adjacent side fastening portion of the sub-frame is about to be displaced in the direction adjacent the under-floor frame due to crush deformation of the side frame, the displacement of the link stay with respect to the second fastening member locked at the under-floor frame side is permitted by the displacement permitting portion. Therefore, at this time, an excessive load is not generated from the second fastening member to the link stay, thereby suppressing unnecessary deformation in the link stay.

(17) In the above-described aspects (13) to (16), a penetrating portion in which the second fastening member is supported in a penetrating state may be disposed on the second end portion side of the link stay. The penetrating portion may be configured to have a notch groove for permitting falling-down of the link stay from the second fastening member which is caused by downward displacement of the sub-frame, when the collision load in the vehicle body longitudinal direction is input.

In this case, in the later input stage of the collision load in the vehicle body longitudinal direction, the first fastening member is extracted from the vehicle side support member. After the sub-frame is rotated about the axis of the second fastening member via the link stay, the link stay is displaced downward so that the second fastening member is relatively displaced toward the opening side of the notched groove. As a result, the link stay is disengaged from the second fastening member, and the cabin side region of the sub-frame falls down together with the link stay.

(18) In the above-described aspects (13) to (17), the support wall of the under-floor frame may include a tilted surface and a locking recess which is disposed to be continuous with the tilted surface recessed upward. The extension piece may include a flat surface parallel to the tilted surface on the support wall, and an engagement convex portion which protrudes from the flat surface and engages with the locking recess on the support wall in the middle input stage of the collision load in the vehicle body longitudinal direction.

In this case, in the middle input stage of the collision load in the vehicle body longitudinal direction, if the adjacent side fastening portion of the sub-frame is displaced in the direction adjacent the under-floor frame due to crush deformation of the side frame, the extension piece of the sub-frame comes into contact with the tilted surface on the under-floor frame which is the flat surface, and then, is engaged with the locking recess at the under-floor frame by the engagement convex portion.

(19) In the above-described aspect (18), a reinforcement member for reinforcing a peripheral edge portion on an upper surface side of the locking recess may be attached to an upper surface side of the under-floor frame.

Advantage of the Invention

According to the above-described aspect (1) of the invention, if the collision load in the vehicle body longitudinal direction is input, the sub-frame is bent down at the central bending point, and the adjacent side fastening portion is extracted downward from the cabin side support member together with one end portion side of the link stay. The rear portion of the sub-frame is rotated about the support bolt on the under-floor frame together with the link stay. Therefore, it is possible to reliably guide the sub-frame and the suspension component downward below the cabin.

Therefore, according to this aspect of the invention, when the collision load in the vehicle body longitudinal direction is input, it is possible to reliably guide the sub-frame and the suspension component downward below the cabin by using a simple structure. Accordingly, it is possible to obtain an increased crash stroke of the vehicle without resulting in an increased vehicle weight or increased manufacturing cost.

Furthermore, according to this aspect of the invention, the nut is held by the lateral wall on the side separating from the floor tunnel portion of the link stay, and the support bolt is fitted into the nut from the lower side of the floor tunnel portion. Accordingly, when the vehicle body is assembled, it is possible to facilitate the fitting work of the support bolt into the nut in a wide space below the floor tunnel portion. Therefore, there is an advantage in that workability is improved.

According to the above-described aspect (2) of the invention, the nut is integrally attached to the nut cover having the engagement claw. Therefore, the nut cover is locked in advance at a predetermined position on the lateral wall of the link stay. In this manner, even when the space in the peripheral region on the side where the nut is arranged is narrow, the support bolt can be fitted into the nut in a state where the nut is accurately positioned.

According to the above-described aspect (3) of the invention, the restricting projection which is locked by the bolt insertion portion and restricts the rotation of the nut is disposed at the nut. Therefore, a worker can fit the support bolt into the nut without holding the nut portion.

According to the above-described aspect (4) of the invention, the displacement permitting portion is disposed at the bolt insertion portion on the lateral wall of the link stay. Therefore, when the adjacent side fastening portion of the sub-frame is displaced in the under-floor frame direction, the displacement permitting portion can permit the displacement of the link stay. Therefore, according to this aspect of the invention, before the link stay functions as a link, it is possible to prevent the link stay from being unnecessarily deformed.

According to the above-described aspect (5) of the invention, the bolt insertion portion of the link stay is configured to have the notched groove. Therefore, in the later input stage of the collision load in the vehicle body longitudinal direction, after the sub-frame is rotated about the axis of the support bolt via the link stay, it is possible to cause the link stay locked by the support bolt to fall down along the notched groove. Therefore, according to this aspect of the invention, when the collision load in the vehicle body longitudinal direction is input, it is possible to cause the cabin side region of the sub-frame to finally fall down.

According to the above-described aspect (6) of the invention, the apex of the downward convex portion of the link stay forms a triangular truss structure with the central bending point of the sub-frame and the adjacent side fastening portion of the sub-frame. Therefore, the collision load is concentrated on the apex of the downward convex portion at the time of vehicle collision. In this manner, it is possible to cause the concentrated stress to act downward on the downward convex portion.

In addition, the weak portion which facilitates the separation of the fastener from the cabin side support member by using the downward load is disposed at the cabin side support member to which the adjacent side fastening portion of the sub-frame is attached. Therefore, it is possible to separate the adjacent side fastening portion of the sub-frame from the cabin side support member at the time of vehicle collision.

Accordingly, at the time of vehicle collision, the sub-frame is bent down at the central bending point between the front fastening portion and the adjacent side fastening portion. Thereafter, the front end comes into contact with the ground. In the sub-frame, the fastener which fastens the adjacent side fastening portion to the cabin side support member breaks the weak portion, and the downward convex portion of the link stay is bent down while the link stay and the sub-frame are still integrated with each other. Therefore, the link stay is rotated about the axis of the fastening center of the rear portion of the link stay, and the sub-frame is reliably guided downward below the vehicle body. In this manner, it is possible to prevent the suspension component attached to the sub-frame from interfering with a power unit, for example. Furthermore, it is possible to prevent the sub-frame from interfering with the vehicle body, and it is possible to ensure the crash stroke which can absorb the collision energy.

According to the above-described aspect (7) of the invention, it is possible to locally concentrate the load input from the sub-frame on the weak portion which is the annular portion of the cabin side support member between the insertion hole of the fastener of the cabin side support member and the insertion hole of the reinforcement plate. Accordingly, it is possible to break the cabin side support member with a small displacement by using the fastener. Therefore, it is possible to shorten the time required until the cabin side support member is broken.

According to the above-described aspect (8) of the invention, it is possible to increase the resistance against forcible entry of the suspension component attached to the sub-frame, or an electric power steering device, for example.

According to the above-described aspect (9) of the invention, if the collision load acts on the sub-frame in a case of vehicle front collision, this load acts as a breaking load acting on a nut welded portion which is fixedly welded to the cabin side support member and sheering stress acting on a welded portion between the cabin side support member and the reinforcement plate. Therefore, it is possible to link the load to a rotary operation of the sub-frame by preventing the sub-frame from sliding with respect to the cabin side support member. Accordingly, it is possible to reliably prevent the sub-frame from moving rearward.

According to the above-described aspect (10) of the invention, in a case of press molding of the link stay, it is possible to easily form the downward convex portion.

According to the above-described aspect (11) of the invention, the recess increases the rigidity on the front side in a collision load input direction. In this manner, the link stay is easily bent down by the downward convex portion in the rear thereof. For example, it is possible to prevent a bolt head portion of the fastener from protruding downward from a bottom surface extending from the sub-frame through the link stay and interfering with a road surface.

According to the above-described aspect (12) of the invention, the recess of the lateral wall causes the lateral wall not to adversely affect bending deformation in the downward convex portion. Therefore, it is possible to reliably bend the link stay.

According to the above-described aspect (13) of the invention, if the collision load in the vehicle body longitudinal direction is input, the sub-frame is bent down at the central bending point, and the distal end portion of the extension piece of the adjacent side fastening portion of the sub-frame comes into contact with the support wall of the under-floor frame. The contact portion serves as the mechanical fulcrum on the cabin side of the sub-frame, and the force of trying to extract the first fastening member downward with a large displacement acts on the first fastening member. Therefore, it is possible to cause the adjacent side fastening portion of the sub-frame to fall down by reliably extracting the first fastening member downward.

Furthermore, in this aspect of the invention, the adjacent side fastening portion of the sub-frame is connected to the under-floor frame via the link stay and the second fastening member. Therefore, after the adjacent side fastening portion of the sub-frame falls down, the sub-frame is rotated downward below the cabin about the second fastening member. In this manner, it is possible to reliably guide the sub-frame and the suspension component downward below the cabin.

Therefore, according to this aspect of the invention, when the collision load in the vehicle body longitudinal direction is input, it is possible to reliably guide the sub-frame and the suspension component downward below the cabin by using a simple structure. Accordingly, it is possible to obtain an increased crash stroke of the vehicle without resulting in increased vehicle weight or increased manufacturing cost.

According to the above-described aspect (14) of the invention, the head portion of the first fastening member is locked by the weak portion of only the support member substrate on the inner side of the escape hole of the reinforcement plate, and the rigidity in the peripheral region of the weak portion thereof is increased by the reinforcement plate. Therefore, when the collision load in the vehicle body longitudinal direction is input, it is possible to reliably break the weak portion by slightly displacing the first fastening member downward.

According to the above-described aspect (15) of the invention, when the collision load in the vehicle body longitudinal direction is input, it is possible to continuously move the mechanical fulcrum on the cabin side of the sub-frame from the first fulcrum which is adjacent to the head portion of the first fastening member to the second fulcrum which is on the support wall of the under-floor frame. Therefore, it is possible to reliably extract the first fastening member downward.

According to the above-described aspect (16) of the invention, the displacement permitting portion is disposed at the penetrating portion which supports the second fastening member on the other end portion side of the link stay. Therefore, in the middle input stage of the collision load in the vehicle body longitudinal direction, when the extension piece of the adjacent side fastening portion of the sub-frame is displaced to the cabin side and comes into contact with the support wall of the under-floor frame, the displacement of the link stay is permitted by the displacement permitting portion. Accordingly, before the link stay functions as a link, it is possible to prevent the link stay from being unnecessarily deformed.

According to the above-described aspect (17) of the invention, the penetrating portion of the link stay is configured to have the notched groove. Therefore, in the later input stage of the collision load in the vehicle body longitudinal direction, after the sub-frame is rotated about the axis of the second fastening member via the link stay, it is possible to cause the link stay locked by the second fastening member to fall down along the notched groove. Therefore, according to this aspect of the invention, when the collision load in the vehicle body longitudinal direction is input, it is possible to cause the cabin side region of the sub-frame to finally fall down.

According to the above-described aspect (18) of the invention, in the middle input stage of the collision load in the vehicle body longitudinal direction, after the extension piece of the sub-frame is brought into contact with the tilted surface on the under-floor frame which is the flat surface, it is possible to cause the engagement convex portion to engage with the locking recess at the under-floor frame side. Therefore, it is possible to obtain a stable rotation of the sub-frame which is required for guiding the engagement convex portion of the extension piece to the locking recess and for extracting the first fastening member.

According to the above-described aspect (19) of the invention, the reinforcement member for reinforcing the peripheral edge portion on the upper surface side of the locking recess is disposed at the upper surface side of the under-floor frame. Therefore, when the sub-frame is rotated by causing the engagement convex portion to engage with the locking recess, it is possible to prevent flexural deformation around the locking recess. Therefore, according to this aspect of the invention, it is possible to further stabilize the rotation of the sub-frame which is required for extracting the first fastening member.

DESCRIPTION OF EMBODIMENTS

First Embodiment

Hereinafter, a first embodiment of this invention will be described with reference to the drawings. Unless otherwise particularly designated, terms of "front", "rear", "up", "down", "left" and "right" in the following description mean terms of "front", "rear", "up", "down", "left" and "right" in a vehicle.

Figure 1:
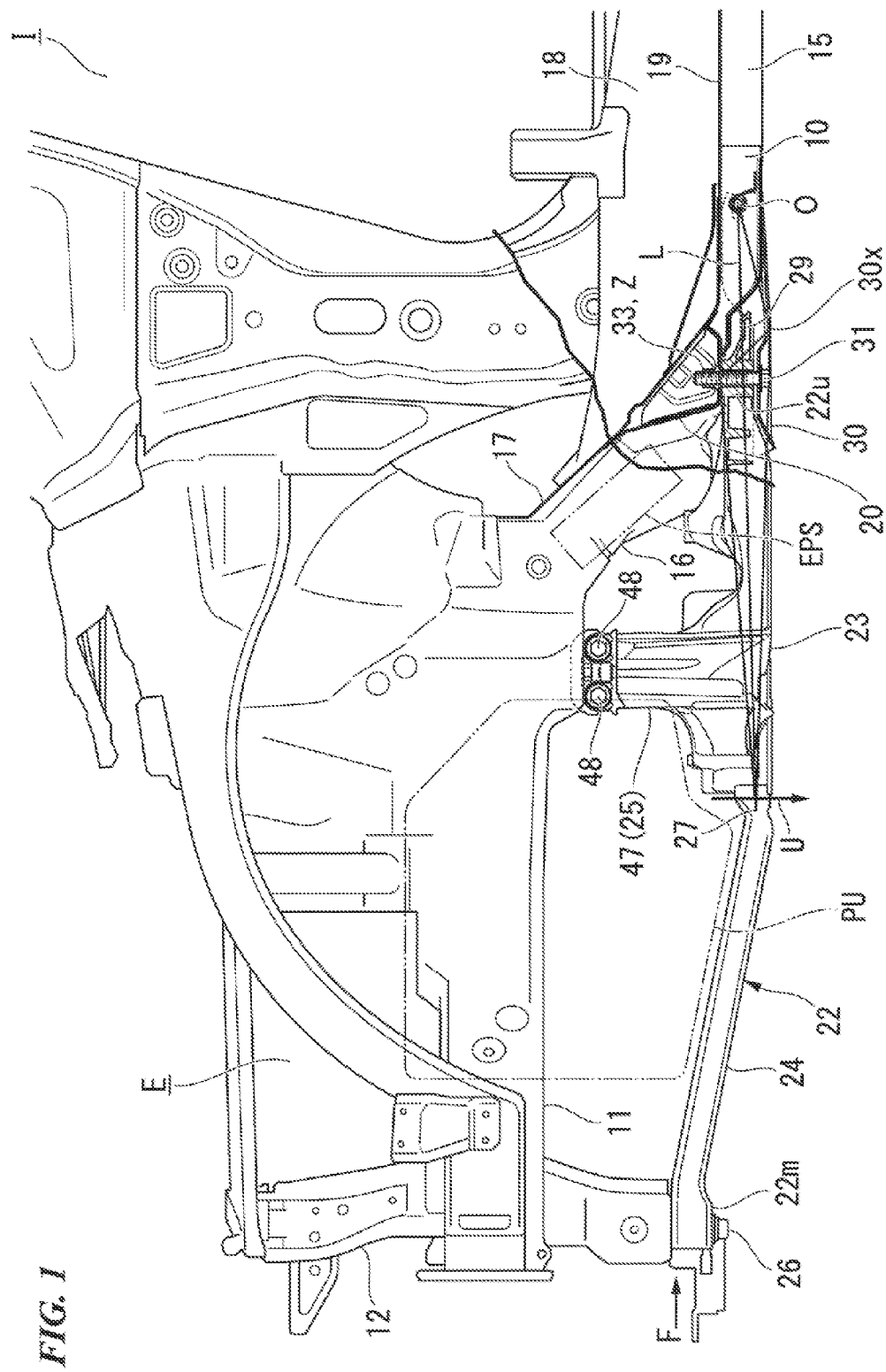
FIG. 1 is a partial cross-sectional side view of a vehicle according to a first embodiment of the present invention.
Figure 2:
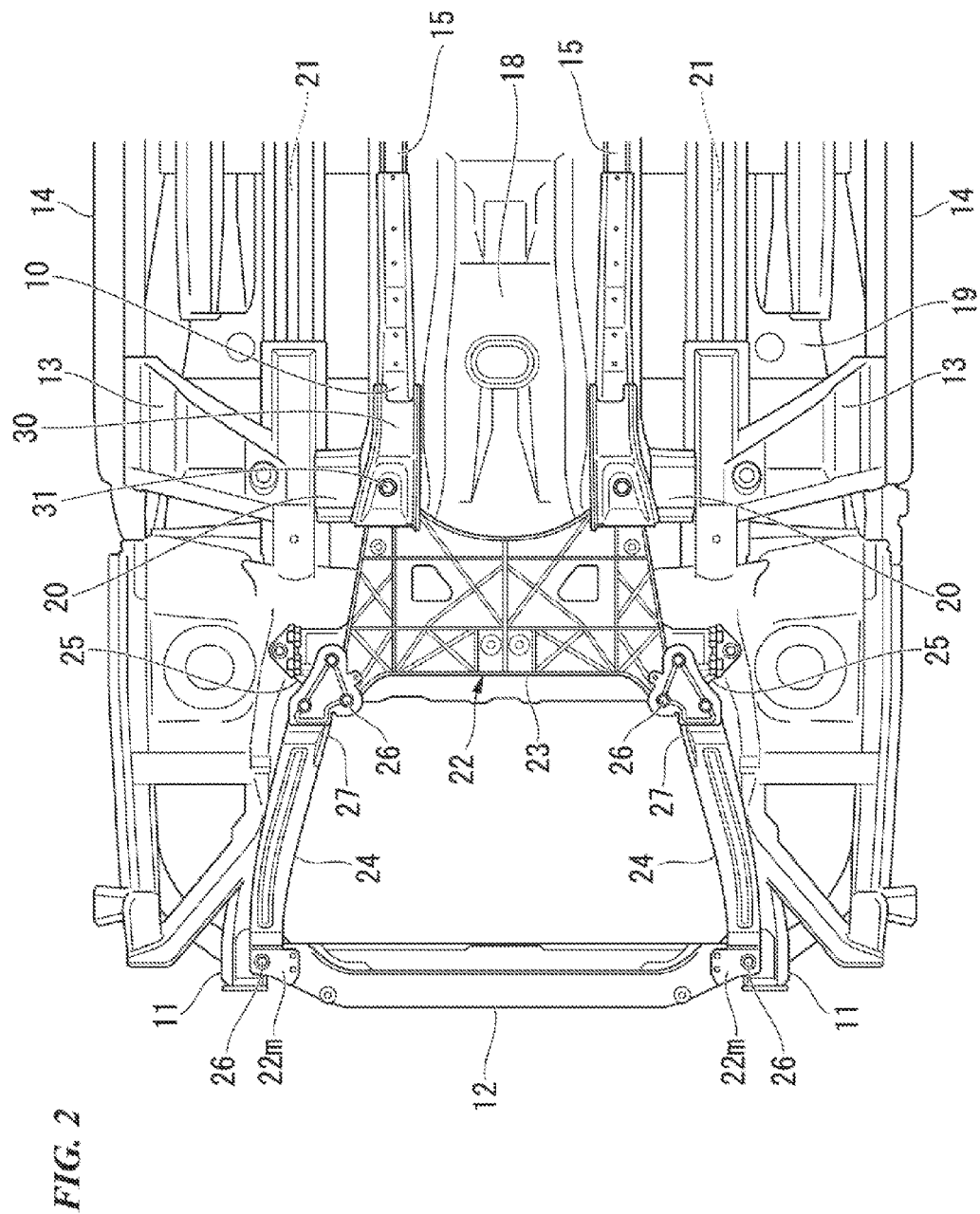
FIG. 2 is a bottom view of a front half region of the vehicle according to the first embodiment of the present invention.
Figure 3:
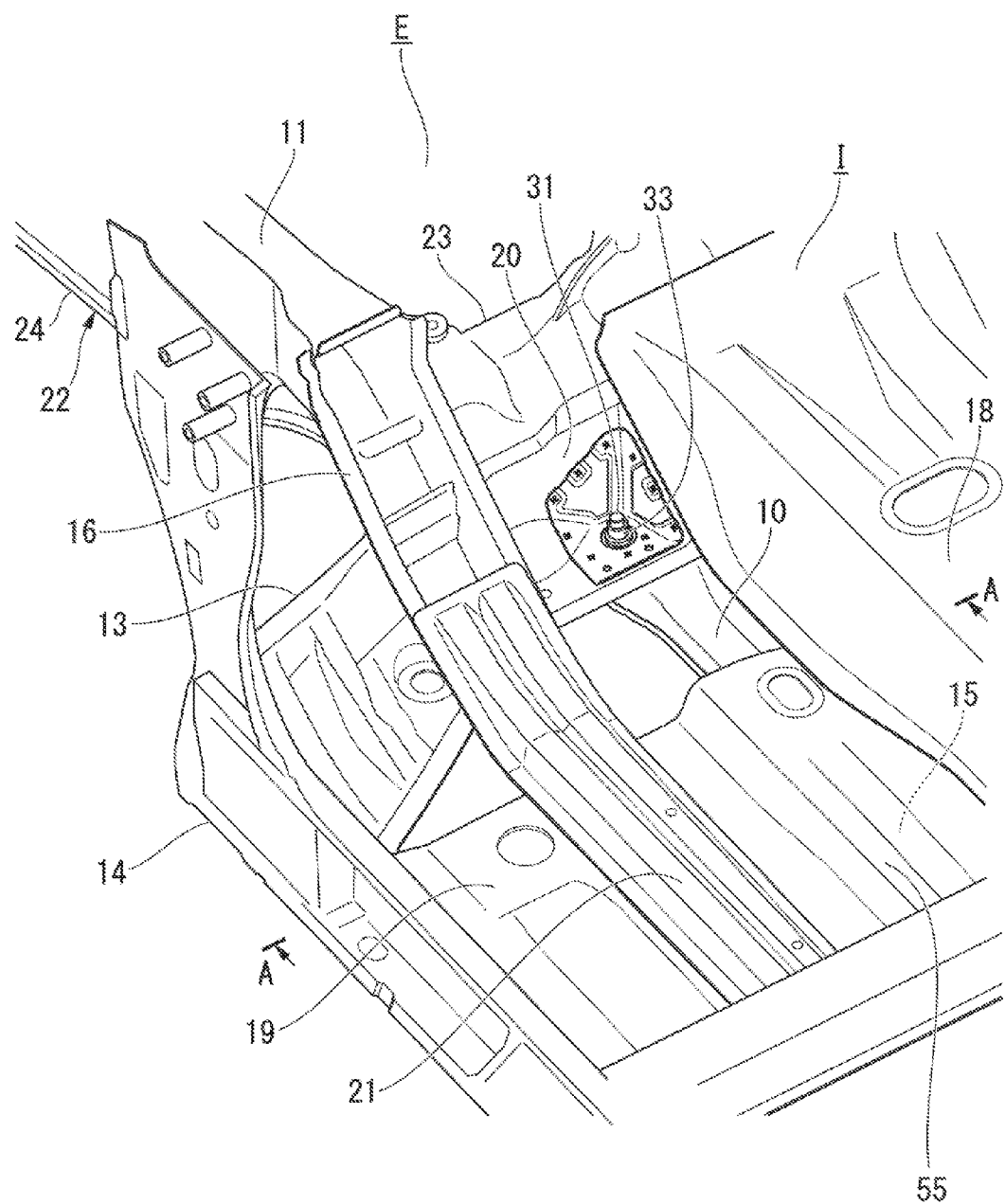
FIG. 3 is a perspective view when the vehicle according to the first embodiment of the present invention is viewed from a cabin side.

FIG. 1 is a view showing a left side surface on a front part side of a vehicle according to this embodiment in a partially cut away cross-sectional view. FIG. 2 is a view when a front part region of the vehicle is viewed from below. FIG. 3 is a view when a front part lower side of the vehicle is viewed obliquely from above.

As shown in FIGS. 1 to 3, a rear end portion of a dash lower panel 17 which separates a cabin I and an engine compartment E in front thereof is joined to a front end portion of a floor panel 19 facing the inside of the cabin I. The dash lower panel 17 is erected obliquely upward from a joint portion with the floor panel 19. In addition, in a central portion in a vehicle width direction of the floor panel 19, a floor tunnel portion 18 bulging upward is disposed along a vehicle body longitudinal direction. A front end portion of the floor tunnel portion 18 abuts onto the dash lower panel 17. In FIGS. 2 and 3, the dash lower panel 17 is omitted in the illustration.

On a front side of the cabin I, a pair of right and left front side frames 11 and 11 (side frames) which are main structural members on a vehicle body front part side are disposed along the vehicle body longitudinal direction. Both side portions of a front bulkhead 12 which supports a radiator (not shown) are attached to a front end portion of the front side frames 11 and 11. A power unit (not shown) for driving the vehicle is held by the front side frames 11 and 11.

As shown in FIG. 3, a rear end portion of the front side frame 11 is formed as a front side rear end 16 which is connected to a closed cross-sectional structure portion on the front part side, whose upper portion is open, and which has a cross-sectional U-shape. The front side rear end 16 extends to a rear side of the vehicle along a lower surface of the dash lower panel 17 and a lower surface of the floor panel 19. Then, the front side rear end 16 is joined to each lower surface of the dash lower panel 17 and the floor panel 19, thereby configuring a closed cross section which is continuous along the vehicle body longitudinal direction. In addition, the front side rear end 16 is connected to a side sill 14 which is a structural member of a lateral portion of the cabin I by an outrigger 13 which opens upward and is a cross-sectional U-shaped frame member.

A floor center frame 21 shown in FIG. 3 is attached to each upper surface side of the dash lower panel 17 and the floor panel 19, thereby forming a closed cross section continuous with the front side rear end 16 together with both panels 17 and 19.

On both sides of the floor tunnel portion 18 below the cabin I, floor tunnel frames 15 and 15 which open upward and are cross-sectional U-shaped frame members are arranged along the vehicle body longitudinal direction. A front end extension member 10 having a continuous U-shaped cross section is jointed to a front end portion of each floor tunnel frame 15. The floor panel 19 and the dash lower panel 17 are joined to each upper surface side of the floor tunnel frame 15 and the front end extension member 10. The floor tunnel frame 15 and the front end extension member 10 configure a closed cross section along the vehicle body longitudinal direction together with the floor panel 19 and the dash lower panel 17.

In this embodiment, the floor tunnel frame 15 and the front end extension member 10 configure an under-floor frame.

In addition, the front side rear ends 16 which are disposed at right and left in the vehicle width direction and the front end extension member 10 (under-floor frame, front end extension portion, and other vehicle body panel) are connected to each other by a lateral member 20 (support member substrate, cabin side support member, and vehicle body panel). The lateral member 20 is a plate-shaped member which opens upward and has a cross-sectional U-shape, and extends along the vehicle width direction so as to be continuous with the outrigger 13.

Therefore, the dash lower panel 17 is joined to the upper surface of the front side rear end 16, thereby forming the closed cross section along the vehicle body longitudinal direction which is continuous with the front side frame 11. The dash lower panel 17 is joined to each upper surface of the outrigger 13 and the lateral member 20, thereby forming the closed cross section along the vehicle width direction which connects the side sill 14 and the front side rear end 16, and the front side rear end 16 and floor tunnel frame 15.

The front side rear end 16, the outrigger 13, and the lateral member 20 have respective flange portions in upper portions of the opened cross sections. These flange portions are jointed to the lower surface of the floor panel 19 and dash lower panel 17.

A sub-frame 22 which supports a suspension component (not shown) is attached to a lower portion of the front side frames 11 and 11.

Figure 4:
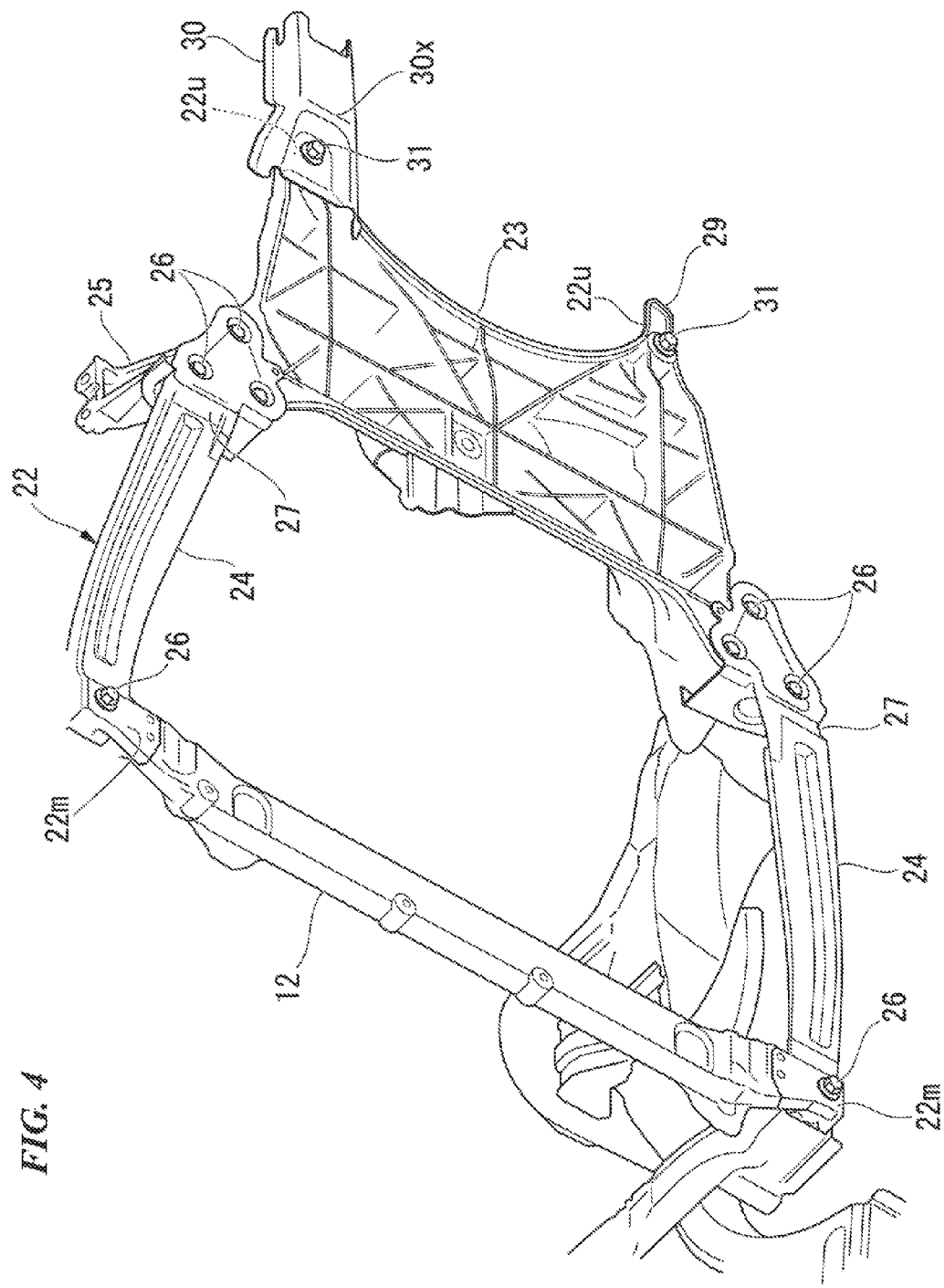
FIG. 4 is a perspective view when a sub-frame of the vehicle according to the first embodiment of the present invention is viewed from below.

FIG. 4 is a view when the sub-frame 22 is viewed from below. As shown in FIG. 4, the sub-frame 22 includes front fastening portions 22m and 22m (separate side fastening portions) which are fastened to the front bulkhead 12 attached to a front end portion (extension end) of the front side frames 11 and 11 on both right and left sides, rear fastening portions 22u and 22u (adjacent side fastening portions) which are fastened from below and fixed to the lateral member 20 below the front part of the cabin I, central bending points 27 and 27 which are bent down at a substantially central position in the longitudinal direction between the front fastening portions 22m and 22m and the rear fastening portions 22u and 22u, when a collision load in the longitudinal direction is input to the vehicle, and upper portion attachment arms 25 and 25 which are disposed at a position close to a rear portion side of the central bending points 27 and 27, and which are fastened to a lower surface on the rear portion side of the front side frames 11 and 11.

In addition, the sub-frame 22 is mainly configured to have a sub-frame main body 23 which is cast using an aluminum alloy, and a pair of right and left extension arms 24 and 24 which extend forward from both front end side portions of the sub-frame main body 23 in a flared shape and are press-formed using a light alloy or steel. An electric power steering device EPS (refer to FIG. 1) is arranged (supported) on an upper surface side of the sub-frame main body 23.

As shown in FIG. 2, when viewed from a plane, the sub-frame main body 23 is a member having a shape including a rear edge bent so that a central portion is recessed in a concave shape, right and left lateral edges linearly extending forward so as to open outward, and a front edge linearly extending in the vehicle width direction. The sub-frame main body 23 has a plurality of vertical ribs (refer to FIG. 4) on a lower surface side, thereby contributing to decreased weight and improved rigidity.

The above-described rear fastening portions 22u and 22u are disposed at right and left end portions on a rear side of the sub-frame main body 23. The above-described upper portion attachment arms 25 and 25 are disposed at right and left end portions on a front side of the sub-frame main body 23.

A rear end portion of the respective right and left extension arms 24 is fixed to a lower surface on a front end side of the sub-frame main body 23 by a plurality of bolts 26. Then, a front edge portion of the respective extension arms 24 serves as the above-described front fastening portion 22m of the sub-frame 22, and the front fastening portion 22m is fastened and fixed to a lower corner portion of the front bulkhead 12 by a bolt 26.

As shown in FIG. 1, the vicinity of the fastening portion between the respective extension arms 24 and the sub-frame main body 23 is narrowed when viewed from a side surface. This narrowed portion serves as the above-described central bending point 27. The central bending point 27 is not usually bent at all. However, when a collision load F in the longitudinal direction which has a predetermined value or greater is input to the vehicle, the central bending point 27 serves as a starting point from which the sub-frame 22 is bent down in a substantial center in the longitudinal direction. Here, as shown in FIG. 1, the respective right and left extension arms 24 are configured so that a ground height on the front end side thereof is higher than a ground height on the rear end side in a state where the sub-frame 22 is mounted on the vehicle.

Figure 5:
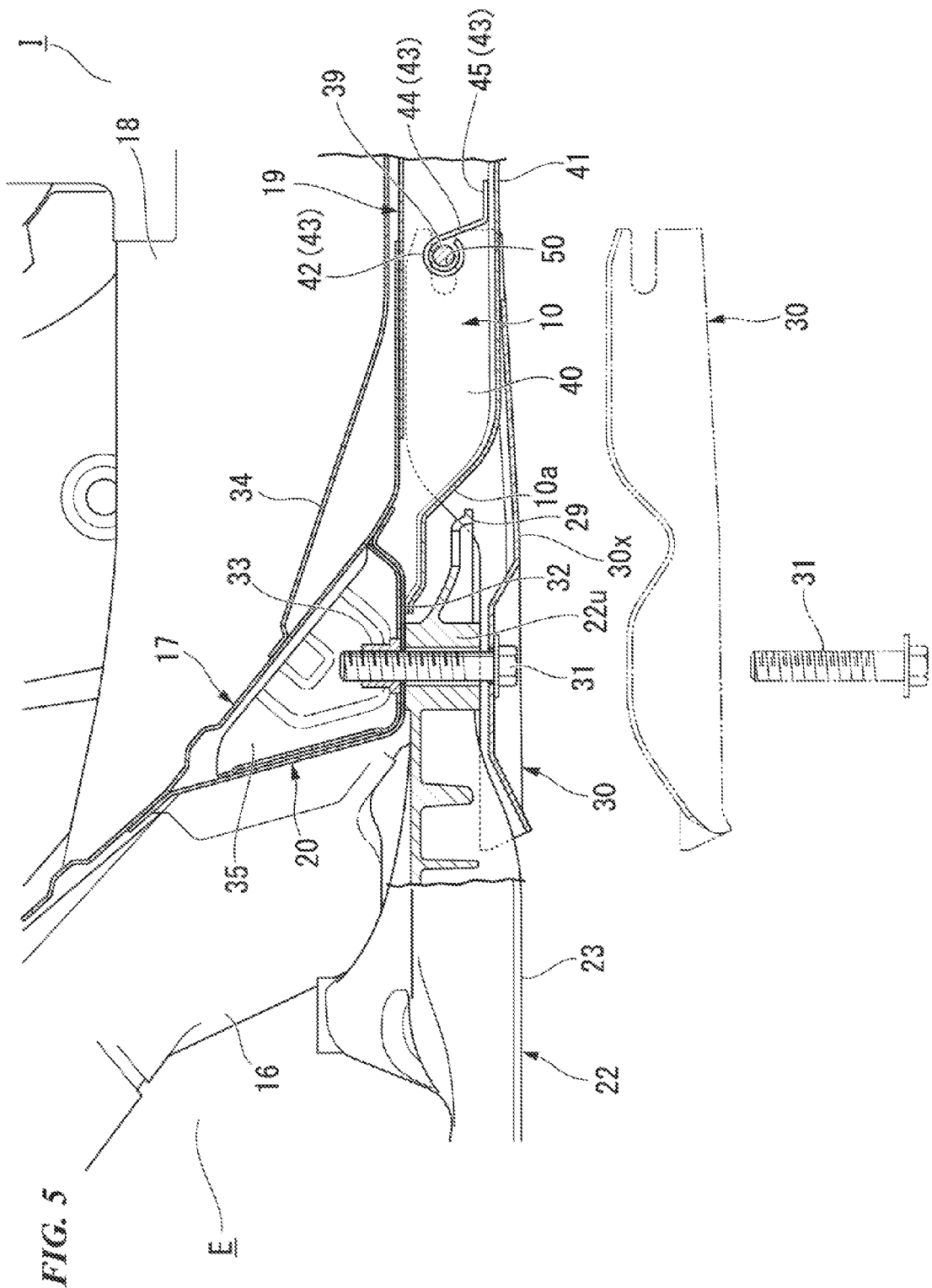
FIG. 5 is an enlarged cross-sectional view corresponding to a cross-sectional portion in FIG. 1 according to the first embodiment of the present invention.

FIG. 5 is an enlarged view showing a connection portion between the rear fastening portion 22u of the sub-frame main body 23 and a front part side lower region of the cabin I.

As shown in FIG. 5, the right and left rear fastening portions 22u of the sub-frame main body 23 are configured to have a cylindrical thick boss portion which protrudes to an upper surface side and a lower surface side. Then, an extension piece 29 extending from the rear fastening portion 22u in a direction to the front end extension member 10 (direction to the under-floor frame) is disposed to project in the respective rear fastening portions 22u. The extension piece 29 is configured so that a distal end portion side is formed in an arc shape in a plan view, and a lower surface side is hollowed in a hollow shape. In addition, a distal end portion of the extension piece 29 opposes a front surface of the front end extension member 10 by leaving a predetermined gap therebetween in a state where the sub-frame 22 is attached to the vehicle body.

A link stay 30 which connects the right and left rear fastening portions 22u and the right and left front end extension members 10 arranged on the rear side of the right and left rear fastening portions 22u is attached to both of the right and left rear fastening portions 22u and the right and left front end extension members 10.

A front end portion (first end portion side) of the link stay 30 is fastened and fixed to a lower surface of the corresponding rear fastening portion 22u so as to cover a lower portion and both side portions of the rear fastening portion 22u. Specifically, the each right and left rear fastening portions 22u of the sub-frame 22 are arranged so as to overlap a lower surface of an attachment seat 32 of the lateral member 20 in a front part lower portion of the cabin I, and a front end portion of the link stay 30 overlaps the lower surface of the corresponding rear fastening portion 22u. In this state, the front end portion of the link stay 30 is jointly fastened and fixed to the corresponding rear fastening portion 22u and the attachment seat 32 of the lateral member 20 by a fastening bolt 31 (first fastening member, fastener, bolt). That is, the front end portion of the link stay 30 is jointly fastened and fixed to the rear fastening portion 22u and the corresponding lateral member 20 by the fastening bolt 31.

A front wall of the lateral member 20 is formed so as to be lowered obliquely rearward. The attachment seat 32 of the lateral member 20 is formed so as to be substantially horizontal to a portion of a lower wall. A weld nut 33 (first fastening member, head portion, fastener, nut) to which a distal end portion of the fastening bolt 31 is screwed is fixed to an upper surface side of the attachment seat 32 of the lateral member 20. The fastening bolt 31 penetrates the link stay 30, the rear fastening portion 22u, and the lateral member 20 from a lower side of the link stay 30 in a substantially vertical direction. A distal end portion of the fastening bolt 31 is fitted into the weld nut 33.

In contrast, a support wall 10a which is tilted obliquely upward and then is bent stepwise substantially horizontally is disposed at the front end extension member 10 (under-floor frame, front end extension portion, other vehicle body panel) whose front end portion is coupled to the lateral member 20. In a state where the sub-frame 22 is attached to the vehicle body, a distal end portion of the above-described extension piece 29 opposes a front surface of the support wall 10a by leaving a predetermined gap therebetween. The distal end portion of the extension piece 29 comes into contact with the front surface of the support wall 10a when the collision load in the vehicle body longitudinal direction is input and the rear fastening portion 22u of the sub-frame 22 is displaced to the rear side of the vehicle body.

A reinforcement portion 34 shown in FIG. 5 is joined to an upper surface of a rising portion of the dash lower panel 17, which is located above a joint portion between the front end extension member 10 and the lateral member 20, and reinforces the joint portion between the front end extension member 10 and the lateral member 20.

Figure 6:
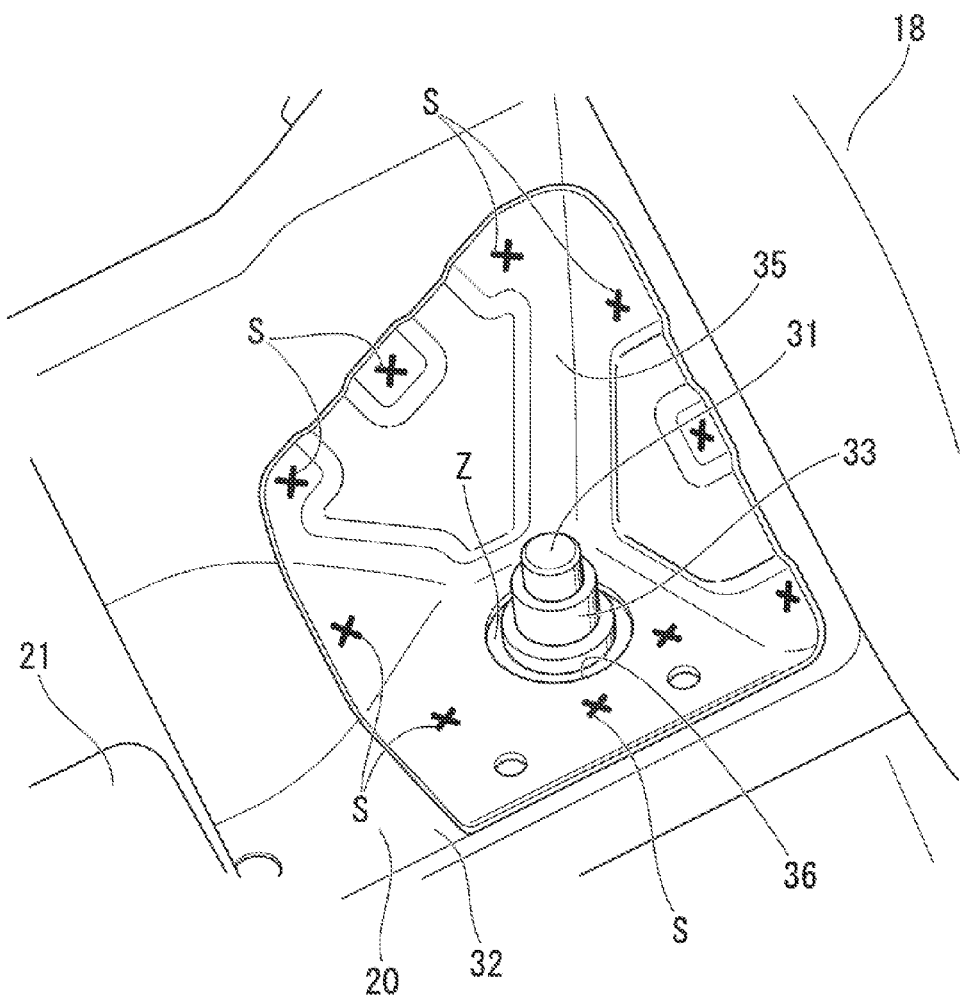
FIG. 6 is an enlarged perspective view of a portion in FIG. 3 according to the first embodiment of the present invention.

FIG. 6 is an enlarged view showing an installed portion of the lateral member 20 shown in FIG. 3. As shown in FIG. 6, a reinforcement plate 35 (cabin side support member) formed of a metal plate which is thicker than the lateral member 20 is joined in a region across the upper surface of the attachment seat 32 of the lateral member 20 and an inner surface of the front wall and the lateral wall on the inner side in the vehicle width direction. An escape hole 36 (hole, insertion hole) surrounding the outside of the weld nut 33 with a separation width on the lateral member 20 is formed in the reinforcement plate 35. A periphery of the escape hole 36 of the reinforcement plate 35 is spot-welded to the upper surface of the lateral member 20 at multiple locations.

At least one spot-welded location of the reinforcement plate 35 is set to be the nearest position just behind the escape hole 36. In FIG. 6, the spot-welded point is shown by the reference numeral S. The spot-welded point S can receive a force in which the reinforcement plate 35 is about to move rearward with respect to the attachment seat 32 when the collision load in the vehicle body longitudinal direction is input, as a force acting in a shearing direction which is favorable in terms of strength.

The lateral member 20 is reinforced by the reinforcement plate 35 as described above. In addition, the weld nut 33 is in contact with only a region inside the escape hole 36 on the attachment seat 32 of the lateral member 20. For this reason, the strength in the vertical direction around the contact portion is partially weakened. In particular, a portion in contact with an edge portion of the escape hole 36 has rigidity increased by the reinforcement plate 35. Therefore, when a load acting in the vertical direction is input to the fastening bolt 31, stress is likely to concentrate on a narrow range around the weld nut 33. In this embodiment, an annular region between the escape hole 36 on the lateral member 20 and the weld nut 33 serves as a weak portion Z.

Accordingly, when the collision load in the vehicle body longitudinal direction is input, if an excessive load in a pulling-down direction acts on the fastening bolt 31, the weak portion Z on the lateral member 20 is broken, and the fastening bolt 31 is extracted downward below the lateral member 20.

In this embodiment, the lateral member 20 and the reinforcement plate 35 configure a cabin side support member which supports the rear end portion of the sub-frame 22, and the lateral member 20 configures a support member substrate.

Figure 7:
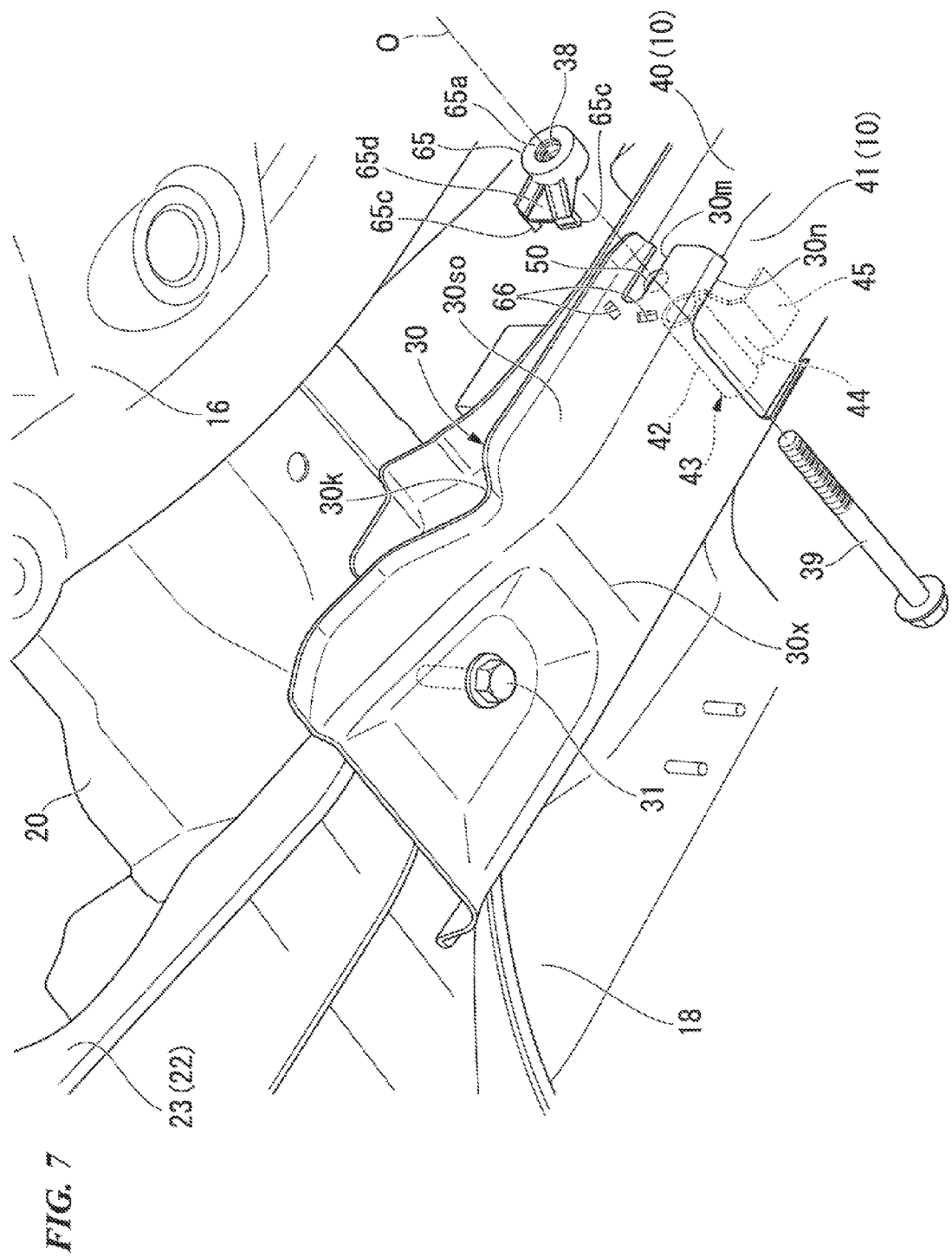
FIG. 7 is a perspective view when an attachment portion of a link stay according to the first embodiment of the present invention is viewed from below.
Figure 8:
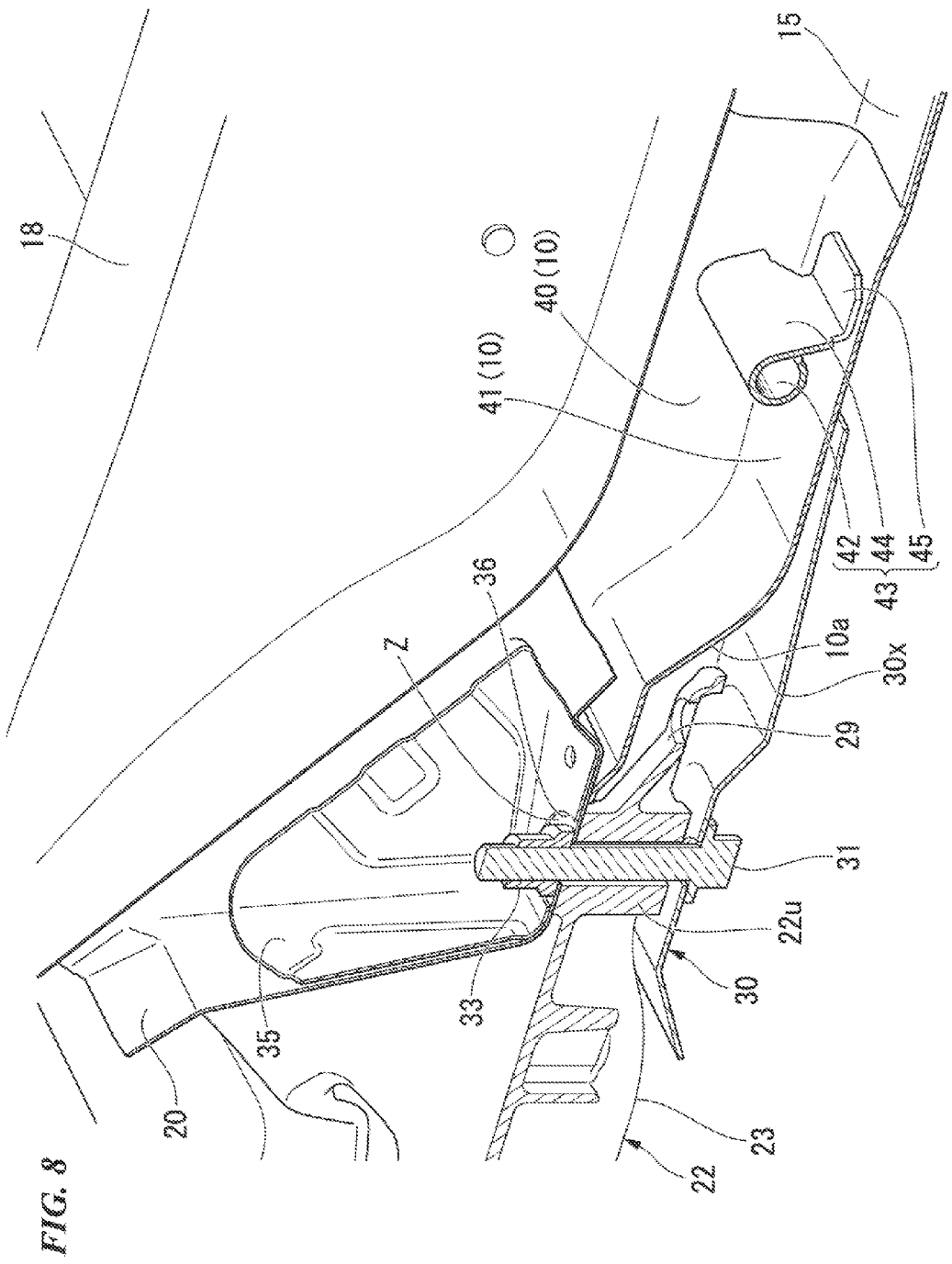
FIG. 8 is a vertical cross-sectional perspective view showing the attachment portion of the link stay according to the first embodiment of the present invention.

FIGS. 7 and 8 are views showing a fastening portion of the link stay 30 with respect to the sub-frame main body 23 and the front end extension member 10 (under-floor frame, front end extension portion, other vehicle body panel).

As shown in FIGS. 5, 7, and 8, the front end extension member 10 is a member which includes both lateral walls 40 and a bottom wall 41, whose upper side is open, and which has a cross-sectional U-shape. In addition, a support bracket 43 including a bolt holding portion 42 extending along the vehicle width direction is disposed between the lateral walls 40 and 40 of the rear portion of the front end extension member 10. The support bracket 43 includes the above-described bolt holding portion 42 which is formed by rolling a plate material into a cylindrical shape, an arm portion 44 extending obliquely rearward and downward from the bolt holding portion 42, and an attachment portion 45 extending to a terminal of the arm portion 44 so as to be horizontally bent. In the support bracket 43, the attachment portion 45 is fixedly welded onto the bottom wall 41 of the front end extension member 10. A through-hole 50 is formed at a position where both lateral walls 40 and 40 correspond to both end portions of the bolt holding portion 42.

Figure 13:
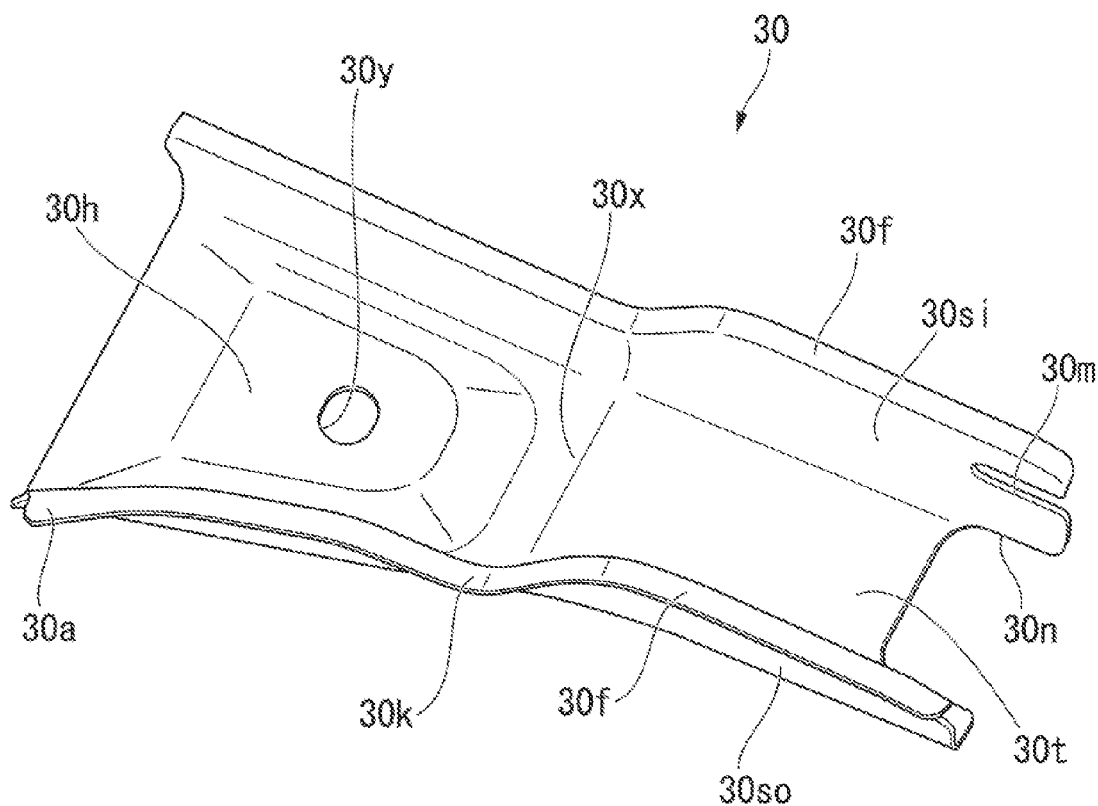
FIG. 13 is a perspective view when the link stay according to the first embodiment of the present invention is viewed from above.
Figure 14:
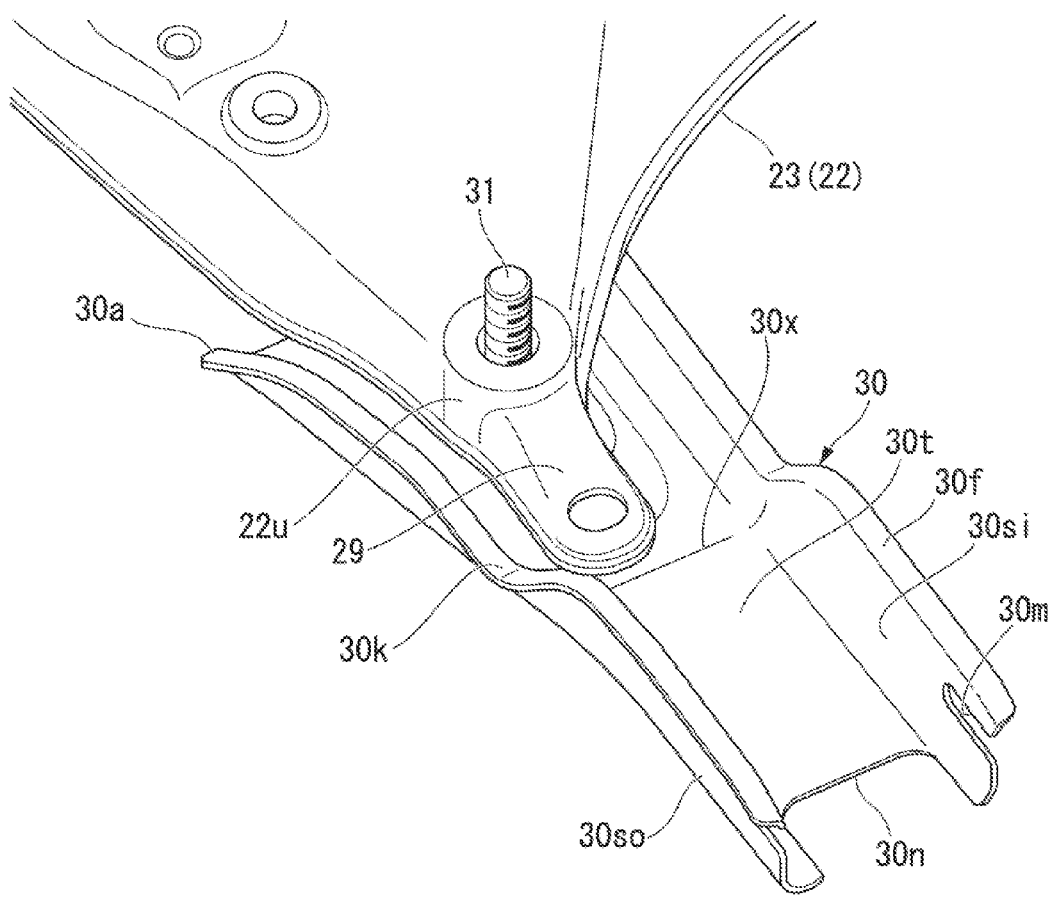
FIG. 14 is a perspective view of an attachment portion between the sub-frame and the link stay according to the first embodiment of the present invention.
Figure 15:
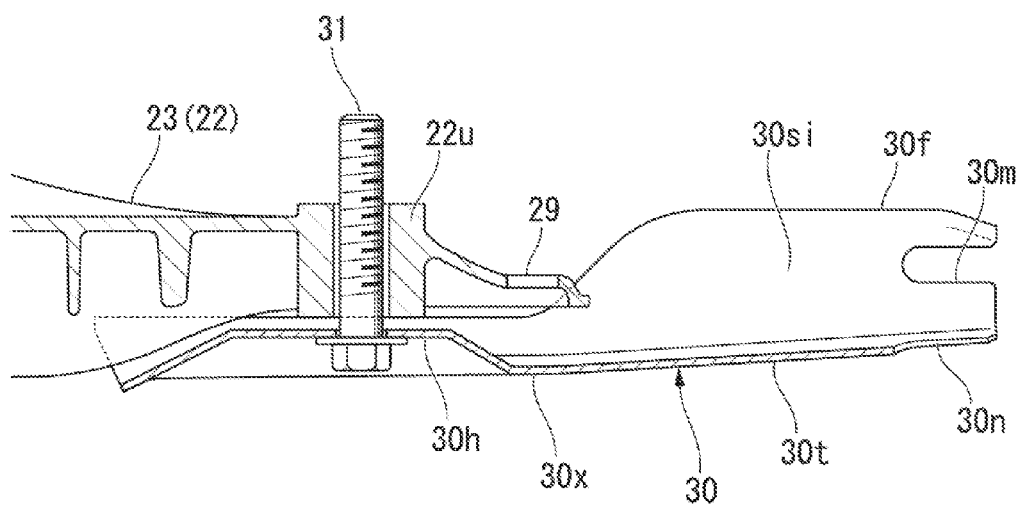
FIG. 15 is vertical cross-sectional view of the attachment portion between the sub-frame and the link stay according to the first embodiment of the present invention.

As shown in FIG. 7, the front end extension member 10 is fastened and fixed to lateral walls 30so and 30si (refer to FIG. 13) of a rear end portion (second end portion side) of the link stay 30 by a support bolt 39 (second fastening member). The support bolt 39 is inserted into the bolt holding portion 42 of the support bracket 43 through the through-hole 50 on the lateral wall 40 of the front end extension member 10. A nut 38 (second fastening member) is screwed to a distal end portion penetrating both lateral walls 40. The nut 38 is assembled to the inner side of a nut cover 65 formed of a resin as will be described later.

Figure 9:
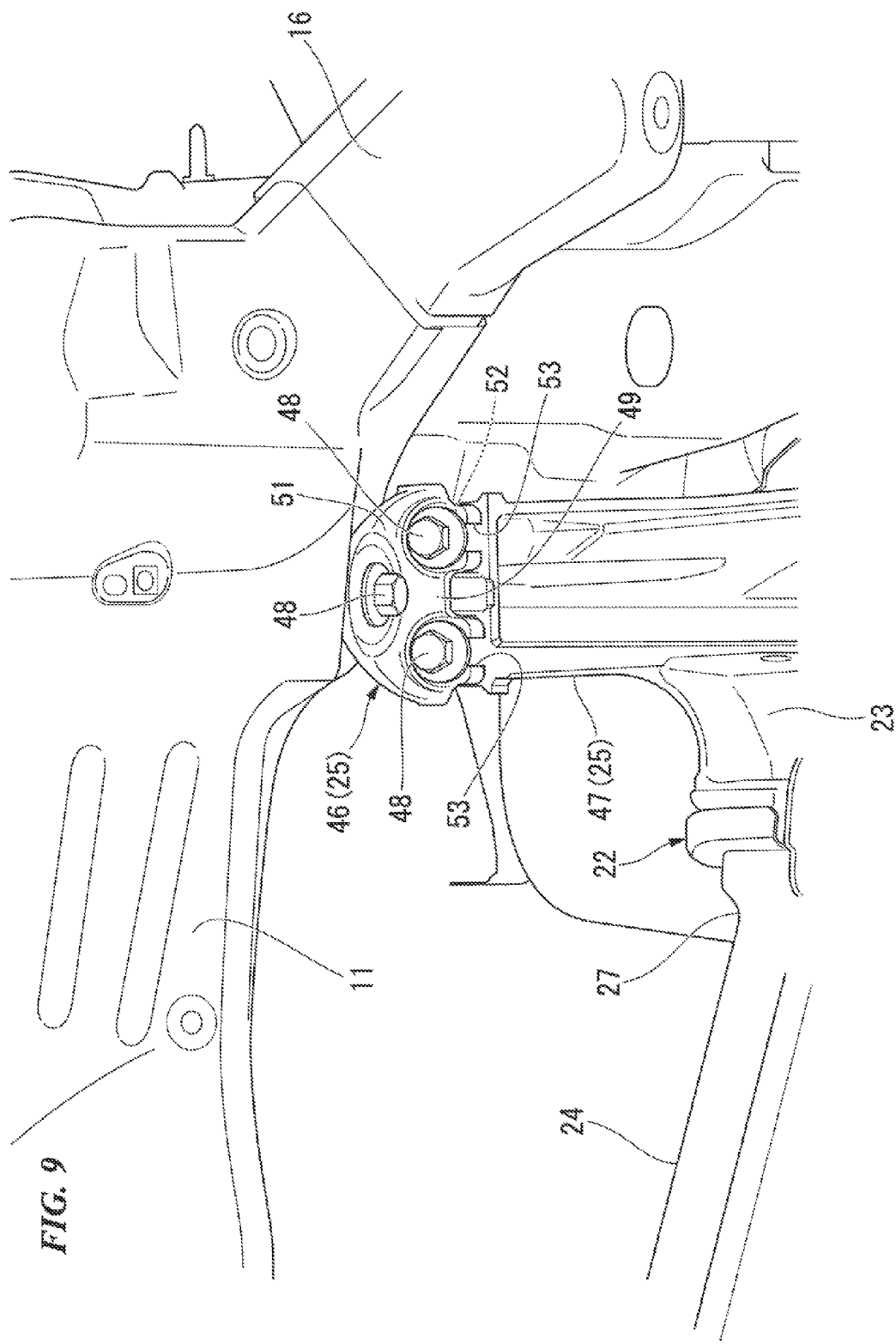
FIG. 9 is a perspective view showing an attachment portion of an upper attachment arm according to the first embodiment of the present invention.
Figure 10:
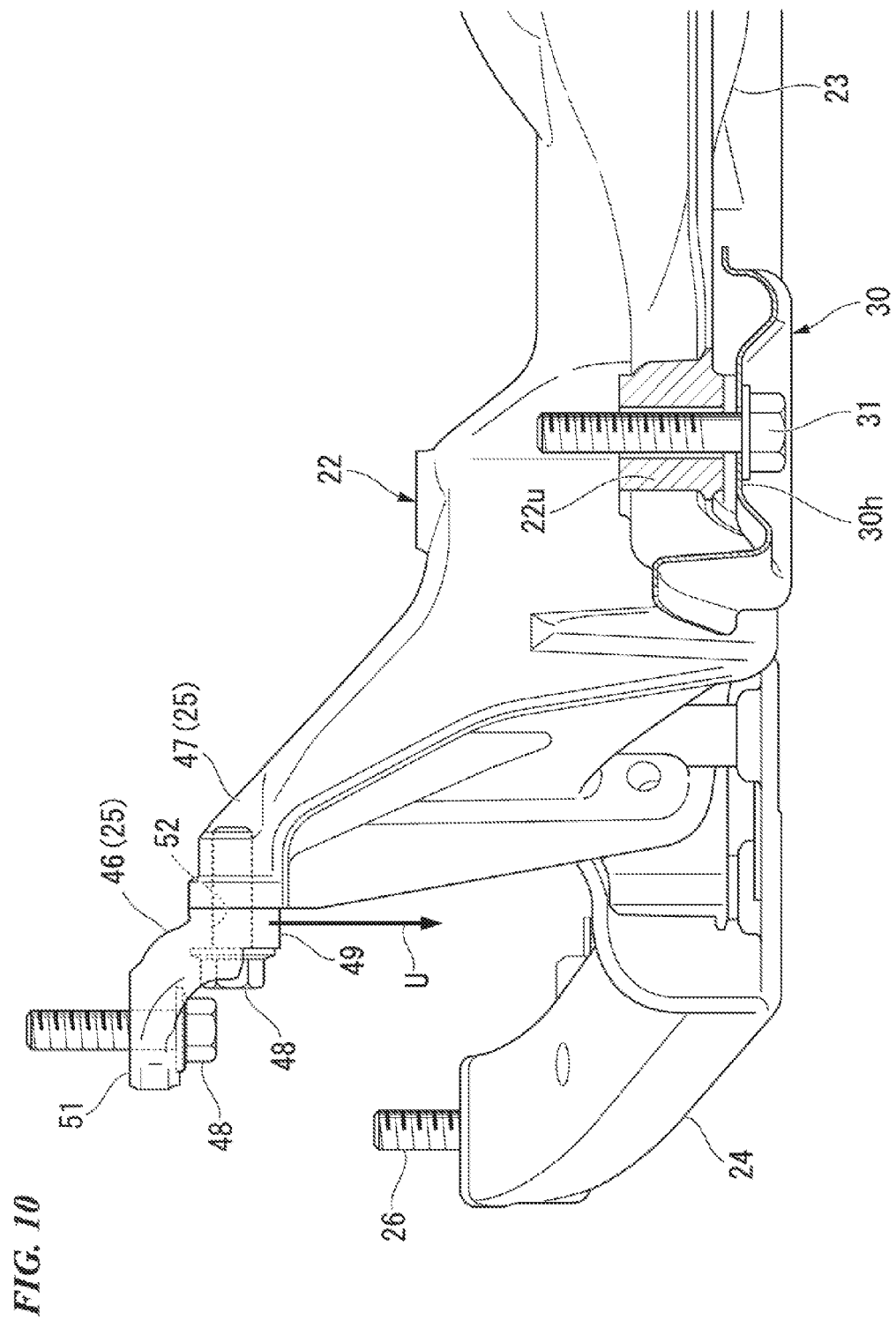
FIG. 10 is a perspective view when the sub-frame according to the first embodiment of the present invention is viewed from behind in a horizontal cross section of a rear fastening portion.

FIG. 9 is a view showing a fixing portion between the sub-frame main body 23 and the upper portion attachment arm 25. FIG. 10 is a view showing each fixing portion between the sub-frame main body 23 and the upper portion attachment arm 25, and between the sub-frame main body 23 and the rear fastening portion 22u.

As shown in FIGS. 9 and 10, the upper portion attachment arm 25 is configured to have an upper portion attachment arm main body 47 extending upward and a connection bracket 46 attached to the upper portion attachment arm main body 47. The upper portion attachment arm 25 is fixed to a lower surface of the front side frame 11 via the connection bracket 46. The connection bracket 46 is a member which is attached to an upper portion of the upper portion attachment arm main body 47 and is formed to be oriented outward in an L-shape in a rear view. The connection bracket 46 includes a base portion 49 which is fixed to the upper portion attachment arm main body 47 by two fixing bolts 48 and 48 extending in the horizontal direction and an attachment portion 51 which is fixed to the lower surface of the front side frame 11 by one fixing bolt 48 extending in the vertical direction. The connection bracket 46 is formed into an L-shape by the base portion 49 and the attachment portion 51.

An insertion hole 52 of the fixing bolt 48 is formed in the base portion 49, and a notched portion 53 which causes a portion of the insertion hole 52 to open downward is formed in the base portion 49. Accordingly, if the upper portion attachment arm 25 receives a load acting so as to pull down the upper portion attachment arm 25 at the time of vehicle collision, the connection bracket 46 is left in the front side frames 11 and 11, and the two fixing bolts 48, which fix the upper portion attachment arm main body 47 and the connection bracket 46, break the notched portion 53. The upper portion attachment arm main body 47 is moved downward, and downward displacement of the sub-frame 22 is permitted.

FIGS. 11 to 15 are views showing a detailed structure of the link stay 30. As shown in FIGS. 11 to 15, the link stay 30 is formed in a cross-sectional U-shape by a bottom wall 30t and both lateral walls 30so and 30si. The bottom wall 30t in the front end is jointly fastened to the attachment seat 32 of the lateral member 20 together with the rear fastening portion 22u of the sub-frame main body 23 by the fastening bolt 31. The lateral walls 30so and 30si in the rear end are fastened to the front end extension member 10 in the front portion of the floor tunnel frame 15 by the support bolt 39 having an axis in the vehicle width direction (refer to FIG. 7).

An upper edge flange portion 30f laterally extending in order to prevent opening is formed in an upper edge of both lateral walls 30so and 30si of the link stay 30. A V-shaped recess 30k is formed in the central portion in the longitudinal direction, at an upper edge portion of the lateral wall 30so which is outside in the vehicle width direction. A tilted portion 30a which is gradually lowered forward is formed on a front side of the upper edge portion of the lateral wall 30so which is outside in the vehicle width direction.

The lateral wall 30si which is inside in the vehicle width direction of the link stay 30 has a same shape with the lateral wall 30so which is outside in the vehicle width direction from the rear end side until a position of a bottom portion of the V-shaped recess 30k on the lateral wall 30so which is outside in the vehicle width direction. However, unlike the lateral wall 30so which is outside in the vehicle width direction, the lateral wall 30si extends up to the front end portion side while maintaining the height of the bottom portion of the V-shaped recess 30k on the lateral wall 30so which is outside in the vehicle width direction. Then, both lateral walls 30so and 30si of the link stay 30 are arranged so as to laterally interpose both lateral walls 40 and 40 of the front end extension member 10 therebetween (refer to FIG. 5).

In the front portion of the link stay 30, a recess 30h which comes into contact with the lower surface of the attachment seat 32 of the lateral member 20 is formed by causing a portion of the bottom wall 30t to be recessed upward. The recess 30h is formed so as to be obliquely tilted and to fall down from a bottom surface position of the bottom wall 30t. The recess 30h increases the strength on the front side of the link stay 30. A bolt hole 30y of the fastening bolt 31 is formed in the recess 30h.

Figure 12:
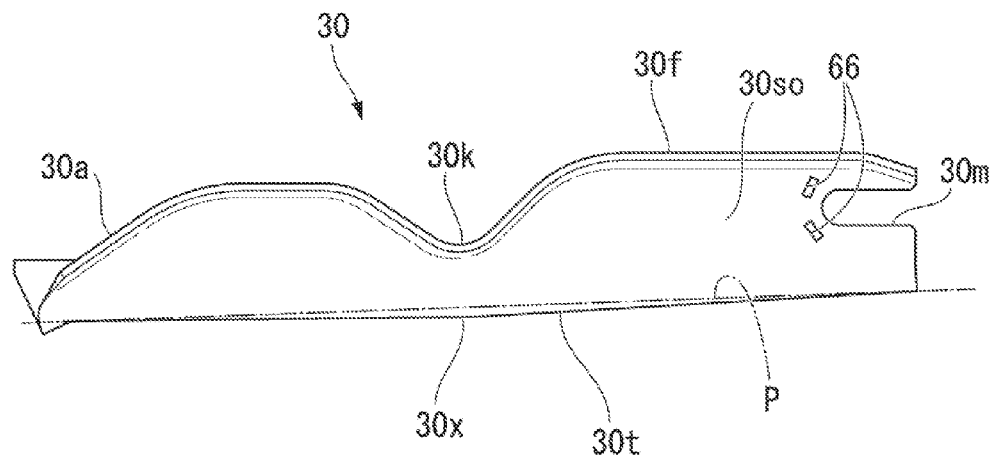
FIG. 12 is a side view of the link stay according to the first embodiment of the present invention.

A downward convex portion 30x which is convex downward is formed at a position close to the rear portion of the recess 30h of the link stay 30 by press molding. The downward convex portion 30x is arranged at a substantially central position in the longitudinal direction of the link stay 30. As shown in FIG. 12, the downward convex portion 30x is a portion protruding slightly downward with respect to a straight line P when the front end portion and the rear end portion are connected by the straight line P in a side view. This portion longitudinally corresponds to a position where the V-shaped recess 30k is formed at the upper edge portion of the lateral walls 30so and 30si. The downward convex portion 30x serves as a starting point from which the link stay 30 is bent. The downward convex portion 30x forms a ridge in the width direction of the bottom wall 30t of the link stay 30.

A notched groove 30m (bolt insertion portion, lateral wall notch, penetrating portion) which is notched to have a constant width from a rear end to a front side is disposed on the lateral walls 30so and 30si on both sides of the rear portion of the link stay 30. As shown in FIG. 7, the notched groove 30m is a groove by which the bolt holding portion 42 of the support bracket 43 and a shaft portion of the support bolt 39 inserted into the through-hole 50 of the front end extension member 10 are supported in a penetrating state. The rear end portion of the link stay 30 is fastened and fixed to the front end extension member 10 in such a manner that the support bolt 39 and the nut 38 are fitted to each other outside the notched groove 30m of both lateral walls 30so and 30si. Therefore, the shaft portion of the support bolt 39 is configured to serve as a fastening center O of the rear end portion of the link stay 30.

In addition, a notched portion 30n extending from an end edge to a front side is disposed on the bottom wall 30t of the rear end portion of the link stay 30. The notched portion 30n functions as an escape portion in which the bottom wall 30t does not interfere with the bottom wall 41 of the front end extension member 10 when the front side of the link stay 30 is rotated downward about the axis of the fastening center O of the rear end portion of the link stay 30, thereby permitting the rotation of the link stay 30.

Figure 16:
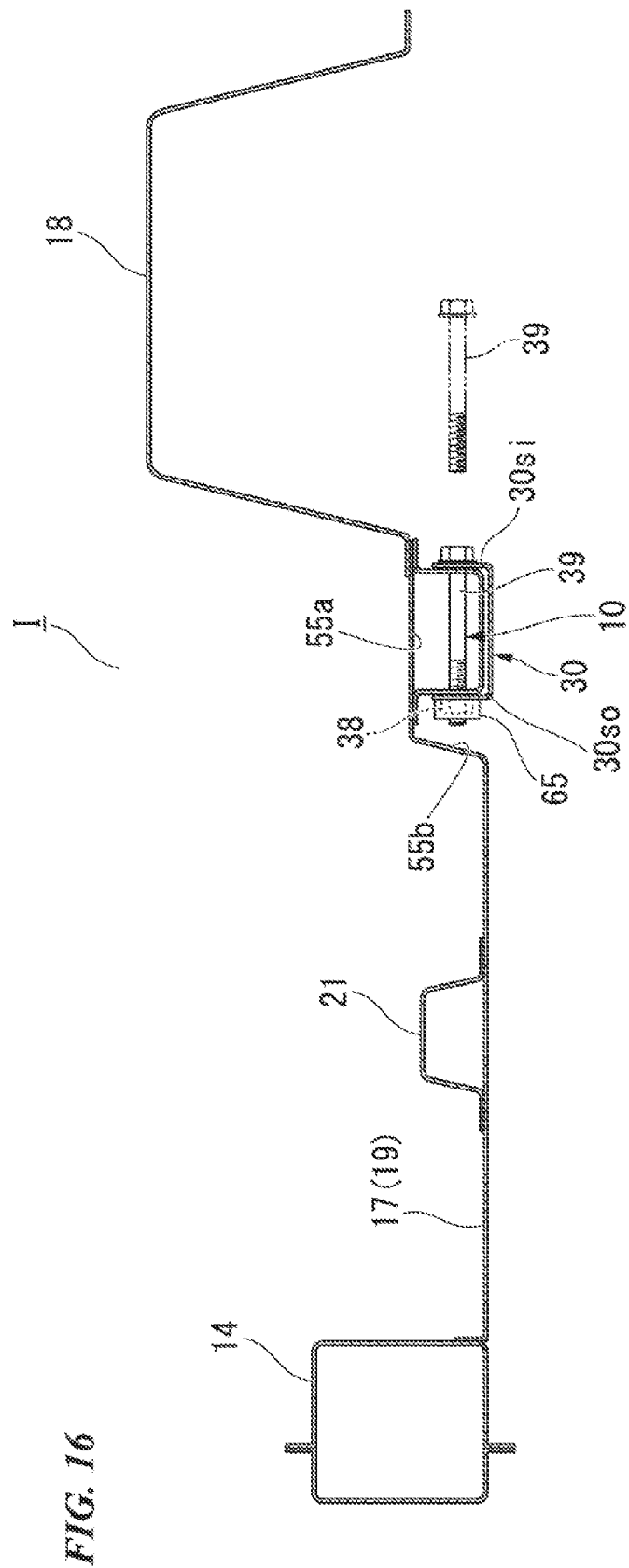
FIG. 16 is a cross-sectional view corresponding to cross section A-A in FIG. 3 according to the first embodiment of the present invention.

FIG. 16 is a view showing a cross section including a fastening portion on the rear end side of the link stay 30 below the cabin I. As shown in FIGS. 3 and 16, the dash lower panel 17 and the floor panel 19 below the cabin I serve as a stepped portion 55 in which a portion adjacent to the floor tunnel portion 18 in the center in the vehicle width direction is higher by one step. A region which is outside in the vehicle width direction which is adjacent to the stepped portion 55 is connected to the side sill 14 while a substantially constant height is maintained. The stepped portion 55 extends along the vehicle body longitudinal direction so as to be parallel to the floor tunnel portion 18. The above-described floor tunnel frame 15 and front end extension member 10 are joined to an upper wall lower surface 55a of the stepped portion 55. The lateral wall 30so which is outside in the vehicle width direction of the link stay 30 which is attached to the front end extension member 10 opposes an under-floor lateral surface 55b on a vertical wall of the stepped portion 55 so as to be substantially parallel thereto.

Incidentally, as shown in FIG. 16, the rear end portion of the link stay 30 is fastened and fixed to the front end extension member 10 by the above-described support bolt 39 and nut 38. The nut 38 is attached to the lateral wall 30so which is outside in the vehicle width direction of the link stay 30 (lateral wall on a side separating from the floor tunnel portion 18) together with the nut cover 65. The support bolt 39 is fitted into the nut 38 from a lower side of the floor tunnel portion 18 having no vertical wall of the stepped portion 55.

Figure 17:
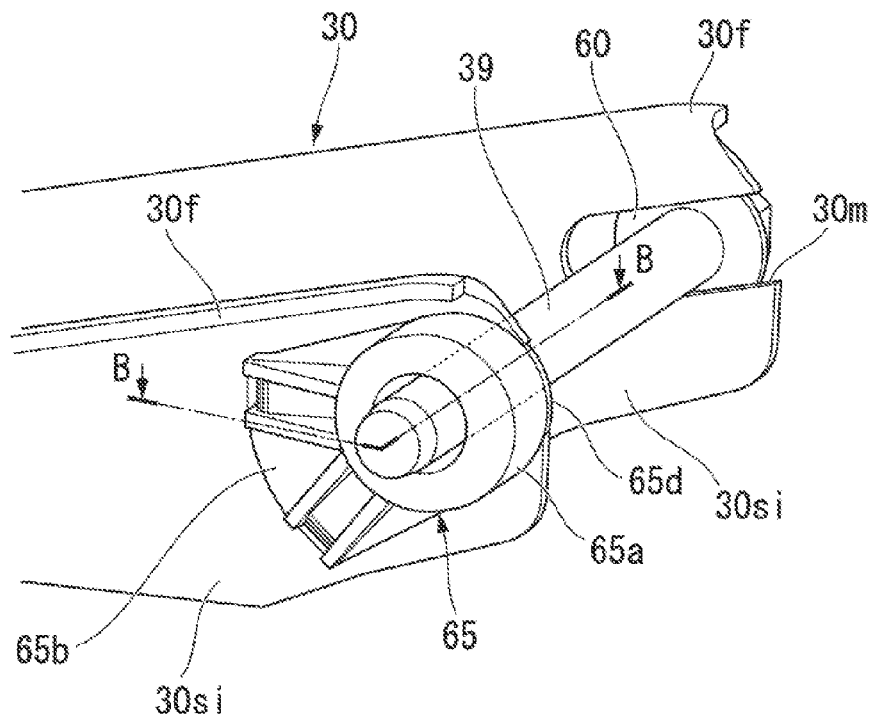
FIG. 17 is a perspective view when a fastening portion on a rear portion side of the link stay according to the first embodiment of the present invention is viewed from outside in a vehicle width direction.
Figure 18:
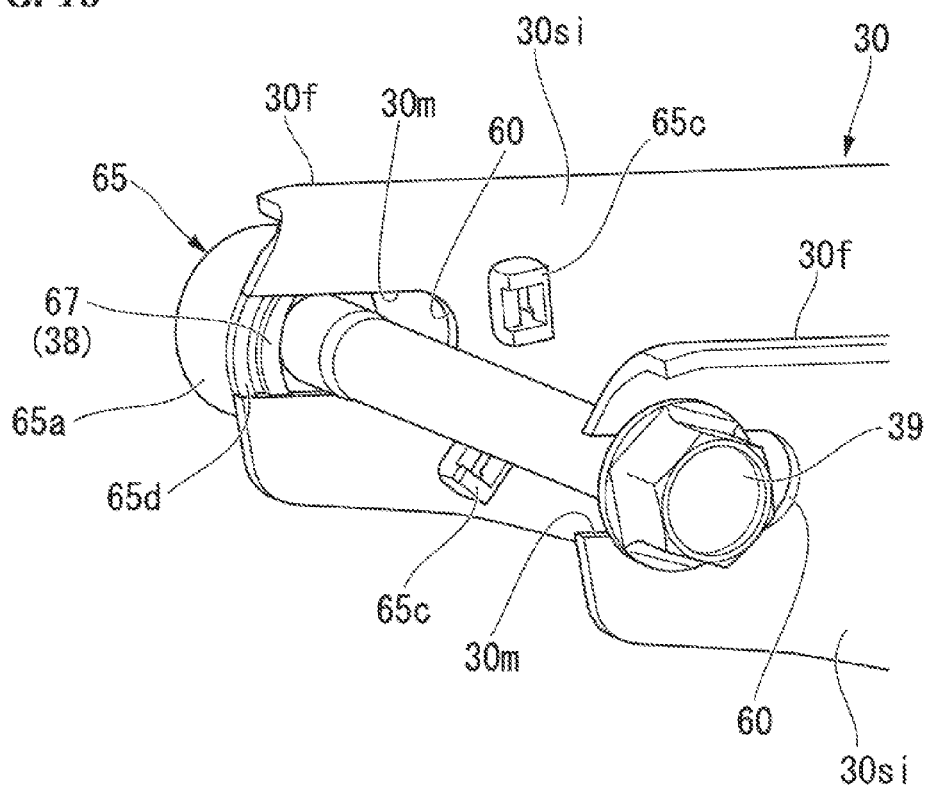
FIG. 18 is a perspective view when the fastening portion on the rear portion side of the link stay according to the first embodiment of the present invention is viewed from inside in the vehicle width direction.
Figure 19:
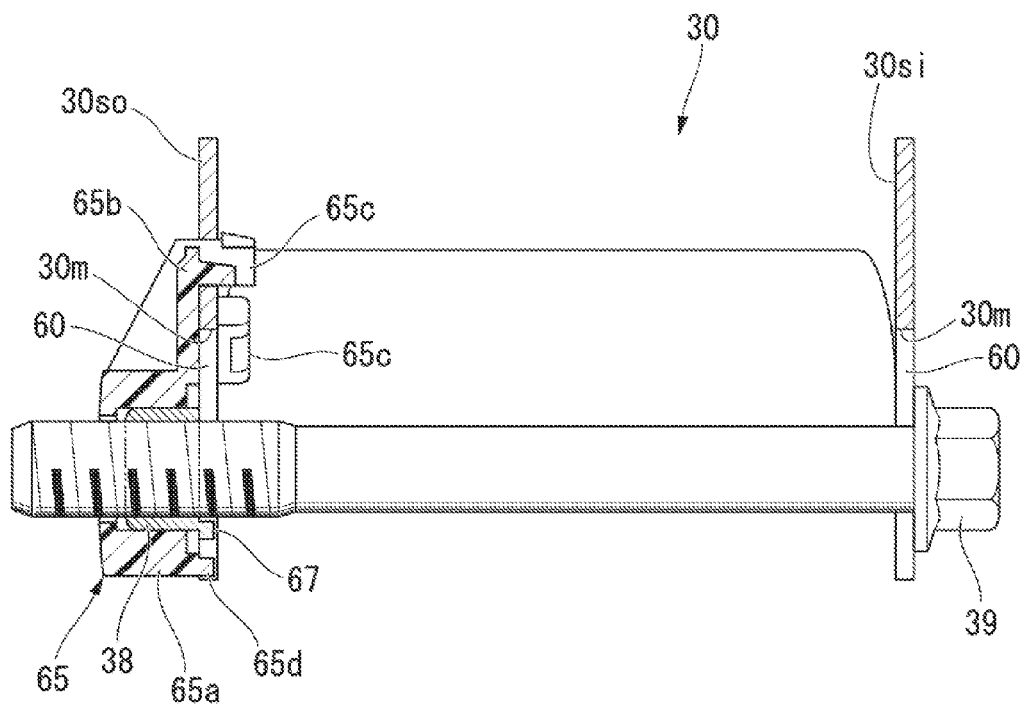
FIG. 19 is a cross-sectional view corresponding to cross section B-B in FIG. 17 according to the first embodiment of the present invention.

FIGS. 17 to 19 are views showing a fixing state of the support bolt 39 and the nut 38 with respect to the rear end portion of the link stay 30. In practice, the front end extension member 10 is interposed between the lateral walls 30so and 30si of the link stay 30. However, in FIGS. 17 to 19, for illustration convenience, the front end extension member 10 is omitted in the illustration.

The shaft portion of the support bolt 39 is position-fixed at a substantially intermediate position in the longitudinal direction of the each notched grooves 30m of the link stay 30 by being fitted into the nut 38 (refer to FIGS. 7 and 19).

As shown in FIG. 19, the nut 38 is assembled integrally with the nut cover 65 formed of a resin. As also shown in FIGS. 7, 17, and 18, the nut cover 65 includes a substantially cylindrical cover main body 65a which surrounds an outer peripheral side of the nut 38, an arm portion 65b which protrudes radially outward from the outer peripheral side of the cover main body 65a, a pair of engagement claws 65c and 65c which are disposed to project at two positions separated on a radially outer side of the arm portion 65b, and a locking projection 65d which is disposed to project to an end portion on a side substantially opposite to a projecting direction of the arm portion 65b on the circumference of the cover main body 65a. The engagement claws 65c and 65c and the locking projection 65d are disposed to project to an end surface of the cover main body 65a on a side which opposes a lateral wall 30s of the link stay 30.

Figure 11:
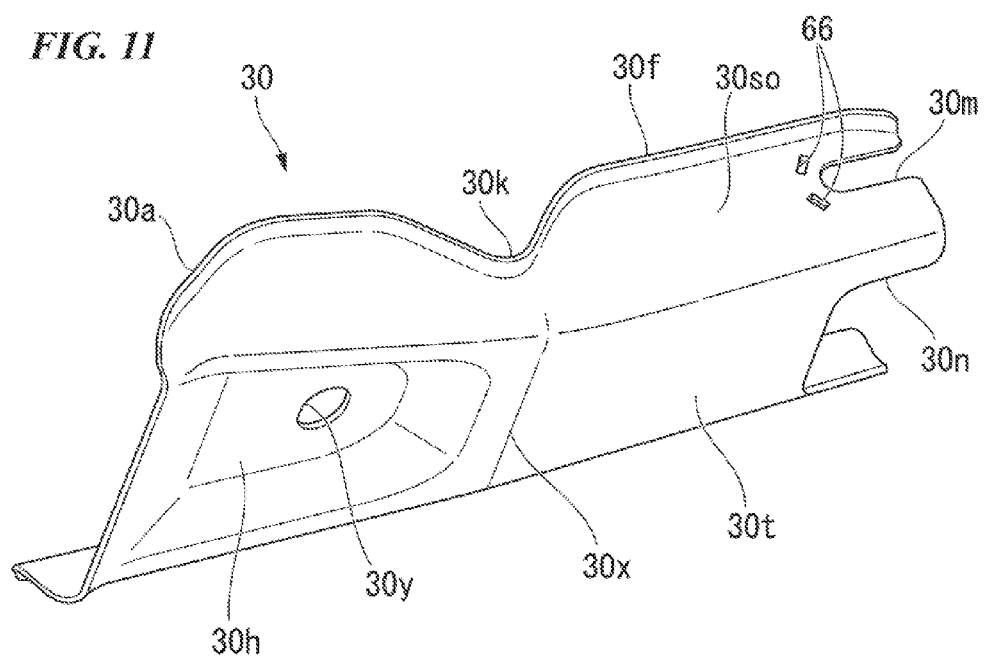
FIG. 11 is a perspective view when the link stay according to the first embodiment of the present invention is viewed from below.

As shown in FIGS. 7, 11, and 12, a pair of rectangular locking holes 66 and 66 is formed at a portion adjacent to the notched groove 30m within the lateral wall 30so which is outside in the vehicle width direction of the link stay 30. The engagement claws 65c and 65c of the nut cover 65 internally accommodating the nut 38 are inserted from outside of the lateral wall 30so into and engage with the locking holes 66 and 66. In addition, when the engagement claws 65c and 65c are inserted into and engaged with the locking holes 66 and 66 in this way, the locking projection 65d disposed to project at the cover main body 65a is fitted to an opening side region of the notched groove 30m on the lateral wall 30so. The nut cover 65 is held in a state of being positioned at a setting position on the lateral wall 30so of the link stay 30 in such a manner that the engagement claws 65c and 65c and the locking projection 65d respectively engage with the locking hole 66 and the notched groove 30m.

In addition, as shown in FIGS. 18 and 19, a restricting projection 67 which protrudes outward from an end surface on the lateral wall 30so side of the cover main body 65a is integrally formed in the nut 38. When the nut cover 65 is held by the lateral wall 30so as described above, the restricting projection 67 is fitted to the opening side region (region on the bottom portion side further from the position to which the locking projection 65d is fitted) of the notched groove 30m on the lateral wall 30so. In this manner, the rotation of the nut 38 is directly restricted by the lateral wall 30so.

In a state where the nut 38 and the nut cover 65 are positioned on the lateral wall 30so as described above, the support bolt 39 is fitted into the nut 38. In this manner, the shaft portion of the support bolt 39 is position-fixed at the setting position inside the notched groove 30m of the link stay 30. As described above, the position is the substantially intermediate position in the longitudinal direction of the notched groove 30m. Therefore, in a state where the support bolt 39 and the nut 38 are fastened to each other, a separating space having a predetermined distance is ensured between the shaft portion of the support bolt 39 and the bottom portion of the notched groove 30m. This separating space portion serves as a displacement permitting portion 60 which permits relative displacement of the link stay 30 and the support bolt 39 which is caused by rearward displacement of the sub-frame 22 when the collision load in the vehicle body longitudinal direction is input.

Here, as shown in FIG. 1, in a positional relationship of the downward convex portion 30x of the link stay 30, the central bending point 27 of the sub-frame 22, and the rear fastening portion 22u of the sub-frame main body 23, an apex when viewed from the lateral surface of the downward convex portion 30x forms a triangular truss structure with the central bending point 27 of the sub-frame 22 and the rear fastening portion 22u, and is located below the straight line L connecting the central bending point 27 and the fastening center O of the rear end portion of the link stay 30.

The rear fastening portion 22u is an attachment portion of the sub-frame main body 23, and the central bending point 27 is a bending portion. However, when the truss structure is described in the following description, the rear fastening portion 22u means a joint portion between the lateral member 20 and the attachment seat 32, and the central bending point 27 means a central portion in the vertical direction of the extension arm 24.

Figure 20:
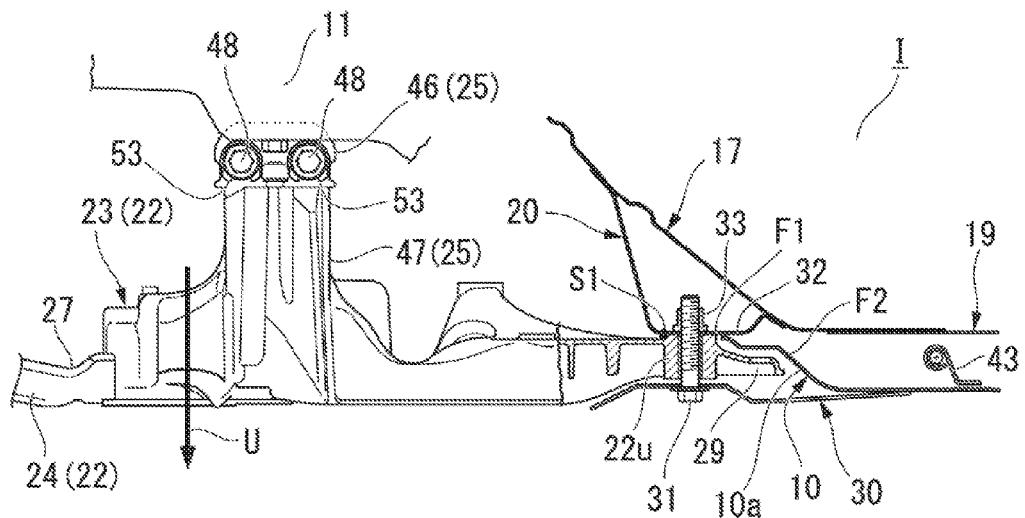
FIG. 20 is a view for showing a falling-down state of the sub-frame according to the first embodiment of the present invention.
Figure 21:
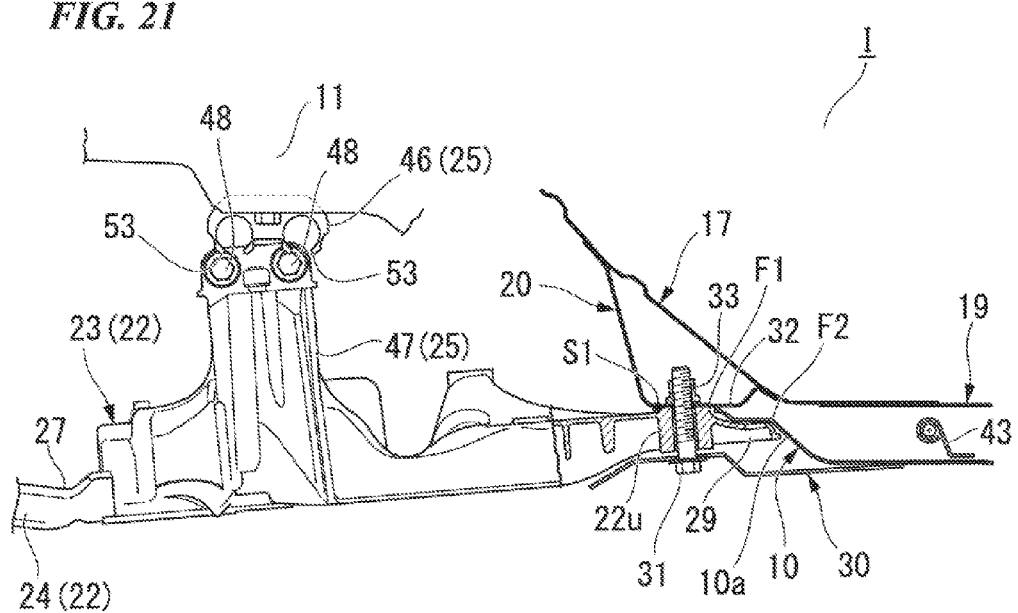
FIG. 21 is a view for showing a falling-down state of the sub-frame according to the first embodiment of the present invention.

FIG. 20 is a view showing a movement of the rear portion of the sub-frame 22 in an initial input stage of the collision load in the vehicle body longitudinal direction. FIG. 21 is a view showing a movement of the rear portion of the sub-frame 22 in a middle input stage of the collision load in the vehicle body longitudinal direction.

As shown in FIG. 20, if the collision load is input to the front portion of the sub-frame 22 and the central bending point 27 is about to start bending, a portion with which a rear edge of the rear fastening portion 22u of the sub-frame 22 on the lateral member 20 comes into contact serves as a mechanical fulcrum F1 (hereinafter, referred to as a "first fulcrum F1"), and a downward force acts on a working point S1 located immediately in front of the weld nut 33. That is, in the initial input stage of the collision load, a portion of the attachment seat 32 of the lateral member 20 serves as the first fulcrum F1, thereby causing a force in a direction of extracting downward to act on the fastening bolt 31.

The first fulcrum F1 is a portion adjacent to the rear side of the weak portion Z on the lateral member 20. As shown in FIG. 5, this portion is reinforced by the reinforcement plate 35, thereby increasing the rigidity.

In contrast, as shown in FIG. 21, if the collision load is input to the front portion of the sub-frame 22 and the central bending point 27 starts bending, the distal end portion of the extension piece 29 of the rear fastening portion 22u is brought into contact with the support wall 10a of the front end extension member 10 due to tilting and slight rearward displacement of the sub-frame main body 23. If the distal end portion of the extension piece 29 comes into contact with the support wall 10a in this way, the contact portion serves as a mechanical fulcrum F2 (hereinafter, referred to as a "second fulcrum F2") of the sub-frame 22, and a downward force acts on the working point S1 located immediately in front of the weld nut 33. That is, in the middle input stage of the collision load, a portion of the support wall 10a of the front end extension member 10 serves as the second fulcrum F2, thereby causing an extracting force with a large stroke to act on the fastening bolt 31.

Next, an operation in the above-described embodiment will be described. If the collision load in the vehicle body longitudinal direction is input to the front portion of the front side frame 11, the collision load is partially dispersed to the sub-frame 22 and is transmitted to the frame member below the cabin. At this time, the front side frame 11 progressively collapses in the longitudinal direction according to the advanced collision, and the sub-frame 22 is bent down at the portion of the central bending point 27. Then, the sub-frame main body 23 is finally pulled down below the cabin I, and the rear end portion of the sub-frame main body 23 falls down from the vehicle body.

Hereinafter, a movement of the sub-frame 22 at this time will be described in detail. If the sub-frame 22 is about to be bent down at the central bending point 27 in the initial input stage of the collision load, as shown in FIG. 20, the first fulcrum F1 of the lateral member 20 serves as the mechanical fulcrum, and the force in the extracting direction acts on the fastening bolt 31 and the weld nut 33. At this time, a strong force (although a stroke is small) acts on the fastening bolt 31 and the weld nut 33.

Then, the sub-frame 22 starts bending down at the central bending point 27, as shown in FIG. 21, the extension piece 29 of the rear fastening portion 22u comes into contact with the support wall 10a of the front end extension member 10, and the mechanical fulcrum is moved from the first fulcrum F1 to the second fulcrum F2 on the support wall 10a. In this manner, a load with a large stroke acts downward on the fastening bolt 31 and the weld nut 33.

When the mechanical fulcrum is moved from the first fulcrum F1 to the second fulcrum F2 on the support wall 10a, the link stay 30 integrated with the sub-frame main body 23 is slightly displaced to the rear side of the vehicle body together with the sub-frame main body 23. At this time, the support bolt 39 is relatively displaced inside the notched groove 30m (displacement permitting portion 60), on the rear side of the link stay 30.

In contrast, if a downward force U (also refer to FIGS. 1 and 10) acts on the upper portion attachment arm 25 at this time, two fixing bolts 48 which fix the upper portion attachment arm main body 47 and the connection bracket 46 break the notched portion 53. In this manner, the upper portion attachment arm main body 47 falls down while leaving the connection bracket 46 in the front side frame 11 as shown in FIG. 21. As a result, the sub-frame main body 23 is permitted to rotate about the axis of the first fulcrum F1 or the second fulcrum F2.

If the upper portion attachment arm main body 47 falls down in this way, a strong downward force simultaneously acts on the fastening bolt 31 and the weld nut 33. Accordingly, the weak portion Z of the lateral member 20 starts to be broken.

Figure 22:
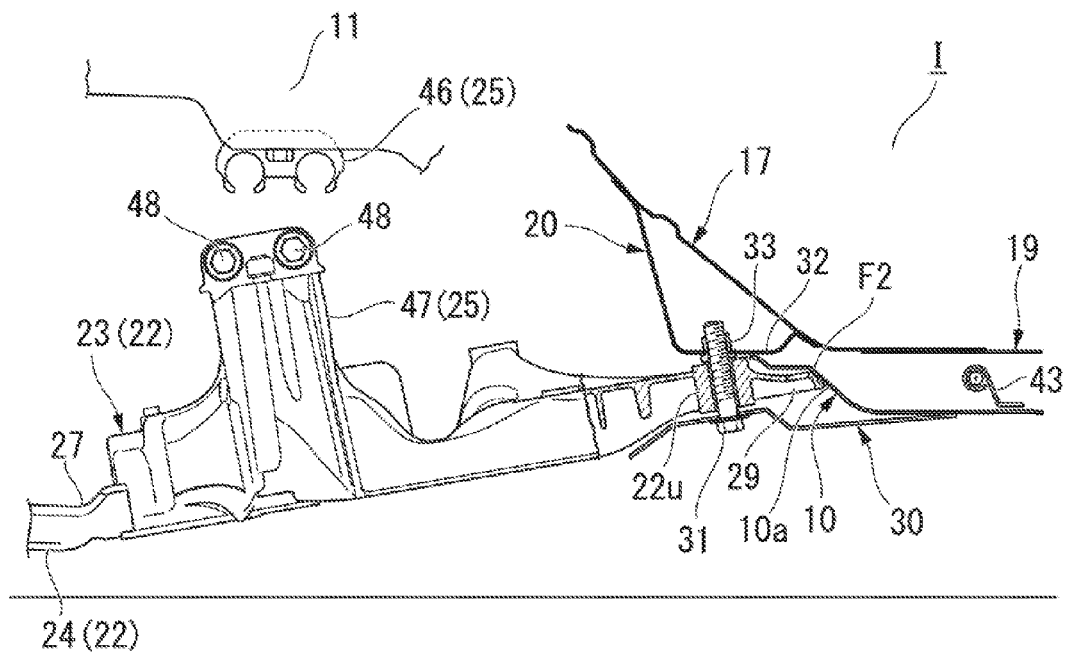
FIG. 22 is a view for showing a falling-down state of the sub-frame according to the first embodiment of the present invention.
Figure 23:
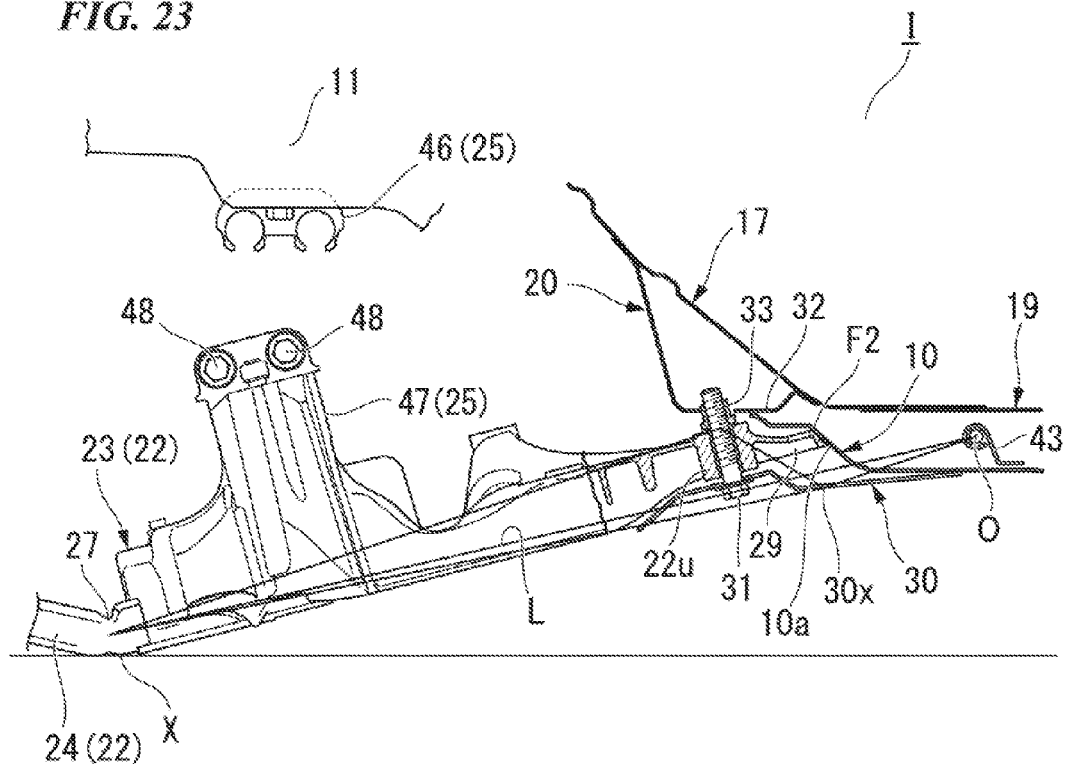
FIG. 23 is a view for showing a falling-down state of the sub-frame according to the first embodiment of the present invention.
Figure 24:
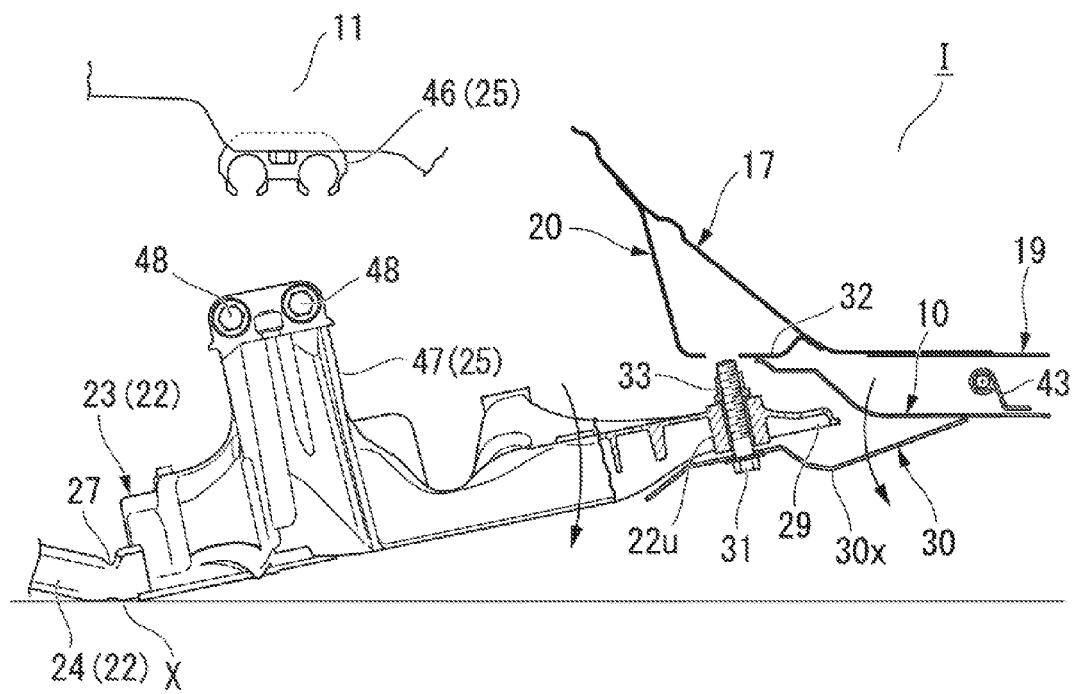
FIG. 24 is a view for showing a falling-down state of the sub-frame according to the first embodiment of the present invention.

If the collision load is continuously input, as shown in FIGS. 22 to 24, the fastening bolt 31 is extracted downward together with the weld nut 33, and the sub-frame main body 23 is rotated about the support bolt 39 via the link stay 30.

At this time, if the sub-frame main body 23 is rotated around the support bolt 39 by a predetermined angle, as shown in FIG. 23, the front end portion of the sub-frame main body 23 comes into contact with the ground.

In this state, a vehicle continuously moves forward. As shown in FIG. 23, the apex when viewed from the lateral surface of the downward convex portion 30x of the link stay 30 forms a triangular truss structure with the central bending point 27 of the sub-frame 22 and the rear fastening portion 22u, and is located below the straight line L which connects the central bending point 27 and the fastening center O of the rear end of the link stay 30 (holds the positional relationship shown in FIG. 1). The recess 30h having high rigidity is disposed at the front side of the link stay 30. Therefore, the above-described truss structure extends up to an end portion position (position where the downward convex portion 30x is located) on the rear side of the recess 30h of the link stay 30.

Therefore, in a state where the vehicle moves forward while the front end side of the sub-frame main body 23 is in contact with the ground, and in this state, if a separation distance between the central bending point 27 and the fastening center O of the rear end of the link stay 30 is about to be shortened, the force is concentrated on the downward convex portion 30x of the link stay 30. As a result, as shown in FIG. 24, the link stay 30 is folded downward about the downward convex portion 30x.

Figure 25:
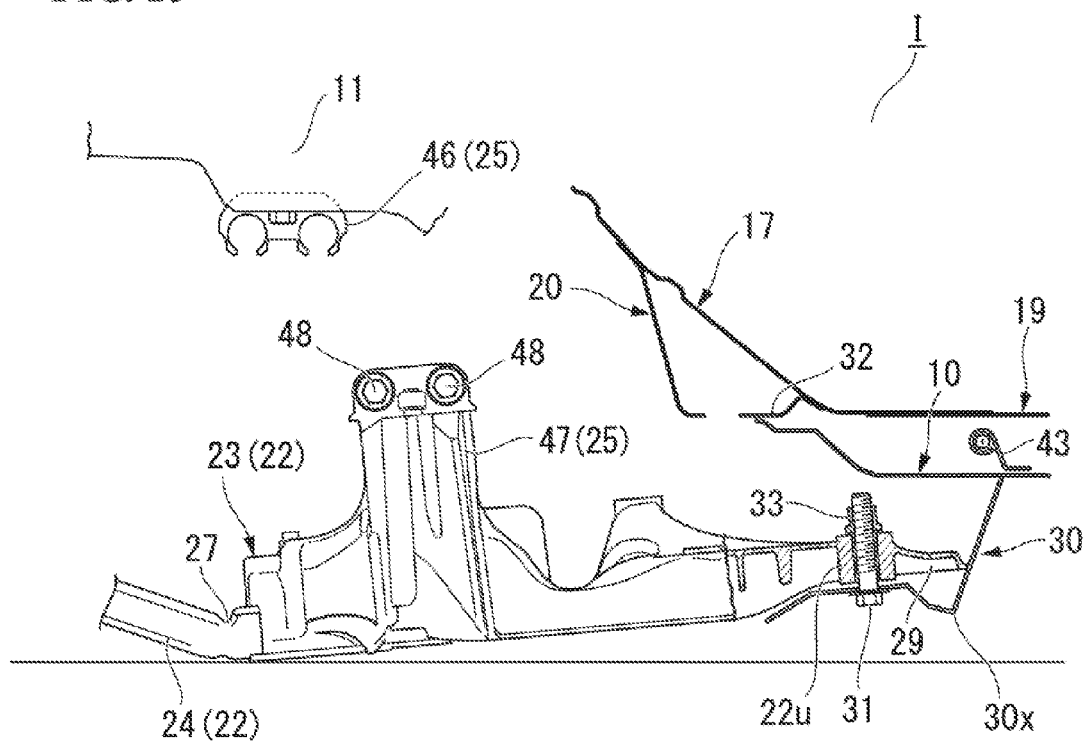
FIG. 25 is a view for showing a falling-down state of the sub-frame according to the first embodiment of the present invention.

Therefore, if the collision is further advanced thereafter, as shown in FIG. 25, the link stay 30 is rotated at two points of the fastening center O of the support bolt 39 and the downward convex portion 30x. This combined rotation at two points causes the sub-frame main body 23 to be guided downward below the cabin.

Then, if the rear half portion of the link stay 30 is rotated about the fastening center O until the rear half portion is directed in the vertical direction, the link stay 30 is extracted downward from the support bolt 39 along the notched groove 30m of the rear end portion, and falls down. As a result, the rear portion of the sub-frame main body 23 finally falls down below the cabin I.

As described above, in this vehicle body frame structure, when the collision load in the vehicle body longitudinal direction is input, the sub-frame 22 is bent down at the central bending point 27, the rear fastening portion 22u of the sub-frame main body 23 is extracted downward from the lateral member 20 together with the front end portion of the link stay 30 and the fastening bolt 31, and the rear end portion of the sub-frame main body 23 is rotated around the axis of the support bolt 39 together with the link stay 30. Therefore, it is possible to reliably guide the sub-frame 22 and the mounted suspension component downward below the cabin.

In this vehicle body frame structure, when the collision load in the vehicle body longitudinal direction is input, it is possible to reliably guide the sub-frame 22 and the suspension component downward below the cabin I as described above. However, it is not necessary to use a complicated mechanism. Accordingly, it is possible to suppress an increase in vehicle weight or an increase in manufacturing cost.

Furthermore, in this vehicle body frame structure, the nut 38 for fastening the rear end portion of the link stay 30 to the front end extension member 10 is held by the lateral wall 30*so* which is outside in the vehicle width direction of the link stay 30, and the support bolt 39 is fitted into the nut 38 from the lower side of the floor tunnel portion 18. Therefore, when the vehicle body is assembled, it is possible to easily carry out fastening work for the support bolt 39 by using a wide space below the floor tunnel portion 18. Accordingly, it is possible to improve workability in assembling the vehicle body by adopting this structure.

In addition, in this vehicle body frame structure, the nut 38 for fastening the rear end portion of the link stay 30 to the front end extension member 10 is integrally assembled to the nut cover 65 having the engagement claw 65*c*. Therefore, the locking hole 66 on the lateral wall 30*so* of the link stay 30, the engagement claw 65*c* of the nut cover 65, and the locking projection 65*d* are engaged with one another in the notched groove 30*m* in advance. In this manner, it is possible to easily fasten the support bolt 39 without performing the positioning of the nut 38 again.

In addition, in a case of this embodiment, the restricting projection 67 which is fitted to the notched groove 30*m* on the lateral wall 30*so* and restricts the rotation of the nut 38 is disposed at the nut 38 side which is integrally assembled to the nut cover 65. Therefore, a worker does not need to hold a portion of the nut 38 using a jig or the like, and can reliably fit the support bolt 39 into the nut 38.

In particular, in the vehicle body frame structure according to this embodiment, the front end extension member 10 is attached to the position adjacent to the under-floor lateral surface 55*b* of the stepped portion 55 within the lower surface of the dash lower panel 17 and the floor panel 19. Therefore, it is essential to arrange the nut 38 in a portion in which a separation width is narrow between the lateral wall 30*so* which is outside in the vehicle width direction of the link stay 30 and the under-floor lateral surface 55*b*. However, as described above, it is possible to attach the nut 38 together with the nut cover 65 to the lateral wall 30*so* in advance. Moreover, the worker does not need to hold the nut 38 and fastens the support bolt 39. Accordingly, it is possible to easily and efficiently carry out the assembling work of the vehicle body.

In addition, in this vehicle body frame structure, the notched groove 30*m* is disposed at the rear end portion on the lateral walls 30*so* and 30*si* of the link stay 30, and the support bolt 39 for fastening the rear end portion of the link stay 30 to the front end extension member 10 is inserted into the notched groove 30*m*. Therefore, in the later input stage of the collision load in the vehicle body longitudinal direction, when the rear half portion of the link stay 30 is largely rotated about the support bolt 39, it is possible to reliably cause the link stay 30 to fall down along the notched groove 30*m*. Accordingly, in this manner, it is possible to avoid interference between the suspension member mounted on the sub-frame 22 and the front part of the cabin by causing the rear end portion of the sub-frame 22 to finally fall down below the cabin I.

Furthermore, in a case of this embodiment, in a state where the rear end portion of the link stay 30 is fastened to the front end extension member 10 by the support bolt 39, the displacement permitting portion 60 can be secured between the bottom portion of the notched groove 30*m* and the support bolt 39. Therefore, in the middle input stage of the collision load in the vehicle body longitudinal direction, when the link stay 30 is about to be slightly displaced rearward together with the sub-frame main body 23, the relative displacement of the link stay 30 with respect to the support bolt 39 is permitted by the displacement permitting portion 60, and thus, it is possible to prevent the link stay 30 from being unnecessarily deformed. Accordingly, it is possible to reliably and finally guide the sub-frame 22 downward below the cabin I later by reliably folding the link stay 30 at the predetermined position.

Second Embodiment

Next, a vehicle body frame structure for an automobile according to a second embodiment of this invention will be described with reference to the drawings, using a vehicle body front part structure as an example.

As shown in FIGS. 1 to 3, the rear end portion of the dash lower panel 17 is joined to the front end portion of the floor panel 19, and the front side of the dash lower panel 17 is formed so as to rise obliquely upward. The floor tunnel portion 18 is attached to the central portion in the vehicle width direction of the floor panel 19 along the vehicle body longitudinal direction, over a portion leading to the rear end portion of the dash lower panel 17. In both side portions of the floor tunnel portion 18, the floor panel 19 is configured so that the height is lowered outward in the vehicle width direction by two steps. In FIGS. 2 and 3, the dash lower panel 17 is omitted in the illustration.

A pair of right and left front side frames 11 and 11 (side frames) is disposed at the front part of the vehicle body along the vehicle body longitudinal direction. A lateral portion if the front bulkhead 12 is attached to the front end portion of these front side frames 11 and 11. An electric power steering device EPS is arranged in front of the dash lower panel 17, in the front side frames 11 and 11, and a power unit PU is mounted on the front side of the electric power steering device EPS.

As shown in FIG. 3, the rear end portions of the front side frames 11 and 11 are formed as the front side rear ends 16 and 16 which are connected to a closed cross-sectional structure portion on the front part side, whose upper portion is open, and which have a cross-sectional U-shape. The front side rear end 16 is joined to the lower surface of the dash lower panel 17 and the floor panel 19 from the dash lower panel 17 over the portion leading to the front end portion of the floor panel 19, thereby forming a closed cross-sectional structure. The outriggers 13 and 13 whose upper portion is open and which have a cross-sectional U-shape are connected along the vehicle width direction between a rear end lower wall and an outer wall of the front side rear ends 16 and 16, and an inner wall of the side sills 14 and 14.

On both sides of the floor tunnel portion 18, the right and left floor tunnel frames 15 and 15 (under-floor frame) which form the closed cross-sectional structure portion on the lower surface of the floor panel 19 toward the rear side are disposed on the one step lowered lower surface of the floor panel 19.

The lateral member 20 (support member substrate, cabin side support member, vehicle body panel) which is a vehicle body floor member whose upper portion is open and which has a cross-sectional U-shape is connected along the vehicle width direction, between a rear end inner wall of the front side rear ends 16 and 16 and the front end portion of the floor tunnel frame 15.

Therefore, below the dash lower panel 17 which is not shown in FIG. 3, the closed cross-sectional structure portion which is continuous with the front side frames 11 and 11 is formed along the vehicle body longitudinal direction by the front side rear end 16. On both sides thereof, the closed cross-sectional structure portion is formed along the vehicle width direction toward the side sill 14 and the floor tunnel frame 15 by the outrigger 13 and the lateral member 20. Here, the front side rear end 16, the outrigger 13, and the lateral member 20 have a flange portion in an upper edge of a wall portion of the opened cross section, and the flange portion is joined to the floor panel 19 and the dash lower panel 17.

The floor center frame 21 extending toward the rear side of the vehicle body is attached to the rear end portion of the right and left front side rear ends 16 and 16 so as to be partially overlapped with each other in the longitudinal direction by interposing the dash lower panel 17 therebetween. The floor center frame 21 forms the closed cross-sectional structure portion on the upper surface of the floor panel 19 and the dash lower panel 17 by using a member whose lower portion is open. The front end extension portion 10 (front end extension member, under-floor frame, other vehicle body panel) which is connected to the floor tunnel frames 15 and 15, which is formed in a cross-sectional U-shape, and whose upper portion is open, is attached to the front end portion of the floor tunnel frames 15 and 15, in a state where the front end portion is joined to the lateral member 20 (refer to FIG. 5). The dash lower panel 17 is joined onto the front end extension portion 10, thereby forming the closed cross-sectional structure portion. The front end extension portion 10 configures a portion of the floor tunnel frames 15 and 15.

The sub-frame 22 which supports the suspension component (not shown) is detachably attached below the front side frames 11 and 11. Specifically, as also shown in FIG. 4, the sub-frame 22 includes the front fastening portion 22m (separate side fastening portion) which is supported by the front end of the front side frames 11 and 11 via the front bulkhead 12, the upper portion attachment arms 25 and 25 which are fastened to the front side frames 11 and 11, and the rear fastening portion 22u (adjacent side fastening portion) which fastens the floor panel 19 from below the floor panel 19. The front fastening portion 22m is detachably attached to the front bulkhead 12. The upper portion attachment arms 25 and 25 are detachably attached to the lower surface of the front side frames 11 and 11. The rear fastening portion 22u is detachably attached to the lower surface of the lateral member 20. In addition, the sub-frame 22 includes the central bending point 27 which is bent down below the central portion in the longitudinal direction.

As shown in FIG. 4, the sub-frame 22 is configured to have the sub-frame main body 23 which is cast using an aluminum alloy, and a pair of right and left extension arms 24 and 24 which extend forward from both front end side portions of the sub-frame main body 23 in a flared shape and are press-formed using a light alloy or steel. The electric power steering device EPS is fixed to the sub-frame main body 23 at three locations, for example, in the vehicle width direction on the upper surface thereof.

As also shown in FIG. 2, when viewed from a plane, the sub-frame main body 23 is a member having a shape including a rear edge which is bent forward, right and left lateral edges linearly extending forward so as to open outward, and a front edge linearly extending in the vehicle width direction. The sub-frame main body 23 includes a plurality of vertical ribs (shown in FIG. 4) for increasing the rigidity, on the lower surface, and further includes the upper portion attachment arms 25 and 25 extending upward, in both end portions of the front portion of the sub-frame main body 23.

The rear end portion of the extension arms 24 and 24 is fixed to the front end portion of the sub-frame main body 23 from below by the bolts 26, 26, and 26. The front fastening portion 22m of the front end portion of the extension arm 24 is fixed to a lower corner portion of the front bulkhead 12 from below by the bolt 26. As shown in FIG. 1, the central bending point 27 which is slimmed when viewed from a side surface is formed in front of the rear end portion of the extension arm 24. The central bending point 27 is not usually bent at all. However, in a case of vehicle front collision, the central bending point 27 serves as a starting point in which a predetermined input load F causes an intermediate portion in the longitudinal direction of the sub-frame 22 to be bent down. Here, the extension arms 24 and 24 are configured so that a ground height on the front end thereof is higher than a ground height on the rear end in a state where the extension arms 24 and 24 are attached.

As shown in FIG. 5, the rear end extension portion 29 extending rearward from the rear fastening portion 22u is disposed at the rear fastening portion 22u of the sub-frame main body 23. In the sub-frame main body 23, the thickness in the height direction is thin immediately before reaching the rear fastening portion 22u, and the lower surface of the sub-frame main body 23 is horizontal in the rear end extension portion 29. In contrast, the upper surface is formed to be thinner as it goes rearward, and the sub-frame main body 23 can form a gap between the front end portion of the front end extension portion 10 of the floor tunnel frame 15.

The front end portion (first end portion side) of the link stay 30 covering the rear fastening portion 22u overlaps the rear fastening portion 22u from below, and the fastening bolt 31 (first fastening member, fastener, bolt) is inserted into the link stay 30 and the rear fastening portion 22u from below. This fastening bolt 31 is fastened and fixed to the weld nut 33 (first fastening member, head portion, fastener, nut) on the rear surface of the attachment seat 32 of the lateral member 20. In this manner, the link stay 30 and the rear fastening portion 22u are fixed to the attachment seat 32 of the lateral member 20. The front wall of the lateral member 20 is formed to be lowered obliquely rearward, and the attachment seat 32 is formed to be substantially horizontal to a portion of the lower wall.

The front end extension portion 10 of the floor tunnel frame 15 is joined to the lower wall of the lateral member 20. In the front end extension portion 10, a front wall 10a is formed to be oriented obliquely downward, and the front end portion opposes the upper surface of the rear end extension portion 29 of the sub-frame main body 23. The rear end extension portion 29 of the sub-frame main body 23 is accommodated on the front side of the front wall 10a of the front end extension portion 10 by leaving a constant distance therebetween in the longitudinal direction.

An escape recess 37 is formed on the front wall 10a of the front end extension portion 10 which opposes the rear end extension portion 29 of the sub-frame main body 23. The escape recess 37 is provided in order to receive and hold the rear end extension portion 29 of the sub-frame main body 23 which is not in contact with the escape recess 37 in an initial stage of collision, when the rear end extension portion 29 is moved rearward after the vehicle front collision, and in order to support a rotary operation of the sub-frame main body 23. Here, the reinforcement portion 34 is joined from the inside of the cabin, to the upper surface of the rising portion of the dash lower panel 17, corresponding to the front end portion of the floor tunnel frame 15.

As shown in FIG. 6, the weld nut 33 to which the fastening bolt 31 is fastened is welded and fixed to the rear surface of the attachment seat 32 of the lateral member 20. The reinforcement plate 35 formed of a plate material which is thicker than that of the lateral member 20 is bonded to the rear side, on the rear surface of the attachment seat 32 of the lateral member 20. This reinforcement plate 35 (cabin side support member) includes a hole 36 (escape hole or insertion hole) which has a larger diameter than the outer shape of the weld nut 33, around the weld nut 33. This hole 36 is formed so as to surround the weld nut 33. The periphery of the weld nut 33 of the reinforcement plate 35 is spot-welded to the rear side of the lateral member 20 at multiple locations.

In particular, the spot-welded point S is set just behind the hole 36, that is, in the rear in the collision load input direction. If a force acting from the front tries to cause the reinforcement plate 35 to move rearward with respect to the attachment seat 32, at least the spot-welded point S just behind the hole 36 can effectively receive the force in a shearing direction which is favorable in a terms of strength.

Therefore, the lateral member 20 is reinforced by the reinforcement plate 35. However, if a downward load acts on the weld nut 33 in a case of the vehicle front collision, a portion of the hole 36 to which the reinforcement plate 35 is joined, particularly an annular portion of the lateral member 20 which is present between the hole 36 and the insertion hole into which the fastening bolt 31 is inserted, is broken as the weak portion Z. The fastening bolt 31 breaks the lateral member 20 together with the weld nut 33, and is separated from the lateral member 20.

Figure 26:
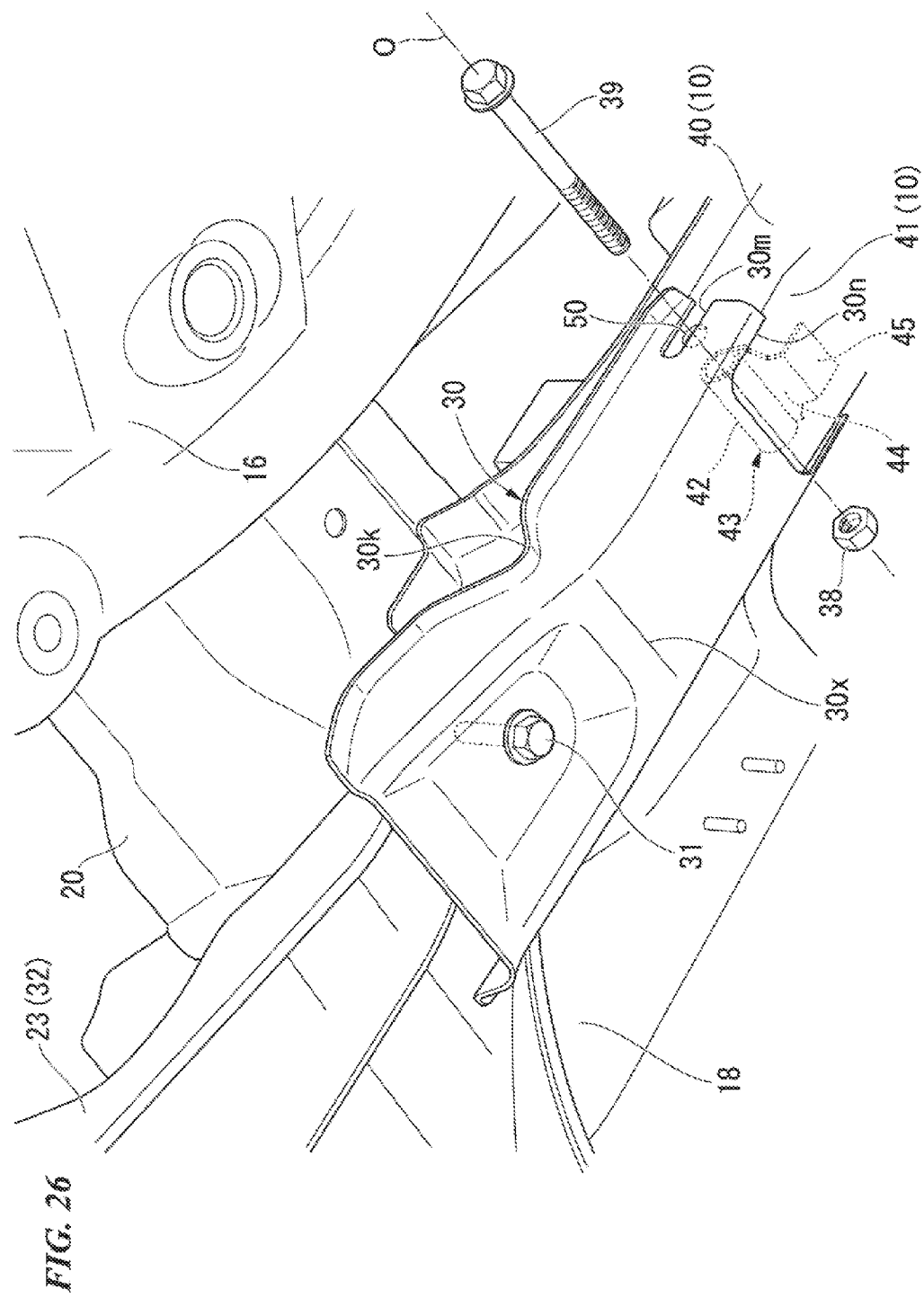
FIG. 26 is a perspective view when a link stay attachment portion according to a second embodiment of the present invention is viewed from below.
Figure 27:
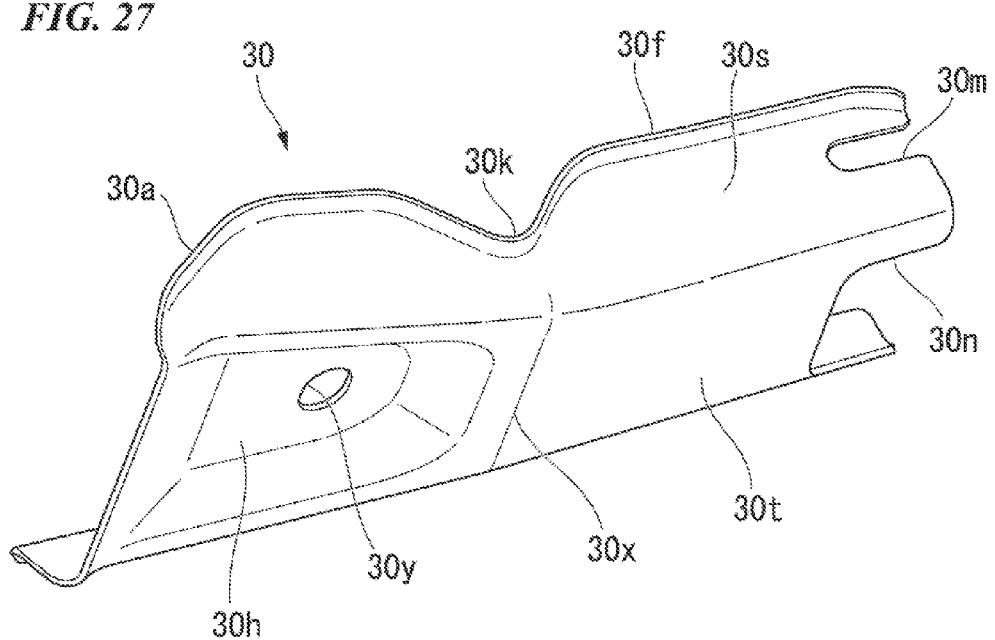
FIG. 27 is a perspective view when a link stay according to the second embodiment of the present invention is viewed from below.

As shown in FIGS. 5, 8, and 26, the front end extension portion 10 of the floor tunnel frame 15 includes both lateral walls 40 and the bottom wall 41, and is a cross-sectional U-shaped member, whose upper side is open. The support bracket 43 which includes the bolt holding portion 42 in the horizontal direction across the lateral walls 40 and 40 of the rear portion is attached to the front end extension member 10. The bolt holding portion 42 of the support bracket 43 is formed by rolling a plate material into a cylindrical shape. The arm portion 44 extending obliquely rearward and downward from the bolt holding portion 42 is continuously formed in the bolt holding portion 42. The support bracket 43 includes the attachment portion 45 bent rearward in the horizontal direction, at a terminal of the arm portion 44. The attachment portion 45 is welded and fixed to the bottom wall 41 of the front end extension portion 10. The through-hole 50 is formed on the lateral wall 40 corresponding to both end portions of the bolt holding portion 42.

As shown in FIG. 26, in a state where the link stay 30 which is jointly fastened with the sub-frame main body 23 is attached to the front end extension portion 10 of the floor tunnel frame 15, the support bolt 39 (second fastening member) is inserted into the lateral wall 30s of the rear end portion (rear side in the collision load input direction, second end portion side) of the link stay 30 in the horizontal direction. The support bolt 39 is inserted into the bolt holding portion 42 of the support bracket 43 which is fixed between the lateral walls 40 of the front end extension portion 10, and is fastened and fixed by the nut 38 (second fastening member). In FIG. 8, the reinforcement portion 34 is omitted in the illustration.

As shown in FIGS. 9 and 10, the upper portion attachment arm 25 of the sub-frame main body 23 is configured to have the upper portion attachment arm main body 47 extending upward and the connection bracket 46 attached to the upper portion attachment arm main body 47. The upper portion attachment arm 25 is fixed to the front side frame 11 by the connection bracket 46. The connection bracket 46 is a member which is attached to the upper portion of the upper portion attachment arm main body 47 and is formed to be oriented outward in an L-shape in a rear view. The connection bracket 46 is configured, in an L-shape, to include the vertical base portion 49 which is fixed by inserting two fixing bolts 48 and 48 in the horizontal direction, and the attachment portion 51 which is fixed by inserting one fixing bolt 48 from below to above in the vertical direction.

The insertion hole 52 of the fixing bolt 48 is formed at the base portion 49. The insertion hole 52 includes the notched portion 53 which is open downward. Accordingly, if the upper portion attachment arm 25 receives a load acting so as to pull down at the time of vehicle collision, the connection bracket 46 is left in the front side frames 11 and 11, and the two fixing bolts 48, which fix the upper portion attachment arm main body 47 and the connection bracket 46, break the notched portion 53. The upper portion attachment arm main body 47 is moved downward, and downward displacement of the sub-frame 22 is permitted.

The link stay 30 will be described with reference to FIGS. 27 to 31. The link stay 30 is formed in a cross-sectional U-shape by the bottom wall 30t and both lateral walls 30s. The bottom wall 30t in the front end (end portion on the front side in the collision load input direction) is jointly fastened to the attachment seat 32 of the lateral member 20 together with the rear fastening portion 22u of the sub-frame main body 23. The lateral walls 30s in the rear end are supported by the front end extension portion 10 of the floor tunnel frame 15 in the vehicle width direction serving as an axis (refer to FIGS. 6 and 26).

The upper edge flange portion 30f laterally extending in order to prevent opening is formed in the upper edge of both lateral walls 30s of the link stay 30. The V-shaped recess 30k is formed at the central portion in the longitudinal direction, in the upper edge portion of the lateral wall 30s which is outside in the vehicle width direction. The tilted portion 30a which is gradually lowered forward is formed on the front side of the upper edge portion of the lateral wall 30s which is outside in the vehicle width direction.

The lateral wall 30s which is inside in the vehicle width direction of the link stay 30 has a same shape with the lateral wall 30s which is outside in the vehicle width direction from the rear end side until the position of the bottom portion of the V-shaped recess 30k on the lateral wall 30s which is outside in the vehicle width direction. However, unlike the lateral wall 30s which is outside in the vehicle width direction, the lateral wall 30s which is inside in the vehicle width direction extends up to the front end portion side while maintaining the height of the bottom portion of the V-shaped recess 30k on the lateral wall 30s which is outside in the vehicle width direction. Then, both lateral walls 30s and 30s of the link stay 30 are arranged so as to laterally interpose both lateral walls 40 and 40 of the front end extension portion 10 of the floor tunnel frame 15 therebetween (refer to FIGS. 5 and 26).

In the front portion of the link stay 30, the recess 30h which comes into contact with the attachment seat 32 of the lateral member 20 is formed by causing a portion of the bottom wall 30t to be recessed upward. The recess 30h is formed so as to be obliquely tilted and to fall down from the bottom surface position of the bottom wall 30t. The recess 30h increases the strength on the front side of the link stay 30. The bolt hole 30y of the fastening bolt 31 is formed at the recess 30h.

Figure 28:
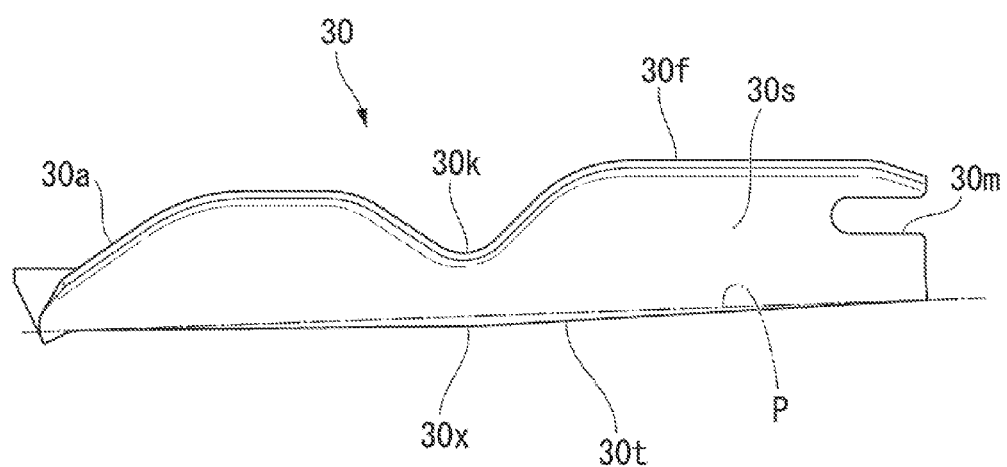
FIG. 28 is a side view of the link stay according to the second embodiment of the present invention.
Figure 29:
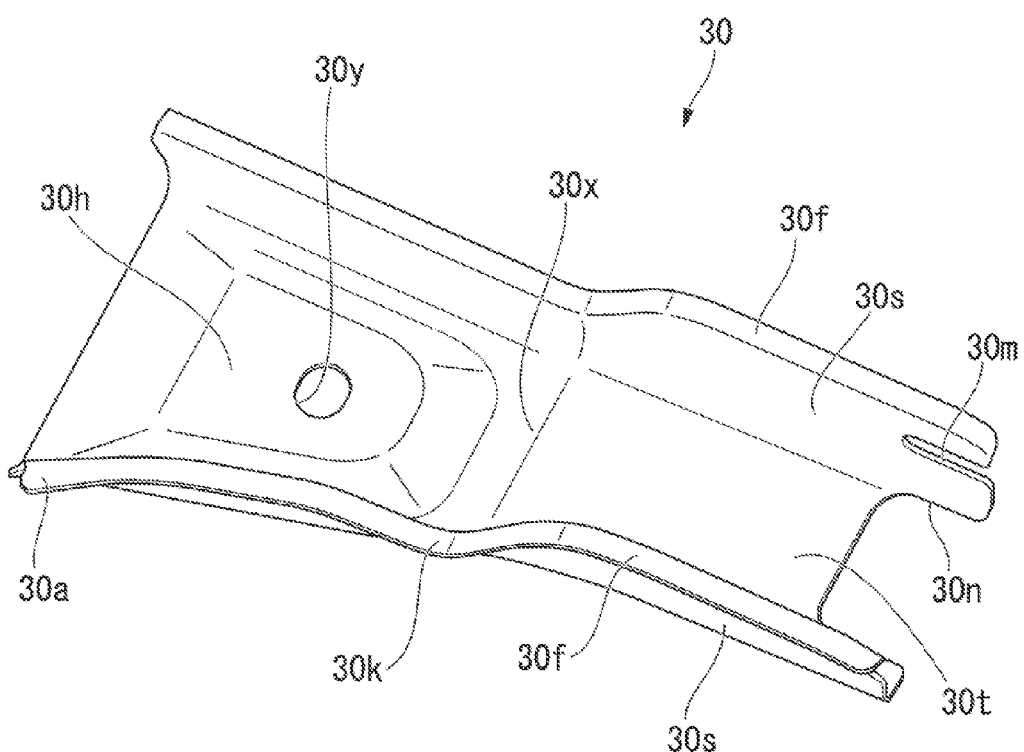
FIG. 29 is a perspective view when the link stay according to the second embodiment of the present invention is viewed from above.
Figure 30:
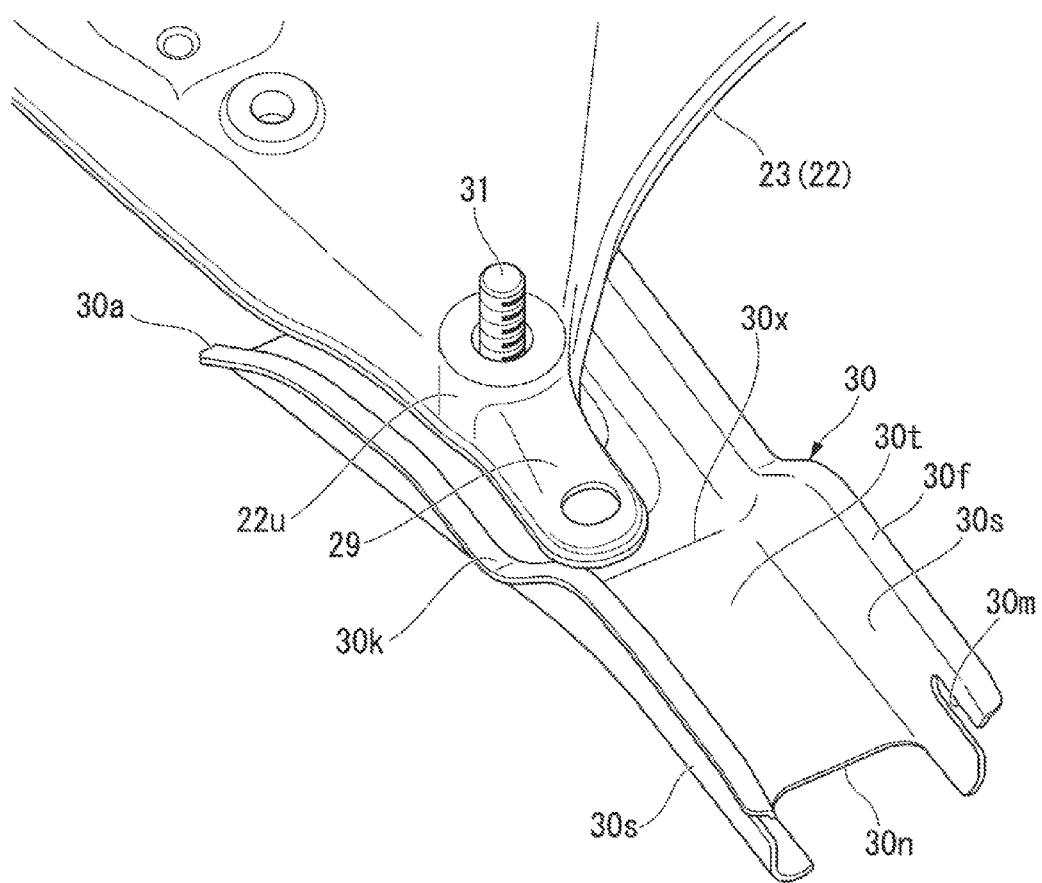
FIG. 30 is a perspective view of an attachment portion between the link stay and a sub-frame according to the second embodiment of the present invention.
Figure 31:
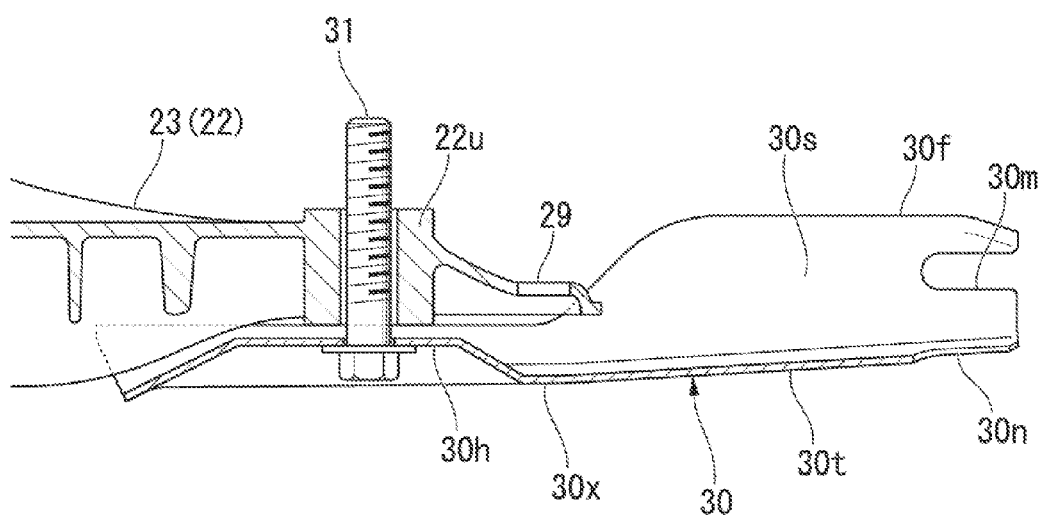
FIG. 31 is a vertical cross-sectional view of a rear fastening portion according to the second embodiment of the present invention.

The downward convex portion 30x is located just behind the recess 30h, that is, in the substantially central portion in the longitudinal direction of the link stay 30 in the rear in the collision load input direction. Even in a state where the sub-frame 22 is in the initial state and even in a state where the sub-frame 22 comes into contact with the ground during the collision, the downward convex portion 30x which is convex downward is integrally formed by press-molding so that the bottom surface of the bottom wall 30t protrudes downward in the width direction in a side view. As shown in FIG. 28, the downward convex portion 30x is a portion slightly protruding downward in a side view, when the front end portion and the rear end portion are connected to each other by the straight line P. This portion corresponds to a formation position of the V-shaped recess 30*k* formed at the upper edge portion on the lateral wall 30*s*, in the longitudinal direction. The downward convex portion 30*x* serves as the starting point from which the link stay 30 is bent. Specifically, the downward convex portion 30*x* forms a ridge in the width direction of the bottom wall 30*t* of the link stay 30.

A lateral wall notch 30*m* (notched groove, bolt insertion portion, penetrating portion) is disposed on the lateral wall 30*s* of the rear end portion of the link stay 30 by being oriented forward with a constant width from the rear edge portion to the front side. This lateral wall notch 30*m* is a notch for inserting the support bolt 39, and corresponds to the bolt holding portion 42 of the support bracket 43 which is arranged between the lateral walls 40 and 40 of the front end extension portion 10 of the floor tunnel frame 15.

In this manner, the support bolt 39 to be inserted into the bolt holding portion 42, which is inserted into a portion between the lateral walls 40 and 40 of the front end extension portion 10, is inserted into the pair of lateral wall notches 30*m* with a margin therebetween in the longitudinal direction, and is fastened to the nut 38. Then, the rear end portion of the link stay 30 is pivotally supported via the support bolt 39 in the vertical direction. The shaft portion of the support bolt 39 is configured to serve as the fastening center O of the rear end portion of the link stay 30.

Then, as shown in FIG. 1, in a positional relationship of the downward convex portion 30*x* of the link stay 30, the central bending point 27 of the sub-frame 22, and the rear fastening portion 22*u* of the sub-frame main body 23, the apex when viewed from the lateral surface of the downward convex portion 30*x* forms a triangular truss structure with the central bending point 27 of the sub-frame 22 and the rear fastening portion 22*u*, and is located below the straight line L connecting the central bending point 27 and the fastening center O of the rear end portion of the link stay 30. The rear fastening portion 22*u* represents an attachment portion of the sub-frame main body 23, and the central bending point 27 represents a bending portion. However, when the truss structure is described in the following description, the rear fastening portion 22*u* represents a joint portion between the lateral member 20 and the attachment seat 32, and the central bending point 27 represents a central portion in the vertical direction of the extension arm 24.

The notched portion 30*n* is disposed from the end edge to the front side at the bottom wall 30*t* of the rear end portion of the link stay 30. The notched portion 30*n* functions as an escape portion in which the bottom wall 30*t* does not interfere with the bottom wall 41 of the front end extension member 10 of the floor tunnel frame 15 when the front side of the link stay 30 is rotated downward about the axis of the fastening center O of the rear end portion of the link stay 30, thereby permitting the rotation of the link stay 30.

Next, an operation of the above-described embodiment will be described. If the collision load is input in the operation in a case of the vehicle front collision, the collision load input is dispersed to the floor center frames 21 and 21 having high strength and rigidity from the pair of extension arms 24 and 24 via the sub-frame main body 23.

Here, as shown in FIG. 1, if an input load F equal to or above a certain level acts on the lower portion of the front bulkhead 12, the sub-frame 22 starts bending downward from the central bending points 27 serving as the starting point.

Figure 32:
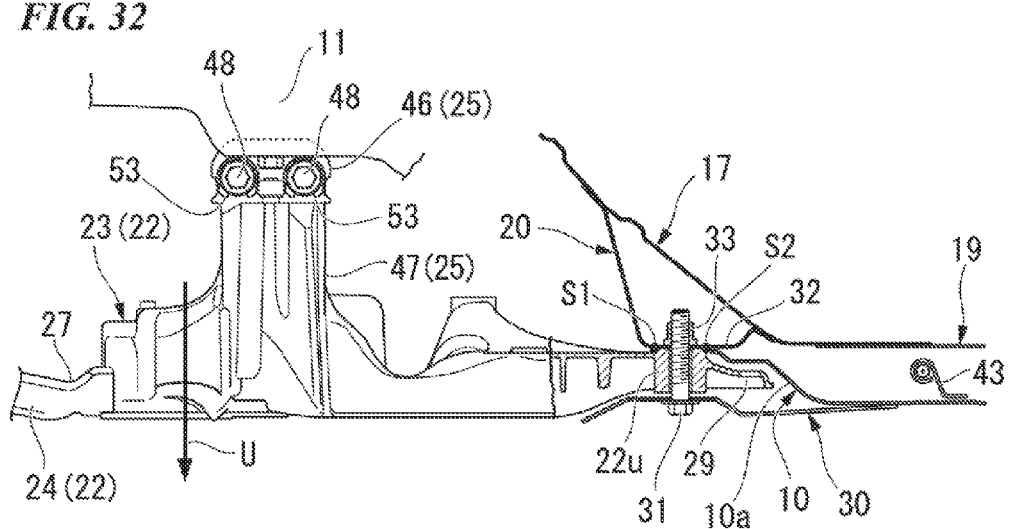
FIG. 32 is a view for showing a falling-down state of the sub-frame according to the second embodiment of the present invention.
Figure 33:
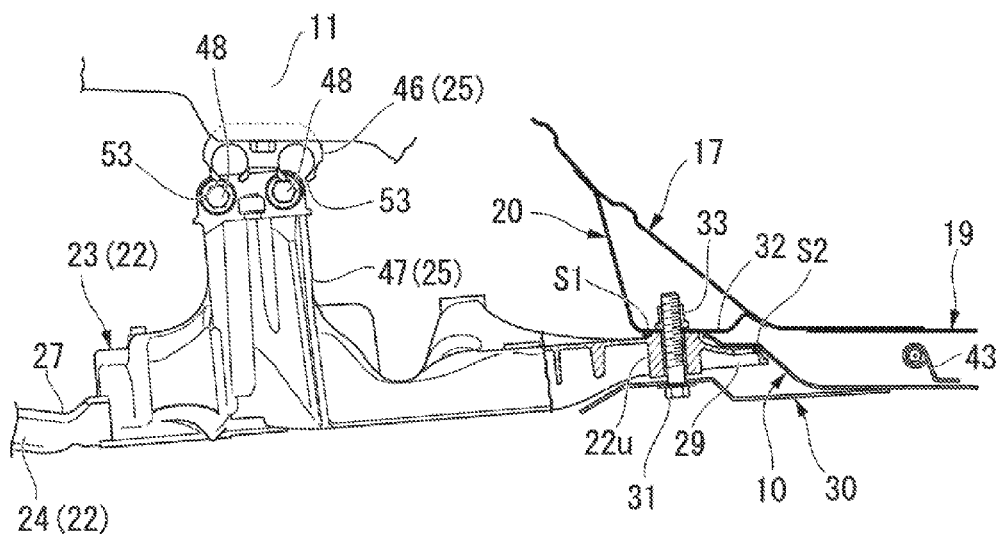
FIG. 33 is a view for showing a falling-down state of the sub-frame according to the second embodiment of the present invention.

As shown in FIG. 32, immediately before the central bending point 27 of the sub-frame 22 is about to start bending in the initial collision, in the attachment seat 32 of the lateral member 20, an working point S1 is positioned just in front of the weld nut 33, and a fulcrum S2 is positioned just behind the weld nut 33. Then, after the sub-frame 22 is displaced rearward, as shown in FIG. 33, the fulcrum S2 is moved to a position corresponding to the distal end of the rear end extension portion 29 of the sub-frame main body 23. Here, if a downward force U (also refer to FIGS. 1 and 10) acts on the upper portion attachment arm 25, two fixing bolts 48, which fix the upper portion attachment arm main body 47 and the connection bracket 46, break the notched portion 53, and the connection bracket 46 is left in the front side frames 11 and 11. The upper portion attachment arm main body 47 falls down and is displaced downward, thereby permitting the sub-frame main body 23 to be rotated counterclockwise about the axis of the fulcrum S2 as shown in FIG. 33.

Figure 34:
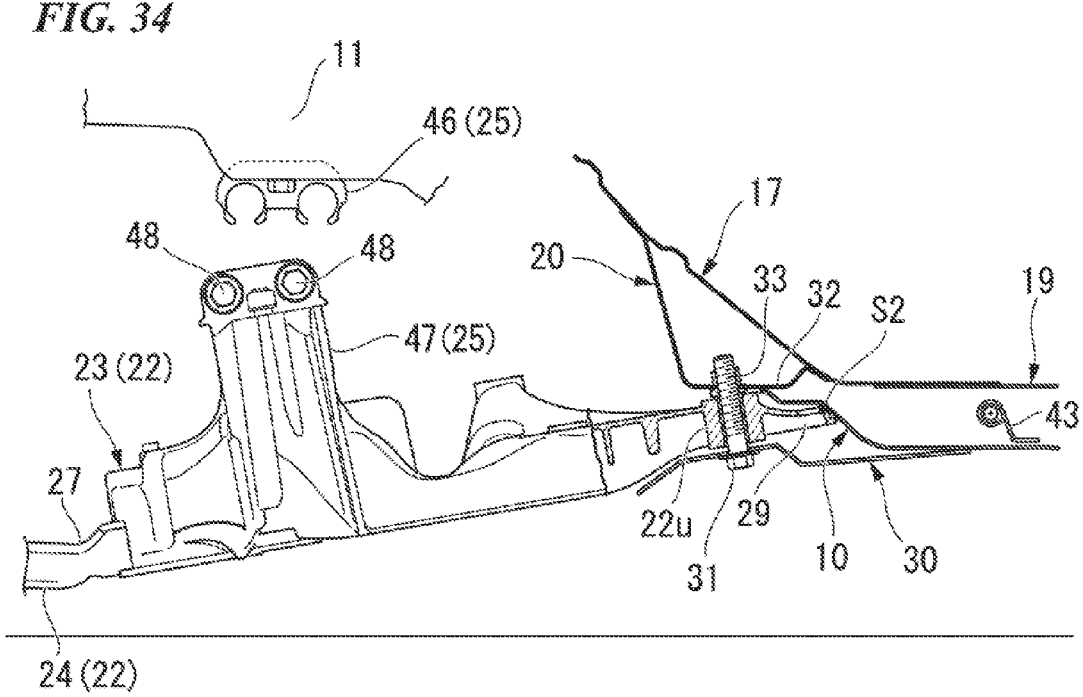
FIG. 34 is a view for showing a falling-down state of the sub-frame according to the second embodiment of the present invention.

Then, as shown in FIG. 34, while the sub-frame main body 23 rotates the distal end of the rear end extension portion 29 about the fulcrum S2 and the weld nut 33 breaks the attachment seat 32 of the lateral member 20, the sub-frame main body 23 is further rotated. At this time, the link stay 30 is integrated with the sub-frame main body 23. Therefore, the sub-frame main body 23 is rotated counterclockwise about the support bolt 39 in the rear end serving as the fastening center O as shown in FIG. 34.

Figure 35:
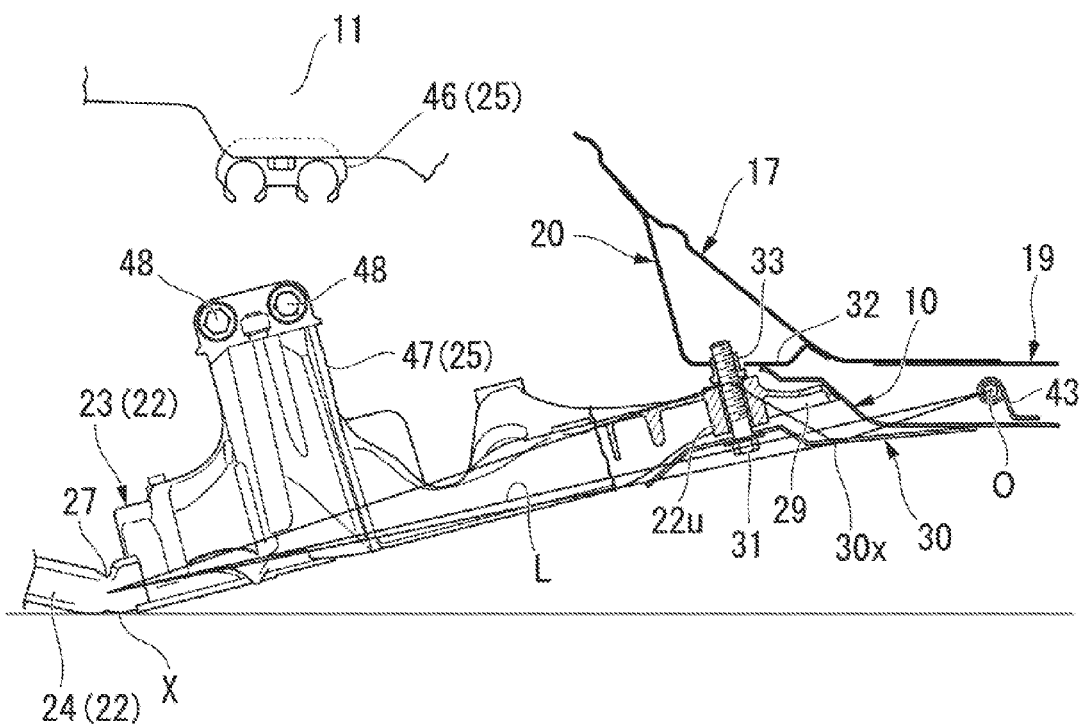
FIG. 35 is a view for showing a falling-down state of the sub-frame according to the second embodiment of the present invention.

Then, as shown in FIG. 35, if the front portion of the sub-frame main body 23 comes into contact with the ground, the attachment seat 32 of the lateral member 20 is completely broken by the weld nut 33 since the weld nut 33 is not yet completely pulled out.

In this state, a vehicle continuously moves forward. As shown in FIG. 35, the apex when viewed from the lateral surface of the downward convex portion 30*x* of the link stay 30 forms a triangular truss structure with the central bending point 27 of the sub-frame 22 and the rear fastening portion 22*u*, and is located below the straight line L which connects the central bending point 27 and the fastening center O of the rear end of the link stay 30 (holds the positional relationship shown in FIG. 1). The recess 30*h* having high rigidity is disposed at the front side in the collision load input direction. Therefore, even though the link stay 30 is partially included therein, it is possible to form a truss structure having high rigidity.

Figure 36:
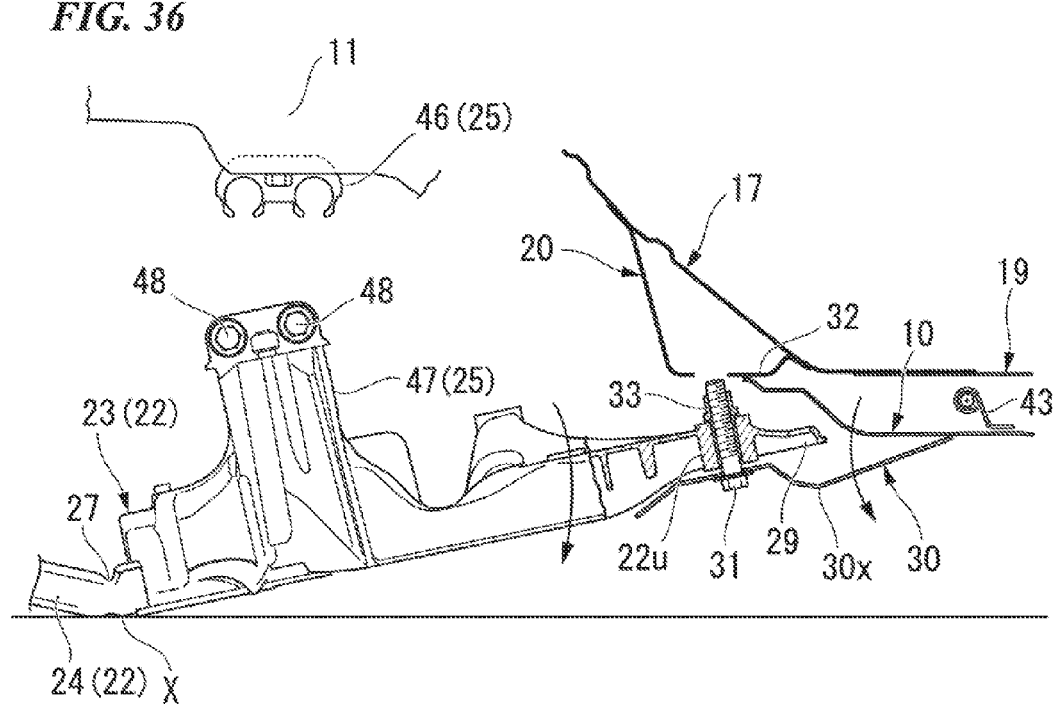
FIG. 36 is a view for showing a falling-down state of the sub-frame according to the second embodiment of the present invention.

Therefore, the rigid truss structure remains as it is. When the distance is shortened between the central bending point 27 and the fastening center O in the rear end of the link stay 30, a force is concentrated on the downward convex portion 30*x*. Therefore, as shown in FIG. 36, this time, the apex when viewed from the lateral surface of the downward convex portion 30*x* of the link stay 30 starts to be displaced downward while increasing a bending degree, since the rear portion side of the link stay 30 is bent.

That is, until now, the sub-frame main body 23 is rotated counterclockwise about the distal end of the rear end extension portion 29 serving as the fulcrum S2 as shown in FIG. 34. However, after coming into contact with the ground, the sub-frame main body 23 is rotated clockwise about a front end portion X which is a ground contact point as shown by an arrow in FIG. 36, and the link stay 30 starts to be rotated counterclockwise about the support bolt 39 of the rear end portion serving as the fastening center O.

Figure 37:
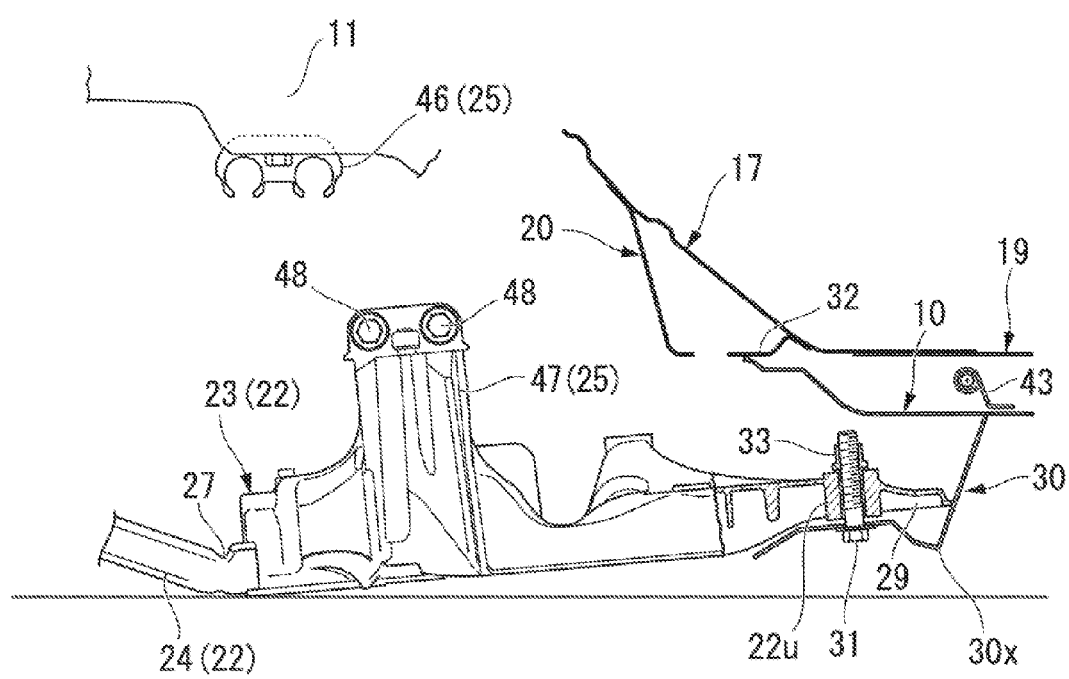
FIG. 37 is a view for showing a falling-down state of the sub-frame according to the second embodiment of the present invention.

Then, as shown in FIG. 37, the link stay 30 is largely bent in the downward convex portion 30*x*, and the sub-frame main body 23 is completely lowered downward and comes into contact with the ground together with the extension arm 24. In this manner, the link stay 30 is left in a state where the rear half portion thereof is oriented in the vertical direction.

According to the above-described embodiment, the apex of the downward convex portion 30x of the link stay 30 forms the triangular truss structure with the central bending point 27 of the sub-frame 22 and the rear fastening portion 22u of sub-frame 22. Therefore, it is possible to cause more concentrated stress to act downward on the apex of the downward convex portion 30x by concentrating the collision load in a case of the vehicle front collision on the apex of the downward convex portion 30x.

In addition, the weak portion Z which facilitates separation of the weld nut 33 from the attachment seat 32 by using the downward load is disposed at the attachment seat 32 of the lateral member 20 to which the rear fastening portion 22u of the sub-frame 22 is attached. Therefore, it is possible to reliably separate the rear fastening portion 22u of the sub-frame 22 from the lateral member 20.

Accordingly, in a case of the vehicle front collision, the sub-frame 22 is bent down at the central bending point 27 between the front fastening portion 22m and the rear fastening portion 22u. Thereafter, the front end comes into contact with the ground. The rear fastening portion 22u of the sub-frame main body 23 and the weld nut 33 of the lateral member 20 break the weak portion Z. In this manner, the rear fastening portion 22u of the sub-frame main body 23 is separated from the attachment seat 32 of the lateral member 20, and the downward convex portion 30x of the link stay 30 is bent down while the link stay 30 and the sub-frame 22 are integrated with each other.

Therefore, the link stay 30 is rotated about the axis of the fastening center O of the rear portion of the link stay 30, and the sub-frame 22 is reliably guided downward below the vehicle body. In this manner, a lower arm (not shown) or the electric power steering device EPS which is the suspension component supported by the sub-frame 22 can be displaced downward, that is, outside a range of the crash stroke of the front side frames 11 and 11.

Accordingly, it is possible to prevent the lower arm or the electric power steering device EPS which is the suspension component attached to the sub-frame 22 from interfering with the power unit PU. In addition, it is possible to prevent the sub-frame 22 from interfering with the vehicle body. Therefore, it is possible to sufficiently absorb the collision energy by ensuring a large deformation stroke of the vehicle body.

It is possible to locally concentrate the load input from the sub-frame 22 on the weak portion Z which is the annular portion of the lateral member 20 between the insertion hole of the fastening bolt 31 of the attachment seat 32 of the lateral member 20 and the insertion hole 36 of the reinforcement plate 35. Accordingly, it is possible to break the attachment seat 32 of the lateral member 20 by using the fastening bolt 31 with a small displacement. Therefore, it is possible to shorten the time required until the attachment seat 32 is broken.

In addition, it is possible to increase the resistance against forcible entry of the suspension component attached to the sub-frame 22, and the electric power steering device EPS, since the reinforcement plate 35 is thicker than the lateral member 20.

In addition, if the collision load acts on the sub-frame 22 in a case of vehicle front collision, this load acts as a breaking load acting on the welded portion of the weld nut 33 which is fixed to the attachment seat 32 of the lateral member 20 and sheering stress acting on the welded portion between the lateral member 20 and the reinforcement plate 35. Therefore, it is possible to link the load to a rotary operation of the sub-frame 22 by preventing the sub-frame 22 from sliding with respect to the lateral member 20. Accordingly, it is possible to reliably prevent the sub-frame 22 from moving rearward.

In addition, the downward convex portion 30x of the link stay 30 can be easily formed on the bottom wall 30t of the link stay 30 by press molding. Therefore, the manufacturing is facilitated without increasing the number of components.

The link stay 30 includes the recess 30h for rear fastening portion 22u of the sub-frame main body 23 in which the bottom wall 30t is recessed upward, and includes the downward convex portion 30x in the rear of the recess 30h. Therefore, since the rigidity in front of the recess 30h is increased, the link stay 30 is likely to be bent down in the downward convex portion 30x in the rear. It is possible to prevent the head portion of the fastening bolt 31 from protruding downward from the bottom surface across the sub-frame 22 to the link stay 30 and from interfering with the road surface.

The link stay 30 includes the lateral wall 30s extending from the bottom wall 30t, and the V-shaped recess 30k is disposed at the lateral wall 30s located above the downward convex portion 30x. Therefore, the V-shaped recess 30k at the lateral wall 30s does not cause the lateral wall 30s an adversely affect during the bending deformation of the downward convex portion 30x. Accordingly, it is possible to reliably bend the link stay 30 at the downward convex portion 30x.

Third Embodiment

Next, a third embodiment will be described. The same reference numerals are given to the configuring elements which are the same as those in the above-described embodiments, and a description thereof will be simplified or omitted here.

In this embodiment, the fastening bolt 31 (fastener or bolt) and the weld nut 33 (head portion, fastener, nut) configure the first fastening member.

Figure 38:
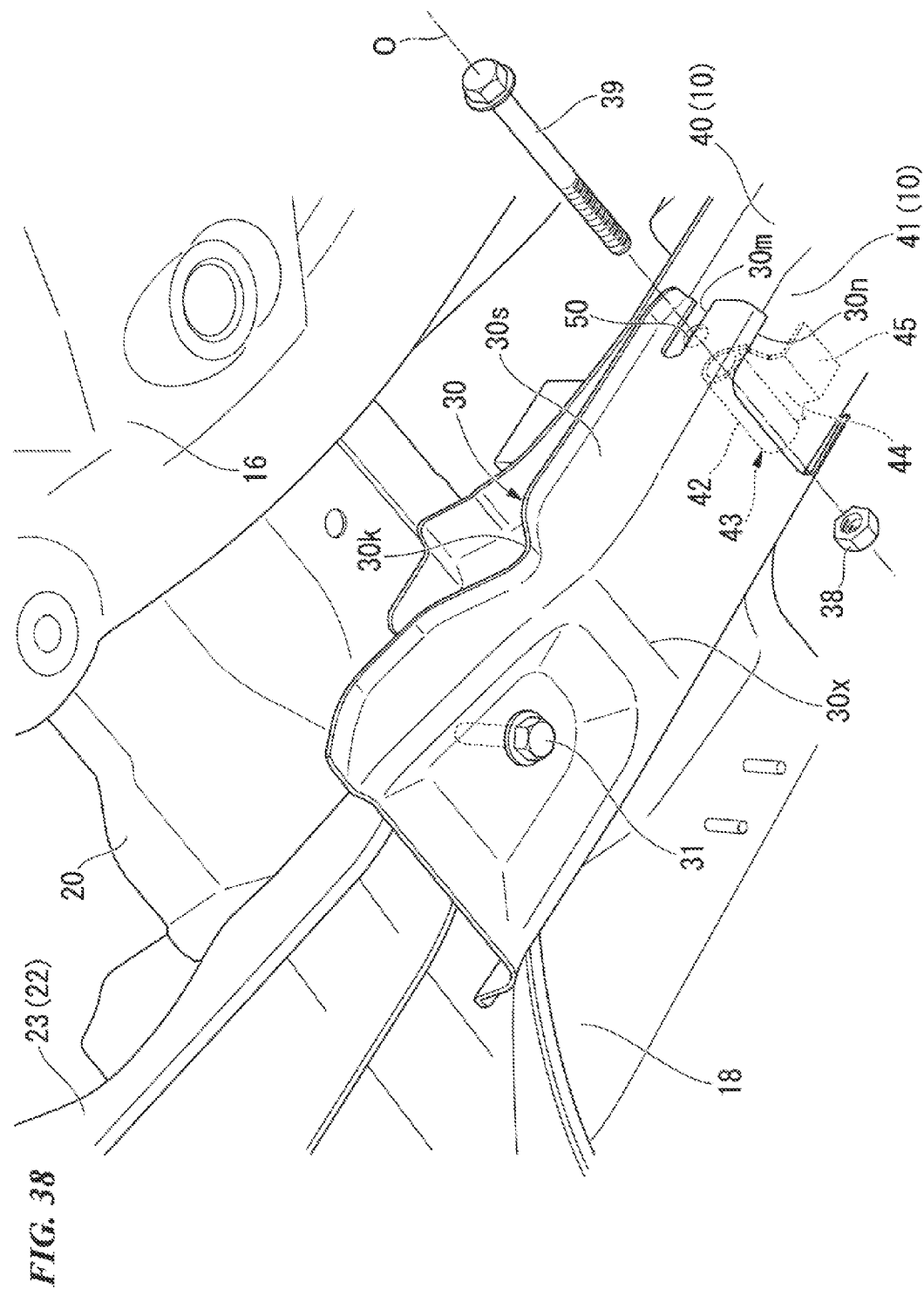
FIG. 38 is a perspective view when an attachment portion of a link stay according to a third embodiment of the present invention is viewed from below.

As shown in FIG. 38, the front end extension member 10 (front end extension portion, under-floor frame, other vehicle body panel) is fastened and fixed to the lateral wall 30s of the rear end portion (second end portion side) of the link stay 30 by the support bolt 39 (second fastening member). The support bolt 39 is inserted into the bolt holding portion 42 of the support bracket 43 through the through-hole 50 on the lateral wall 40 of the front end extension member 10, and the nut 38 (second fastening member) is screwed to the distal end portion of the support bolt 39 which penetrates both lateral walls 40. In this embodiment, the support bolt 39 and the nut 38 configure the second fastening member.

FIG. 9 is a view showing a fixing portion of the upper portion attachment arm 25 of the sub-frame main body 23. FIG. 10 is a view showing each fixing portion of the sub-frame main body 23 with the upper portion attachment arm 25 and the rear fastening portion 22u.

As shown in FIGS. 9 and 10, the upper portion attachment arm 25 is configured to have the upper portion attachment arm main body 47 extending upward, and the connection bracket 46 attached to the upper portion attachment arm main body 47. The upper portion attachment arm 25 is fixed to the lower surface of the front side frame 11 (side frame) via the connection bracket 46. The connection bracket 46 is a member which is attached to the upper portion of the upper portion attachment arm main body 47 and is formed to be oriented outward in an L-shape in a rear view. The connection bracket 46 includes the base portion 49 which is fixed to the upper portion attachment arm main body 47 by inserting two fixing bolts 48 and 48 extending in the horizontal direction, and the attachment portion 51 which is fixed to the lower surface of the front side frame 11 by inserting one fixing bolt 48 extending in the vertical direction, and is formed in an L-shape by both of the base portion 49 and the attachment portion 51.

In the base portion 49, the insertion hole 52 of the fixing bolt 48 is formed and the notched portion 53 which opens a portion of the insertion hole 52 downward is formed. Accordingly, if the upper portion attachment arm 25 receives a load acting so as to pull down at the time of vehicle collision, the connection bracket 46 is left in the front side frames 11 and 11, and the two fixing bolts 48, which fix the upper portion attachment arm main body 47 and the connection bracket 46, break the notched portion 53. The upper portion attachment arm main body 47 is moved downward, and the downward displacement of the sub-frame 22 is permitted.

FIGS. 11 to 15 and 39 are views showing a detailed structure of the link stay 30. As shown in FIGS. 11 to 15 and 39, the link stay 30 is formed in a cross-sectional U-shape by the bottom wall 30t and both lateral walls 30s. The bottom wall 30t in the front end is jointly fastened to the attachment seat 32 of the lateral member 20 (support member substrate, cabin side support member, vehicle body panel) together with the rear fastening portion 22u of the sub-frame main body 23 by the fastening bolt 31. The lateral wall 30s in the rear end is fastened to the front end extension member 10 of the front portion of the floor tunnel frame 15 (under-floor frame) by the support bolt 39 having the axis in the vehicle width direction (refer to FIG. 38).

The upper edge flange portion 30f laterally extending in order to prevent opening is formed in the upper edge of both lateral walls 30s of the link stay 30. The V-shaped recess 30k is formed in the central portion in the longitudinal direction, at the upper edge portion of the lateral wall 30s which is outside in the vehicle width direction. The tilted portion 30a which is gradually lowered forward is formed on the front side of the upper edge portion of the lateral wall 30s which is outside in the vehicle width direction.

The lateral wall 30s which is inside in the vehicle width direction of the link stay 30 has a same shape with the lateral wall 30s which is outside in the vehicle width direction from the rear end side until the position of the bottom portion of the V-shaped recess 30k on the lateral wall 30s which is outside in the vehicle width direction. However, unlike the lateral wall 30s which is outside in the vehicle width direction, the lateral wall 30s which is inside in the vehicle width direction extends up to the front end portion side while maintaining the height of the bottom portion of the V-shaped recess 30k on the lateral wall 30s which is outside in the vehicle width direction. Then, both lateral walls 30s and 30s of the link stay 30 are arranged so as to laterally interpose both lateral walls 40 and 40 of the front end extension portion 10 therebetween (refer to FIG. 5).

The notched groove 30m (bolt insertion portion, lateral wall notch, penetrating portion) which is notched to have a constant width from the rear end to the front side is disposed at the lateral wall 30s on both sides of the rear portion of the link stay 30. As shown in FIG. 38, the notched groove 30m is a groove by which the bolt holding portion 42 of the support bracket 43 and the shaft portion of the support bolt 39 inserted into the through-hole 50 of the front end extension member 10 are supported in a penetrating state. The head portion of the support bolt 39 and the nut 38 screwed to the distal end portion of the support bolt 39 are arranged outside the notched groove 30m on both sides. The rear end portion of the link stay 30 is fastened and fixed to the front end extension member 10 in such a manner that the support bolt 39 and the nut 38 are fitted to each other in this state. Therefore, the shaft portion of the support bolt 39 is configured to serve as the fastening center O of the rear end portion of the link stay 30.

Figure 39:
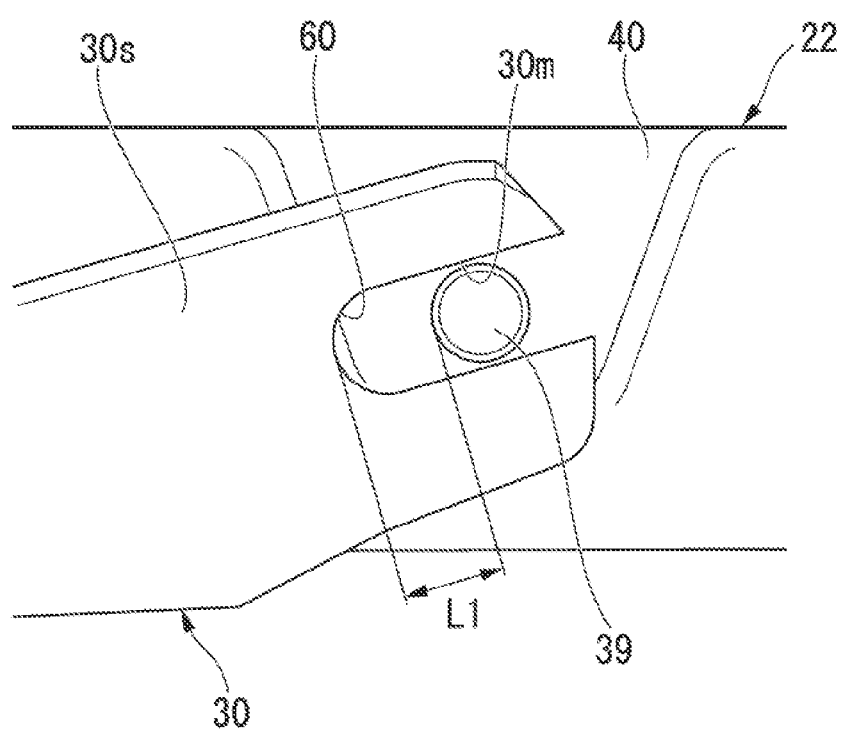
FIG. 39 is a side view of a fastening portion between the link stay and a front end extension member according to the third embodiment of the present invention.

In addition, the bolt holding portion 42 of the support bracket 43 and the shaft portion of the support bolt 39 inserted into the through-hole 50 of the front end extension member 10 are position-fixed, as shown in FIG. 39, by being fastened to the nut 38 (illustration omitted in FIG. 39) in the substantially intermediate position in the longitudinal direction of the notched groove 30m of the link stay 30. Therefore, in a state where the nut 38 is fastened to the support bolt 39, a separation space having a predetermined distance L1 is ensured between the shaft portion of the support bolt 39 and the bottom portion of the notched groove 30m. When the collision load in the vehicle body longitudinal direction is input, this separation space portion serves as the displacement permitting portion 60 which permits the relative displacement of the link stay 30 and the support bolt 39 which is caused by the rearward displacement of the sub-frame 22.

In addition, the notched portion 30n is disposed from the end edge to the front side on the bottom wall 30t of the rear end portion of the link stay 30. The notched portion 30n functions as the escape portion in which the bottom wall 30t does not interfere with the bottom wall 41 of the front end extension member 10 when the front side of the link stay 30 is rotated downward about the axis of the fastening center O of the rear end portion of the link stay 30, thereby permitting the rotation of the link stay 30.

In the vehicle body frame structure according to the present embodiment, the extension piece 29 extending in a direction to the front end extension member 10 below the cabin is disposed at the rear fastening portion 22u of the sub-frame 22, and the distal end portion of the extension piece 29 opposes the support wall 10a of the front end extension member 10 by leaving a predetermined gap therebetween. Therefore, when the collision load in the vehicle body longitudinal direction is input and the sub-frame 22 is bent down at the central bending point 27, it is possible to cause the mechanical fulcrum of the force trying to extract the fastening bolt 31 downward together with the weld nut 33 to move onto the support wall 10a (second fulcrum F2) of the front end extension member 10 which is distantly separated from the acting point. Accordingly, by employing this kind of vehicle frame structure, it is possible to reliably extract the fastening bolt 31 and the weld nut 33 downward from the lateral member 20 with the large stroke. Therefore, it is possible to cause the rear end portion of the sub-frame 22 to fall down.

In addition, in this vehicle body frame structure, the rear fastening portion 22u of the sub-frame 22 is connected to the link stay 30, and the front end extension member 10 in the front part lower portion of the cabin I via the support bolt 39 extending in the vehicle width direction. Therefore, after the rear fastening portion 22u of the sub-frame 22 falls down, the sub-frame main body 23 is rotated downward below the cabin I about the support bolt 39 on the front end extension member 10. In this manner, it is possible to reliably guide the sub-frame main body 23 and the suspension component downward below the cabin I.

According to this vehicle body frame structure, when the collision load in the vehicle body longitudinal direction is input, it is possible to reliably guide the sub-frame 22 and the suspension component downward below the cabin I as described above. However, it is not necessary to use a complicated mechanism. Accordingly, it is possible to suppress an increase in vehicle weight or an increase in manufacturing cost.

In addition, in this vehicle body frame structure, the reinforcement plate 35 (cabin side support member) having the escape hole 36 (hole or insertion hole) is joined to the upper surface of the lateral member 20, and the weld nut 33 is locked by the weak portion Z of only the lateral member 20 inside the escape hole 36. Moreover, the rigidity in the peripheral region of the weak portion Z is increased by the reinforcement plate 35. Therefore, when the collision load in the vehicle body longitudinal direction is input, it is possible to reliably break the weak portion Z by using the slight downward displacement of the fastening bolt 31 and the weld nut 33.

Furthermore, according to this vehicle body frame structure, it is possible to cause the mechanical fulcrum on the rear portion side of the sub-frame 22 to continuously move from the first fulcrum F1 on the lateral member 20 adjacent to the weld nut 33 to the second fulcrum F2 on the support wall 10a of the front end extension member 10. Therefore, it is possible to reliably extract the fastening bolt 31 downward together with the weld nut 33.

In addition, in this vehicle body frame structure, the notched groove 30m is disposed at the rear end portion on the lateral wall 30s of the link stay 30, and the support bolt 39 for fastening the rear end portion of the link stay 30 to the front end extension member 10 is inserted into the notched groove 30m. Therefore, in the later input stage of the collision load in the vehicle body longitudinal direction, when the rear half portion of the link stay 30 is largely rotated about the support bolt 39, it is possible to reliably cause the link stay 30 to fall down along the notched groove 30m. Accordingly, it is possible to avoid interference between the suspension component mounted on the sub-frame 22 and the front part of the cabin by causing the rear end portion of the sub-frame 22 to finally fall down below the cabin I in this manner.

Furthermore, in a case of this embodiment, in a state where the rear portion of the link stay 30 is fastened to the front end extension member 10 by the support bolt 39, the displacement permitting portion 60 can be secured between the bottom portion of the notched groove 30m and the support bolt 39. Therefore, in the middle input stage of the collision load in the vehicle body longitudinal direction, when the link stay 30 is about to be slightly displaced rearward together with the sub-frame main body 23, the relative displacement of the link stay 30 with respect to the support bolt 39 is permitted by the displacement permitting portion 60, and thus, it is possible to prevent the link stay 30 from being unnecessarily deformed. Accordingly, it is possible to reliably and finally guide the sub-frame 22 downward below the cabin I later by reliably folding the link stay 30 at the predetermined position.

Fourth Embodiment

Subsequently, a fourth embodiment shown in FIGS. 40 to 43 will be described.

This vehicle body frame structure according to the fourth embodiment has a basic configuration which is substantially the same as that of the third embodiment. However, a structure of a portion of an extension piece 129 of the rear fastening portion 22u of the sub-frame main body 23 and a structure of a portion of a support wall 110a of a front end extension member 110 (front end extension portion, under-floor frame, other vehicle body frame) opposed by the distal end portion of the extension piece 129 are different from those in the third embodiment. Hereinafter, only elements which are different from those in the third embodiment will be described, and common elements will be omitted in the description. The same reference numerals are given to the elements which are the same as those in the third embodiment.

Figure 40:
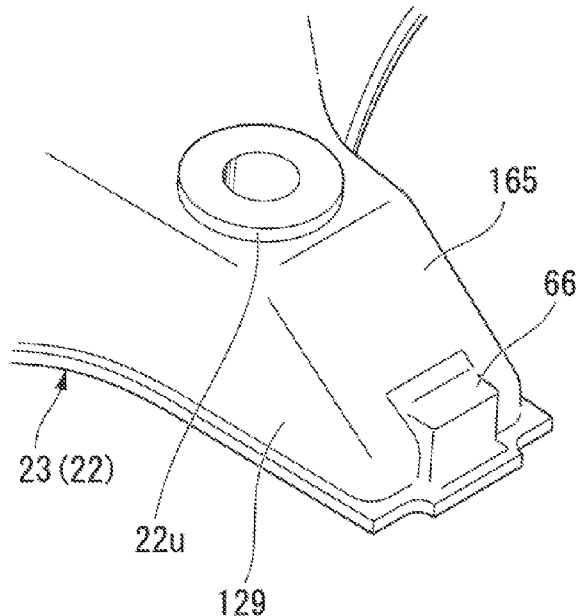
FIG. 40 is a perspective view when a portion of a sub-frame according to a fourth embodiment of the present invention is viewed from above.
Figure 41:
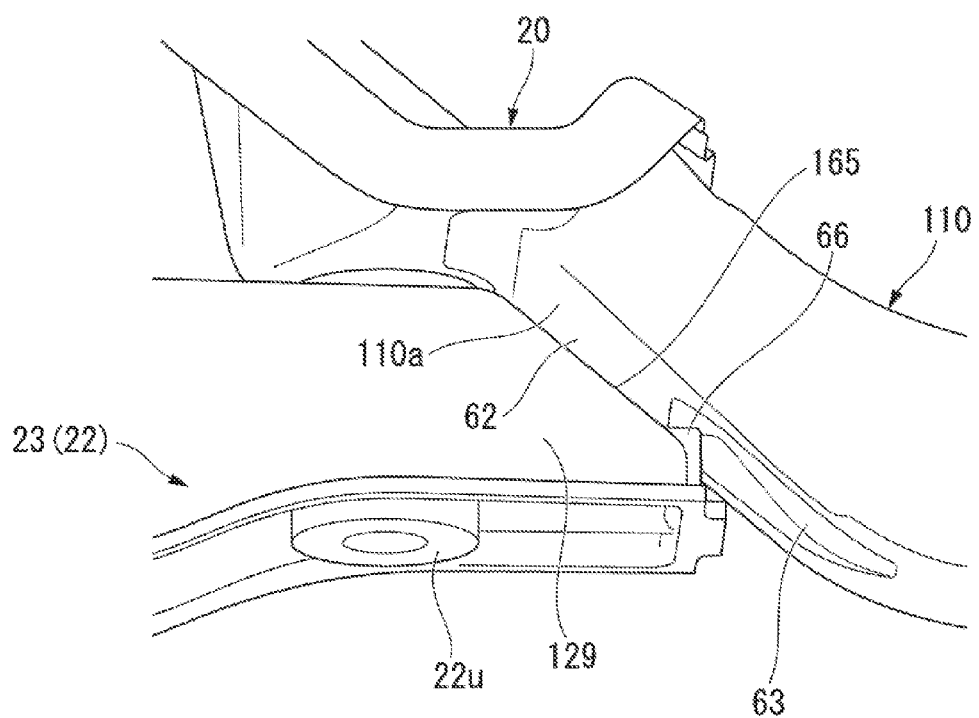
FIG. 41 is a perspective view when the sub-frame and a front end extension member according to the fourth embodiment of the present invention are viewed obliquely from below.
Figure 42:
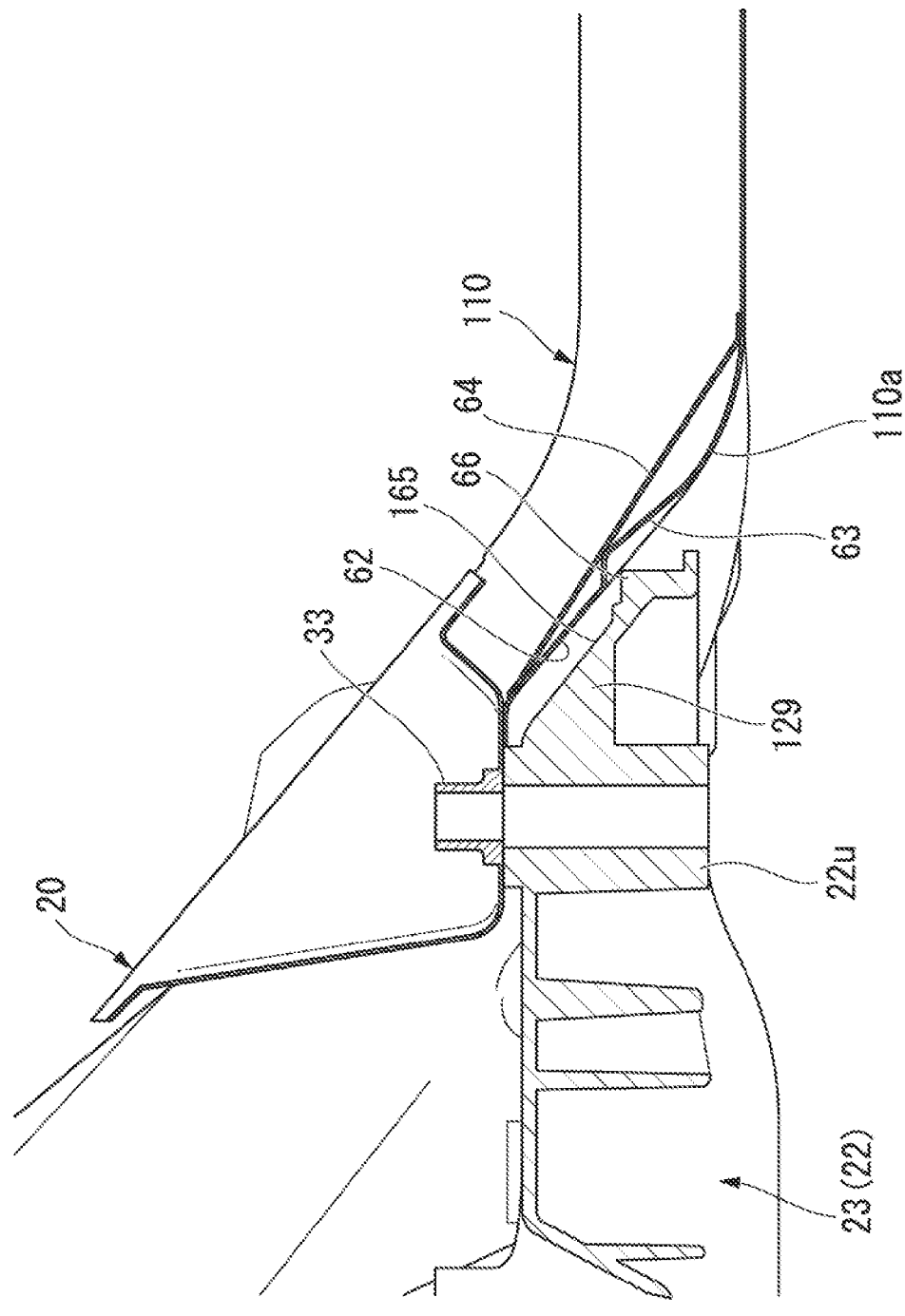
FIG. 42 is a vertical cross-sectional view of the sub-frame and the front end extension member according to the fourth embodiment of the present invention.

FIG. 40 is a view showing the rear fastening portion 22u of the sub-frame main body 23. FIGS. 41 and 42 are views showing the rear fastening portion 22u of the sub-frame main body 23 and the front end extension member 110. In addition, FIG. 43 is a view showing an upper surface side of the front end extension member 110.

As shown in FIGS. 40 to 43, a front portion region of the front end extension member 110 rises obliquely upward to a joint portion with the lateral member 20 (support member substrate, cabin side support member, vehicle body panel). A tilted surface 62 along the rising shape of the front end extension member 110 and a locking recess 63 which is recessed upward in a lower region of the tilted surface 62 and has a constant width are disposed on the support wall 110a which is a front wall of the front portion region of the front end extension member 110.

Figure 43:
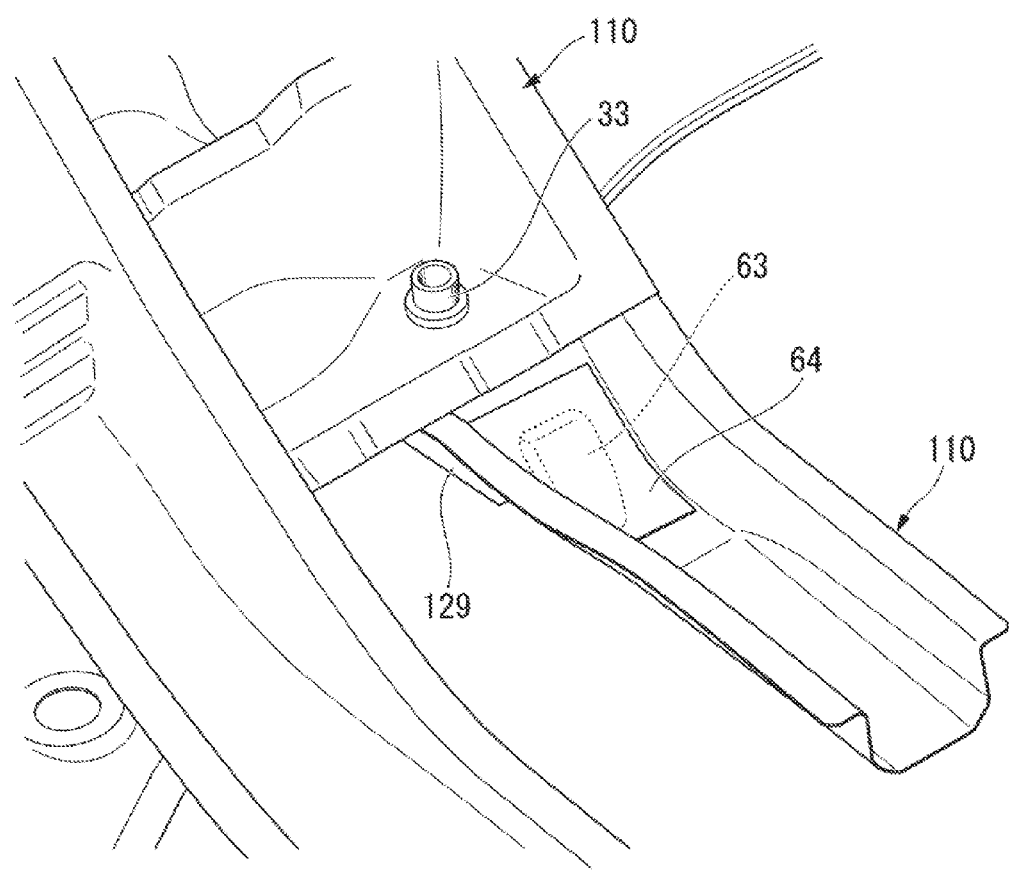
FIG. 43 is a perspective view when the front end extension member according to the fourth embodiment of the present invention is viewed from above.

In addition, as shown in FIGS. 42 and 43, a reinforcement plate 64 (reinforcement member) for reinforcing a peripheral edge portion of the locking recess 63 by covering an upper side of the locking recess 63 is attached to an upper surface side of the front portion region of the front end extension member 110.

In contrast, the extension piece 129 on the sub-frame main body 23 side is tilted downward from an upper surface near the rear fastening portion 22u to a distal end portion side (rear side of the vehicle body), and has a flat surface 165 which opposes the tilted surface 62 of the front end extension member 110 in parallel when it is mounted on the vehicle. In addition, an engagement convex portion 66 which protrudes in a horn shape, to the rear side of the vehicle with respect to the flat surface and which has a constant width is formed in a lower region of the flat surface 165.

In an initial state, the flat surface 165 of the extension piece 129 and the engagement convex portion 66 oppose the tilted surface 62 of the front end extension member 110 and the locking recess 63 by leaving a predetermined gap therebetween. However, in the middle input stage of the collision load in the longitudinal direction, the flat surface 165 comes into contact with the tilted surface 62, and the engagement convex portion 66 is inserted into the locking recess 63. At this time, the engagement convex portion 66 is guided to the lateral wall in the width direction of the locking recess 63, and comes into contact with a lower surface of the locking recess 63 in this state.

The vehicle body frame structure according to this embodiment can obtain a basic advantageous effect which is the same as that of the third embodiment. However, since the extension piece 129 on the sub-frame main body 23 side and the support wall 110a on the front end extension member 110 side have the above-described structure, it is possible to obtain another advantageous effect as follows.

That is, in this vehicle body frame structure, in the middle input stage of the collision load in the vehicle body longitudinal direction, after the extension piece 129 of the sub-frame main body 23 is brought into contact with the tilted surface 62 of the front end extension member 110 on the flat surface 165, the engagement convex portion 66 is engaged with the locking recess 63 of the front end extension member 110. In this manner, it is possible to adopt a stable position on the lower surface inside the locking recess 63 as the mechanical fulcrum (second fulcrum). Therefore, it is possible to obtain the stable rotation of the sub-frame main body 23 for extracting the fastening bolt (first fastening member, fastener, bolt) and the weld nut 33 (first fastening member, head portion, fastener, nut) by reliably guiding the engagement convex portion 66 of the extension piece 129 to a certain position inside the locking recess 63.

In addition, in this vehicle body frame structure, the reinforcement plate 64 for reinforcing the peripheral edge portion of the locking recess 63 is disposed on the upper surface side of the front end extension member 110. Therefore, in the middle input stage of the collision load in the vehicle body longitudinal direction, when the engagement convex portion 66 engages with the locking recess 63, it is possible to prevent flexural deformation from occurring around the locking recess 63. Accordingly, it is possible to stabilize the rotation of the sub-frame main body 23 in order to extract the fastening bolt and the weld nut 33.

This invention is not limited to the above-described embodiments, and various design modifications can be adopted within a range not departing from the spirit of the invention. For example, in the above-described embodiments, the vehicle body frame structure according to this invention is applied to the front part side of the vehicle. However, the vehicle body frame structure according to this invention can also be applied to a rear part side of a vehicle as long as the vehicle has the side frame and the sub-frame installed on the rear side of the cabin.

In addition, this invention is not limited to the above-described embodiments. For example, although the structure of the front part of the vehicle body has been described as an example, this invention can also be applied to a structure of a rear part of the vehicle body. When applied to the rear part of the vehicle body, it is possible to positively prevent interference between the sub-frame and the vehicle body by reliably guiding the sub-frame on the rear side downward below the vehicle body even in a case of vehicle rear collision where the other vehicle collides with the rear part of the vehicle body. In addition, the ridge may not be formed in the recess 30h, and the ridge portion may be formed in an arc shape. In addition, the V-shaped recess 30k on the lateral wall 30s may have a shape other than a V-shape.

The above-described embodiments can be appropriately combined with one another. In addition, there may be a case where some of the configuring elements are not used.

REFERENCE SIGNS LIST 10, 110 front end extension member, front end extension portion (under-floor frame, other vehicle body panel)
  10a, 110a support wall
11 front side frame (side frame)
15 floor tunnel frame (under-floor frame)
17 dash lower panel
18 floor tunnel portion
19 floor panel
20 lateral member (support member substrate, cabin side support member, vehicle body panel)
22 sub-frame
  22m front fastening portion (separate side fastening portion)
  22u rear fastening portion (adjacent side fastening portion)
27 central bending point
29, 129 extension piece
30 link stay
  30h recess
  30k V-shaped recess (recess)
  30m notched groove (bolt insertion portion, lateral wall notch, penetrating portion)
  30so lateral wall on separating side
  30t bottom wall
  30x downward convex portion
31 fastening bolt (first fastening member, fastener, bolt)
33 weld nut (first fastening member, head portion, fastener, nut)
35 reinforcement plate (cabin side support member)
36 escape hole, hole (insertion hole)
38 nut (second fastening member)
39 support bolt (second fastening member)
60 displacement permitting portion
62 tilted surface
63 locking recess
64 reinforcement plate (reinforcement member)
65 nut cover
  65c engagement claw
66 engagement convex portion
67 restricting projection
165 flat surface
F1 first fulcrum
F2 second fulcrum
O fastening center
Z weak portion

The invention claimed is:

1. A vehicle body frame structure comprising:
a side frame that is arranged on one of a front side and a rear side of a cabin along a vehicle body longitudinal direction;
a sub-frame that is arranged below the side frame and supports a suspension component;
a cabin side support member that is arranged outside and below one of a front section and a rear section of the cabin, and that supports an end portion of the sub-frame which is at a side adjacent to the cabin;
an under-floor frame that is arranged below a stepped portion of a floor adjacent to a floor tunnel portion of the cabin, along the vehicle body longitudinal direction; and
a link stay that is arranged across and connects together the end portion of the side adjacent to the cabin in the sub-frame and the under-floor frame,
wherein the sub-frame includes:
a separate side fastening portion which is an end portion on a side separating from the cabin and is fastened to a member on an extension end side of the side frame;
an adjacent side fastening portion which is the end portion on the side adjacent to the cabin and is fastened and fixed to the cabin side support member from a lower side; and
a central bending point which is configured to be bent down at a substantially central portion in between of the separate side fastening portion and the adjacent side fastening portion in the longitudinal direction,
wherein in the link stay, a first end portion side of the link stay is fastened to a lower surface of the cabin side support member together with the adjacent side fastening portion so as to be extractable, and a second end portion side of the link stay is fastened to the under-floor frame by a support bolt extending in a vehicle width direction and a nut screwed to the support bolt,
wherein the nut for fastening the second end portion side of the link stay is held by a lateral wall on a side separating from the floor tunnel portion of the link stay, and
wherein the support bolt is fitted into the nut from a lower side of the floor tunnel portion.

2. The vehicle body frame structure according to claim 1, wherein the nut is assembled integrally with a nut cover having an engagement claw locked to the lateral wall of the link stay.

3. The vehicle body frame structure according to claim 1, wherein a bolt insertion portion into which the support bolt is inserted is disposed on the lateral wall of the link stay, and
wherein the nut includes a restricting projection which is locked by the bolt insertion portion on the lateral wall of the link stay and restricts rotation of the nut.

4. The vehicle body frame structure according to claim 1, wherein a bolt insertion portion into which the support bolt is inserted is disposed on the lateral wall of the link stay, and wherein the bolt insertion portion has a displacement permitting portion which permits relative displacement between the link stay and the support bolt, which is caused by displacement of the sub-frame in the vehicle longitudinal direction, when a collision load in the vehicle body longitudinal direction is input.

5. The vehicle body frame structure according to claim 1, wherein a bolt insertion portion into which the support bolt is inserted is disposed on the lateral wall of the link stay, and
wherein the bolt insertion portion is configured to have a notched groove for permitting falling-down of the link stay from the support bolt which is caused by downward displacement of the sub-frame, when a collision load in the vehicle body longitudinal direction is input.

6. The vehicle body frame structure according to claim 1, wherein the link stay has a downward convex portion which is convex downward at a substantially central portion in the vehicle body longitudinal direction,
wherein a weak portion which facilitates separation of a fastener from the cabin side support member by using a downward load is disposed at the cabin side support member to which the adjacent side fastening portion of the sub-frame is attached, and
wherein an apex of the downward convex portion forms a truss structure with the central bending point of the sub-frame and the adjacent side fastening portion, and even when the sub-frame is in an initial state and the sub-frame is in a state of coming into contact with the ground during collision, the apex of the downward convex portion is located below a straight line connecting the central bending point and a fastening center of the link stay.

7. The vehicle body frame structure according to claim 6, wherein a polymerized reinforcement plate is disposed at the cabin side support member to which the adjacent side fastening portion of the sub-frame is fastened, and
wherein the weak portion is an annular portion of the cabin side support member between an insertion hole of the fastener of the cabin side support member and an insertion hole formed in the reinforcement plate so as to permit insertion of the fastener.

8. The vehicle body frame structure according to claim 7, wherein the reinforcement plate is thicker than the cabin side support member to which the reinforcement plate is attached.

9. The vehicle body frame structure according to claim 7, wherein the reinforcement plate is welded to the cabin side support member behind the weak portion in a collision load input direction, and the fastener is a nut which is welded and fixed to a bolt and the cabin side support member.

10. The vehicle body frame structure according to claim 6, wherein the link stay forms the downward convex portion by causing a bottom wall to protrude downward.

11. The vehicle body frame structure according to claim 10, 
wherein the link stay includes a recess for the adjacent side fastening portion in which the bottom wall is recessed upward, and
wherein the link stay includes the downward convex portion behind the recess in the collision load input direction.

12. The vehicle body frame structure according to claim 10,
wherein the link stay includes a lateral wall extending from the bottom wall, and
wherein a recess is disposed at a lateral wall located above the downward convex portion.

13. The vehicle body frame structure according to claim 1,
wherein an extension piece extending in an under-floor frame direction is disposed at the adjacent side fastening portion of the sub-frame, and
wherein a support wall which opposes a distal end portion of the extension piece by leaving a predetermined gap therebetween and with which the distal end portion of the extension piece comes into contact when the collision load in the vehicle body longitudinal direction is input is disposed at the under-floor frame.

14. The vehicle body frame structure according to claim 13,
wherein the vehicle body side support member includes a support member substrate into which a first fastening member penetrates and in which a head portion of the first fastening member is locked at an upper surface side, and a reinforcement plate that has an escape hole which surrounds an outside of the head portion of the first fastening member, and that is bonded to the upper surface of the support member substrate, and
wherein a region surrounded by the escape hole of the reinforcement plate on the support member substrate is a weak portion.

15. The vehicle body frame structure according to claim 14,
wherein within the support member substrate, a lower surface in a region adjacent to the weak portion on the cabin side is allowed to have increased rigidity by bonding the reinforcement plate to the upper surface side, and configures a first fulcrum with which an edge of the adjacent side fastening portion of the sub-frame comes into contact in an initial input stage of the collision load in the vehicle body longitudinal direction, and
wherein the support wall of the under-floor frame configures a second fulcrum with which the distal end portion of the extension piece comes into contact in a middle input stage of the collision load in the vehicle body longitudinal direction.

16. The vehicle body frame structure according to claim 13,
wherein a penetrating portion in which a second fastening member is supported in a penetrating state is disposed on the second end portion side of the link stay, and
wherein the penetrating portion has a displacement permitting portion which permits relative displacement between the link stay and the second shaft member, which is caused by displacement of the sub-frame in the vehicle longitudinal direction, when a collision load in the vehicle body longitudinal direction is input.

17. The vehicle body frame structure according to claim 13,
wherein a penetrating portion in which the second fastening member is supported in a penetrating state is disposed on the second end portion side of the link stay, and
wherein the penetrating portion is configured to have a notched groove for permitting falling-down of the link stay from the second fastening member which is caused by downward displacement of the sub-frame, when the collision load in the vehicle body longitudinal direction is input.

18. The vehicle body frame structure according to claim 13,
wherein the support wall of the under-floor frame includes a tilted surface and a locking recess which is disposed to be continuous with the tilted surface recessed upward, and
wherein the extension piece includes a flat surface parallel to the tilted surface on the support wall, and an engagement convex portion which protrudes from the flat surface and engages with the locking recess on the support wall in the middle input stage of the collision load in the vehicle body longitudinal direction.

19. The vehicle body frame structure according to claim 18,
wherein a reinforcement member for reinforcing a peripheral edge portion on an upper surface side of the locking recess is attached to an upper surface side of the under-floor frame.

* * * * *